US008015049B1

(12) United States Patent
Tam et al.

(10) Patent No.: US 8,015,049 B1
(45) Date of Patent: Sep. 6, 2011

(54) ON-LINE APPOINTMENT SYSTEM

(75) Inventors: Tommy H. Tam, Sunnyvale, CA (US);
Ricky Mok, Daly City, CA (US);
Sherman C. Luk, San Francisco, CA (US)

(73) Assignee: S.F. IP Properties 61 LLC, Wilmington, DE (US)

( * ) Notice: Subject to any disclaimer, the term of this patent is extended or adjusted under 35 U.S.C. 154(b) by 0 days.

(21) Appl. No.: 09/550,706

(22) Filed: Apr. 17, 2000

Related U.S. Application Data

(60) Provisional application No. 60/149,346, filed on Aug. 18, 1999, provisional application No. 60/154,201, filed on Sep. 15, 1999.

(51) Int. Cl.
*G06Q 10/00* (2006.01)
(52) U.S. Cl. ...................................... 705/7.18; 705/7.19
(58) Field of Classification Search .................. 705/8–9, 705/10, 7, 7.18, 7.19
See application file for complete search history.

(56) References Cited

U.S. PATENT DOCUMENTS

| | | | |
|---|---|---|---|
| 4,626,836 A | 12/1986 | Curtis et al. | |
| 4,807,155 A | 2/1989 | Cree et al. | |
| 4,831,552 A * | 5/1989 | Scully et al. ................ | 715/751 |
| 4,866,611 A * | 9/1989 | Cree et al. ..................... | 708/112 |
| 5,093,813 A * | 3/1992 | Levine ............................ | 368/10 |
| 5,197,000 A | 3/1993 | Vincent | |
| 5,208,748 A | 5/1993 | Flores et al. | |
| 5,261,045 A | 11/1993 | Scully et al. | |
| 5,289,531 A * | 2/1994 | Levine ....................... | 379/93.23 |
| 5,323,314 A | 6/1994 | Baber et al. | |
| 5,519,606 A * | 5/1996 | Frid-Nielsen et al. | |
| 5,524,146 A * | 6/1996 | Morrisey et al. | |
| 5,528,745 A | 6/1996 | King et al. | |
| 5,530,684 A * | 6/1996 | Kataoka et al. ................. | 368/28 |
| 5,615,121 A * | 3/1997 | Babayev et al. | |
| 5,772,585 A | 6/1998 | Lavin et al. | |
| 5,778,346 A * | 7/1998 | Frid-Nielsen et al. ............ | 705/9 |
| 5,790,974 A | 8/1998 | Tognazzini | |
| 5,842,173 A * | 11/1998 | Strum et al. | |
| 5,848,395 A | 12/1998 | Edgar et al. | |
| 5,848,396 A | 12/1998 | Gerace | |
| 5,855,006 A | 12/1998 | Huemoeller et al. | |
| 5,889,979 A | 3/1999 | Miller et al. .................. | 713/503 |
| 5,918,207 A | 6/1999 | McGovern et al. | |
| 5,948,040 A | 9/1999 | DeLorme et al. | |
| 5,960,406 A * | 9/1999 | Rasansky et al. ................. | 705/9 |

(Continued)

FOREIGN PATENT DOCUMENTS

EP 0 797 164 B1 3/2000

(Continued)

OTHER PUBLICATIONS

Harris, Carolyn; Donald Jordan; Thomas Pinson. "Small-Sized LAN Support for aResearch Center". Journal of Systems Management. Jan. 1994. vol. 45. Iss. 1. pp. 14-17.*

(Continued)

*Primary Examiner* — Johnna R Loftis
(74) *Attorney, Agent, or Firm* — Perkins Coie LLP

(57) ABSTRACT

Improved approaches for providing on-line appointments over a network are disclosed. The network is, for example, a global computer network such as the Internet. According to one aspect, users are able to schedule appointments over the network by on-line means. The users are typically individuals or service providers. Service providers are often those businesses that offer appointments to schedule their services.

32 Claims, 48 Drawing Sheets

U.S. PATENT DOCUMENTS

| | | | |
|---|---|---|---|
| 5,963,913 A | | 10/1999 | Henneuse et al. |
| 5,970,466 A | * | 10/1999 | Detjen et al. ............... 705/8 |
| 5,982,863 A | | 11/1999 | Smiley et al. |
| 6,018,343 A | | 1/2000 | Wang et al. |
| 6,038,542 A | | 3/2000 | Ruckdashel |
| 6,049,776 A | * | 4/2000 | Donnelly et al. ............ 705/8 |
| 6,052,563 A | | 4/2000 | Macko |
| 6,058,415 A | | 5/2000 | Polcyn ................... 709/200 |
| 6,064,977 A | | 5/2000 | Haverstock et al. ......... 705/9 |
| 6,085,166 A | * | 7/2000 | Beckhardt et al. .......... 705/9 |
| 6,101,480 A | * | 8/2000 | Conmy et al. ............. 705/9 |
| 6,167,379 A | * | 12/2000 | Dean et al. ............... 705/8 |
| 6,216,110 B1 | | 4/2001 | Silverberg |
| 6,236,396 B1 | | 5/2001 | Jenson et al. |
| 6,272,545 B1 | * | 8/2001 | Flanagin et al. ......... 709/228 |
| 6,313,852 B1 | | 11/2001 | Ishizaki et al. |
| 6,341,316 B1 | * | 1/2002 | Kloba et al. ............ 709/248 |
| 6,345,260 B1 | * | 2/2002 | Cummings et al. ......... 705/8 |
| 6,389,454 B1 | * | 5/2002 | Ralston et al. ........... 705/8 |
| 6,457,062 B1 | * | 9/2002 | Pivowar et al. .......... 709/248 |
| 6,480,830 B1 | * | 11/2002 | Ford et al. |
| 6,553,037 B1 | * | 4/2003 | Pivowar et al. ............ 370/463 |
| 6,708,205 B2 | * | 3/2004 | Sheldon et al. |
| 6,785,868 B1 | * | 8/2004 | Raff ................... 715/205 |
| 2001/0011225 A1 | | 8/2001 | O'Connor et al. |
| 2003/0061087 A1 | * | 3/2003 | Srimuang |
| 2010/0153162 A1 | | 6/2010 | Tam et al. |

FOREIGN PATENT DOCUMENTS

| | | | |
|---|---|---|---|
| WO | WO 98/13753 A1 | | 4/1998 |
| WO | WO 99/11049 | | 3/1999 |
| WO | WO 00/75841 A1 | | 12/2000 |
| WO | WO 01/52145 A1 | * | 7/2001 |

OTHER PUBLICATIONS

Graven, Matthew. "Internet-Friendly PIMs". PC Magazine. Oct. 20, 1998. vol. 17. Iss. 18. p. 36.*

"Practice makes Perfect, Part 1". InfoWorld. Apr. 21, 1997. p. 68.* www.palm.com—portable electronic organizer.*

Padwick, Gordon and Bill Ray. Using Microsoft Outlook 98. Copyright 1998. Chapter 6, pp. 97-100, 105-107; Chapter 26, 419-438, Chapter 27, pp. 439-450.*

Moseley, Lonnie E. and David M. Boodey. Mastering Microsoft Office 97. Copyright 1997. Chapter 35, pp. 783-798.*

Willen, Claudia. The ABCs of Outlook 97. Chapters 8-10. Published Mar. 17, 1997.*

Russell Information Sciences brings the first real-time scheduling solution to the World Wide Web, Business Wire, May 19, 1997. Dialog file 16: 05034954.*

Cohon, Charles. Rep fights sales meeting conflicts with free Internet Web site. Agency Sales. Irvine: Aug. 1997, vol. 27, Iss. 8 from proquest.*

Skelton, "Finally, a Useful Website," myevents.com press room, Mar. 17, 1999, [retrieved May 1, 2003], 3 pages, retrieved from: google.com.

Joint Planning, "JointPlanning.com Introduces Free Group-Based Calendar." jointplanning.com press release, Sep. 9, 1998 [retrieved May 1, 2003], 2 pages, retrieved from: google.com.

Screenshots of JointPlanning.com, jointplanning.com, Dec. 1998-Feb. 1999 [retrieved May 1, 2003], pp. 1-10, retrieved from: google.com.

Seachrist, "Work-Free Workgroup Schedulers," Byte.com, Aug. 1995 [retrieved Jul. 17, 2002], 10 pages, retrieved from: google.com.

Moseley et al., "Mastering Microsoft Office 97," Sybex, Inc., 1997, $2^{nd}$ edition, pp. 784-798.

Brodsky, Charles L., "Outlook '98—Worth the Wait," Internetweek, Aug. 24, 1998 [retrieved on Jul. 18, 2002], 2 pages, retrieved from: Proquest Direct.

"Appoint.Net launches advanced on-line calendar inks deal with animalhouse.com," PR Newswire, Sep. 16, 1998 [retrieved on 0718-02], 2 pages, retrieved from: Proquest Direct.

"On Technology," Orange County Register, Jul. 29, 1996 [retrieved on Jul. 17, 2002], 2 pages, retrieved from: Proquest Direct.

Baig, Edward C., "Secretaries for the Rest of Us," Business Week, Nov. 16, 1998 [retrieved on Jul. 17, 2002], 2 pages, retrieved from: Proquest Direct.

Stearns, Tom, "Outlook is Bright in '98," Informationweek, Apr. 6, 1998 [retrieved on Jul. 19, 2002], 3 pages, retrieved from: Proquest Direct.

"Microsoft: New Office 97 Small Business Edition with Internet Tools small Businesses Really Need," M2 Presswire, Mar. 24, 1998 [retrieved on Jul. 19, 2002], 3 pages, retrieved from: Proquest Direct.

Zeigen, Scott, MD, "The Appointment Scheduler," PracticeMaker 4.0 Manual, 1998 [retrieved on Jul. 22, 2002], 15 pages, retrieved from: http://www.practicemaker.com/appoint.pdf.

"vCalendar: The Personal Calendaring and Scheduling Exchange Format," A versit Consortium White Paper, Jan. 1, 1997, pp. 1-4 (downloaded http://www.imc.org/pdi/vcalwhite.html).

"vCalendar: The Electronic Calendaring and Scheduling Exchange Format," Version 1.0, A versit Consortium Specification, Sep. 18, 1996, pp. 1-52.

Eldridge, Earle, "Autonation car dealership aimed at Internet Users", USA Today, May 10, 1999 [retrieved May 17, 2005], pp. 1-2, retrieved from Proquest Direct.

"Group Health Expands Scheduling Via Internet", Journal of Business, Mar. 12, 1998 [retrieved May 17, 2005], vol. 13, Issue 5, pp. 1-2, retrieved from: Proquest Direct.

"Installing and Configuring Outlook 98", www.pa.msu.edu, Dec. 2, 1998 [retrieved May 17, 2005], pp. 1-4, retrieved from: Google.com.

Wallace, Bob, "Software will let customers book that oil change online", Computerworld, Feb. 8, 1999 [retrieved May 17, 2005], vol. 33, Issue 6, pp. 1-2, retrieved from Proquest Direct.

Free ScheduleOnline Website Lets Organizations Schedule Meetings Online. ScheduleOnline Press Release, http://www.scheduleonline.com/press_release_011399.php?pn_ud=, Mar. 6, 2004.*

Padwick, Gordon, et al., "Using Microsoft Outlook98", Que, 1998, pp. 1-42.* www.webworldinc.com website featuring article Allaire Cold Fusion "Getting Started" published in 1996.*

"Non Final Office Action", U.S. Appl. No. 12/710,174, (Nov. 19, 2010), 17 pages.

Padwick, Gordon et al., "Using Microsoft Outlook 98", Que, (1998), pp. 1-42.

Donovan F. Gow, Aberdeen Group, Impact, eCal Unveils Robust Internet Calendaring Solution, Jun. 2, 1999.

Christa Degnan, PC Week Online, PIM services win business backing, Aug. 9, 1999.

Christa Degnan, PC Week, Calendaring apps, services make foray into portal sites, Mar. 8, 1999.

eCal Corp., Appoint.net-Schedule a Meeting-various screenshots, http://www.appoint.net/cal/create.asp?itype=1, downloaded Aug. 27, 1999.

Excite, Inc., Excite Reference: Online Calendars, http://www.excite.com/reference/online_calendars?csearch_id=default, downloaded Sep. 5, 1999.

Jon C.A. DeKeles, PC Week Online, Find the Right PIM for You, Apr. 19, 1999.

Leslie Walker, Washingtonpost.com, The Lure of Web Calendars, May 13, 1999.

Microsoft Corp., Microsoft Outlook 97-Screenshots of features, 1997.

Peter Key, Philadelphia Business Journal, Date with Destiny?, Apr. 19, 1999.

PointServe, Inc., About PointServe, http://www.pointserve.com/corporate/about.htm, downloaded Dec. 10, 1999.

PointServe, Inc., Core Technology, http://www.pointserve.com/corporate/coretech.htm, downloaded Dec. 10, 1999.

PointServe, Inc., PointServe Completes Agreement With Ticketmaster Online CitySearch; Prepares for National Launch of Intelligent Online Scheduling Solutions, Company Press Release, Nov. 17, 1999.

Product Review, "Web-based PIMs can help you stick to your schedule," Infoworld, May 10, 1999.

Prospector, Calendars, Free Stuff Links, http://www.prospector.cz/Services/Calendars/index.html, downloaded Dec. 3, 1999.

Rachel Chambers, eCal Corp., With When.com Out of the Way, e Cal Targets Web 500, Apr. 16, 1999.

Scot Petersen, PC Week, Search takes a back seat to 'sticky' apps, Mar. 1, 1999.

Stephen Buel, Silicon Valley News, Get a Web-Organized Life, Apr. 4, 1999.

The Industry Standard: Day in and Day Out, Apr. 5, 1999.

TimeFind.com-New Business Model, http://www.killerstrategy.com/timefind/index.htm, downloaded Dec. 8, 1999.

WebAppoint.com, Inc., Homepage, Welcome to WebAppoint.com Reward Program, http://www.webappoint.com/reward.asp, downloaded Dec. 3, 1999.

WebAppoint.com, Inc., News, http://www.webappoint.com/News.htm, downloaded Dec. 3, 1999.

Yahoo! Inc., Yahoo! Calendar Add Event, http://calendar.yahoo.com/yc/us/YYY:41716/srt:0?v=5&i=0&t=936264552 &pv=61, downloaded Sep. 2, 1999.

Yahoo! Inc., Yahoo! Calendar Features, http://calendar.yahoo.com/?v=140&pi=102, downloaded Jul. 26, 1999.

Yahoo! Inc., Yahoo! Calendar Help, http://help.yahoo.com/help/us/cal/, downloaded Aug. 18, 1999.

Yahoo! Inc., Yahoo! Calendar Import/Export, http://calendar.yahoo.com/yc/YYY:00303/srt:0?v=81&pv=70&t=934965057, downloaded Aug. 18, 1999.

Yahoo! Inc., Yahoo! Calendar My Calendar, http://calendar.yahoo.com/yc/us/YYY:045296/srt:0?v=133&pv=61&t=9362 64552&i=1, downloaded Sep. 2, 1999.

Yahoo! Inc., Yahoo! Calendar My Time Guides, http://calendar.yahoo.com/yc/YYY:00303/srt:0?v=95&pv=70&t=934965057, downloaded Aug. 18, 1999.

Yahoo! Inc., Yahoo! Calendar Preferences, http://calendar.yahoo.com/yc/YYY:00303/srt:0?v=71&pv=70&t=934965057, downloaded Aug. 18, 1999.

Yahoo! Inc., Yahoo! Calendar Reminders, http://calendar.yahoo.com/yc/YYY:00303/srt:0?v=75&pv=70&t=934965057, downloaded Aug. 18, 1999.

Yahoo! Inc., Yahoo! Calendar Send Invitation, http://calendar.yahoo.com/yc/us/YYY:04963/srt0?v=6&t=936264552&pv= 61&i=0, downloaded Sep. 2, 1999.

Yahoo! Inc., Yahoo! Calendar Sharing, http://calendar.yahoo.com/yc/YYY:00303/srt:0?v=84&pv=70&t=934965057, downloaded Aug. 18, 1999.

Yahoo! Inc., Yahoo! Calendar Synchronization Options, http://calendar.yahoo.com/yc/us/?v=140&pi=100, downloaded Aug. 18, 1999.

Yahoo! Inc., Yahoo! Calendar Unveils New Features, Press Release, Mar. 16, 1999.

Yahoo! Inc., Yahoo! Clubs, http://clubs.yahoo.com/?myclubs, downloaded Aug. 18, 1999.

Yahoo! Inc., Yahoo! Introduces Yahoo! Address Book, Press Release, Dec. 15, 1998.

Yahoo! Inc., Yahoo! Introduces Yahoo! Calendar, Yahoo!, Press Release, Aug. 17, 1998.

Yahoo! Inc., Yahoo! Users Can Now Synchronize Yahoo! Calendar, To Do Lists and Address Book from Desktop to Device with TrueSync for Yahoo! from Starfish, Press Release, Dec. 15, 1998.

* cited by examiner

ADD NEW EVENT

Event Description: Lunch with John Smith
Date: August ▼ 16 ▼ 1999 ▼
Time: The Event will ○ takes all day
● begin at 12 ▼ :00 ▼ AM ▼    2000
and it will last 1 ▼ hours :00 ▼ minutes
Details: meet at the Pub ☑ Mark Busy to my Appointment Schedule

[Submit]  [Reset]

Optional: Do you want this event to be repeated?

● No
○ Yes, please repeat every ▼ day ▼ OR
○ Yes, please repeat every first ▼ Sunday ▼ of the month every month ▼

This event will be repeated:
● Always, OR
○ Until August ▼ 23 ▼ 1999 ▼

[Submit]  [Reset]

Optional: Do you want a reminder for this event?

○ No
● Yes, please remind me 1 day ▼ prior to the event
by sending email to [          ]

[Submit]  [Reset]

ON-LINE APPOINTMENT SYSTEM

CROSS-REFERENCE TO RELATED APPLICATIONS

This application claims the benefit of U.S. Provisional Patent Application No. 60/149,346, filed Aug. 18, 1999, and entitled "ON-LINE APPOINTMENT SYSTEM", and which is hereby incorporated by reference herein. This application also claims the benefit of U.S. Provisional Patent Application No. 60/154,201, filed Sep. 15, 1999, and entitled "ON-LINE APPOINTMENT SYSTEM", and which is hereby incorporated by reference herein.

This application is also related to the following applications, filed concurrently herewith and incorporated herein by reference: (1) U.S. patent application Ser. No. 09/551,179, entitled "GRAPHICAL USER INTERFACE FOR ON-LINE APPOINTMENT SYSTEM"; (2) U.S. patent application Ser. No. 09/550,585, entitled "METHOD AND APPARATUS FOR MAKING ON-LINE APPOINTMENTS USING PREDETERMINED APPOINTMENT TYPES"; and (3) U.S. patent application Ser. No. 09/551,825, entitled "ON-LINE APPOINTMENT SYSTEM WITH ELECTRONIC NOTIFICATIONS".

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to calendars and appointments and, more particularly, on-line calendars and appointments.

2. Description of the Related Art

For many years, individuals and businesses have maintained printed calendars to schedule their time and to remember when events have been scheduled. Typically, individuals or business representatives would write on the printed calendars when scheduling events. More sophisticated scheduling and time management printed products are also used to maintain schedules and guide time management. Besides printed calendars, electronic calendars are commonplace. Electronic calendars are provided by software executing on various computing devices, such as personal computers (e.g., Microsoft Outlook) or handheld computers (e.g., PalmPilot). These types of devices, whether paper or electronic based, are generally referred to as personal information managers (PIMs).

In addition, when making appointments, individuals and business representatives often view their respective calendars and converse in person or via telephone as to when their schedules permit the scheduling of an appointment. This requires that all parties to the appointment converse in selecting a date and time for an appointment. As a consequence, it is often difficult and frustrating when trying to schedule appointments.

More recently, web-based calendars have been created and made available to users over the Internet. These calendars allow users with Internet access to maintain their own calendar on-line. FIG. 1 is a screen shot of a web-based calendar offered by Yahoo Inc. at www.calendar.yahoo.com. A user can access their web-based calendar by use of a network browser (e.g., HTML browser) coupled to the Internet. These web-based calendars allow users to maintain their schedule of events on the Internet. Some of the advantages of web-based calendars are that they are accessible worldwide and can be shared amongst users. However, there are several disadvantages to existing web-based calendars. One disadvantage is that appointment capabilities are not provided. More particularly, although web-based calendars are provided there has conventionally not been any means to efficiently schedule on-line appointments with others. While a user of a web-based calendar could interact with a network browser to schedule an event in his/her own web-based calendar, there is no automated on-line mechanism to schedule appointments.

There is a need for improved on-line calendars and appointment making capabilities.

SUMMARY OF THE INVENTION

Broadly speaking, the invention relates to techniques for providing on-line appointments such that users can schedule appointments with other users over a network. The network is, for example, a global computer network such as the Internet. In other words, users are able to schedule appointments over the network by on-line means. The users are typically individuals or service providers. Service providers are normally those businesses that offer appointments to schedule their services. Numerous service providers utilize appointments. Examples of service providers include beauty shops, auto repair shops, government offices, professionals (including lawyers, dentists, doctors, accountants, etc.), and many more.

The invention can be implemented in numerous ways, including as a computer system, an apparatus, a method or a computer readable medium. Several embodiments of the invention are discussed below.

As a method for providing an on-line appointment between a user and a service provider over a network, one embodiment of the invention includes: receiving a request for appointment availability of the service provider during a time period; determining available appointment times within the time period for the service provider; transmitting the available appointment times to the user; receiving a selected appointment time from the available appointment times; and setting the on-line appointment between the user and the service provider at the selected appointment time.

As a method for providing an on-line appointment over a network, one embodiment of the invention includes: transmitting a user's electronic calendar to a user; transmitting a list of available service providers to the user; receiving a request for appointment availability of a selected one of the available service providers; determining available time slots for the selected one of the available service providers; transmitting the available time slots to the user; receiving a time slot selection from the available time slots to establish an appointment with the selected one of the available service providers; updating the user's electronic calendar with the appointment; and updating an electronic calendar for the selected one of the available service providers with the appointment.

As computer readable medium including computer code for providing an on-line appointment between a user and a service provider over a network, one embodiment of the invention includes: computer program code for receiving a request for appointment availability of the service provider; computer program code for determining available appointment slots for the service provider; computer program code for transmitting the available appointment slots to the user; computer program code for receiving a selected appointment slot from the available appointment slots; and computer program code for setting the on-line appointment between the user and the service provider at the selected appointment slot.

As a computer readable medium including computer code for providing an on-line appointment over a network, one embodiment of the invention includes: computer program code for transmitting a user's electronic calendar to a user; computer program code for transmitting a list of available service providers to the user; computer program code for receiving a request for appointment availability of a selected one of the available service providers; computer program code for determining available time slots for the selected one of the available service providers; computer program code for transmitting the available time slots to the user; computer program code for receiving a time slot selection from the available time slots to establish an appointment with the selected one of the available service providers; computer program code for updating the user's electronic calendar with the appointment; and computer program code for updating an electronic calendar for the selected one of the available service providers with the appointment.

As a method for doing business over a global computer network, one embodiment of the invention includes: registering service providers over the global computer network to identify at least offered services, appointment hours, contact information for the registered service providers; providing an on-line calendar for each of the registered service providers; registering individuals over the global computer network; providing an on-line calendar for each of the registered individuals; and setting of appointments with certain of the registered service providers when the appointment have been requested by any of the registered individuals, and for each appointment being set, the setting at least places appointment indications on the on-line calendars of the associated one of the registered service providers and the associated one of the individuals.

As an on-line appointment system that supports a large number of users in making appointments over the Internet, one embodiment of the invention includes an appointment server coupled to the network, and an appointment database coupled to the appointment server. The appointment server and the appointment database together provide storage and access for calendars of the users and provide assistance to users to request appointments and thereafter permit confirmation the appointments.

As a method for making on-line appointments over a computer network, one embodiment of the invention includes: registering as a user of an on-line appointment system, the registering providing a user name, contact information, and appointment availability information for the user, the appointment availability information indicating days and times during which the user is generally available to receive appointments; maintaining on-line calendars for the registered users, the on-line calendars including scheduled appointments or events for the respective registered user; and scheduling appointments between users. The scheduling includes at least receiving an appointment request from a first registered user requesting an appointment with a second registered user, and selecting an appointment date and time for the appointment in accordance with the appointment availability information for the second registered user and non-conflicting with any other previously scheduled appointments or events in the on-line calendar of the second registered user.

As a computer implemented method for providing on-line appointment services over a global computer network, one embodiment of the invention includes: registering service providers for on-line appointments over the global computer network, the registering providing appointment availability information for the registered service providers; and scheduling on-line appointments between users and the registered service providers over the global computer network based on the availability information.

The advantages of the invention are numerous. Different embodiments or implementations may have one or more of the following advantages. One advantage of the invention is that appointments can be efficiently established on-line at any time day or night. Appointments can also be established without the need to waiting for personal assistance to schedule an appointment with a service provider. Another advantage of the invention is that user can manage and schedule appointments using a website. Still another advantage of the invention is that customers can use a central website to make appointments with various service providers. Yet another advantage of the invention is that synchronization of calendars or appointments between those maintained by the central website and those on local computers.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 15 is a registration screen in which a new user to the appointment system can register on-line;

FIG. 19 is an add event screen which an add event page is displayed;

FIG. 20 is an exemplary add event screen in which a new event is being requested for addition to the user's calendar via an add event page;

FIGS. 31-39 are screen depictions associated with the scheduling and confirmation of a requested appointment from the respective of two registered users.

DETAILED DESCRIPTION OF THE INVENTION

The invention relates to techniques for providing on-line appointments such that users can schedule appointments with other users over a network. The network is, for example, a global computer network such as the Internet. In other words, users are able to schedule appointments over the network by on-line means. The users are typically individuals or service providers. Service providers are normally those businesses that offer appointments to schedule their services. Numerous service providers utilize appointments. Examples of service providers include beauty shops, auto repair shops, government offices, professionals (including lawyers, dentists, doctors, accountants, etc.), and many more.

Figure 1:
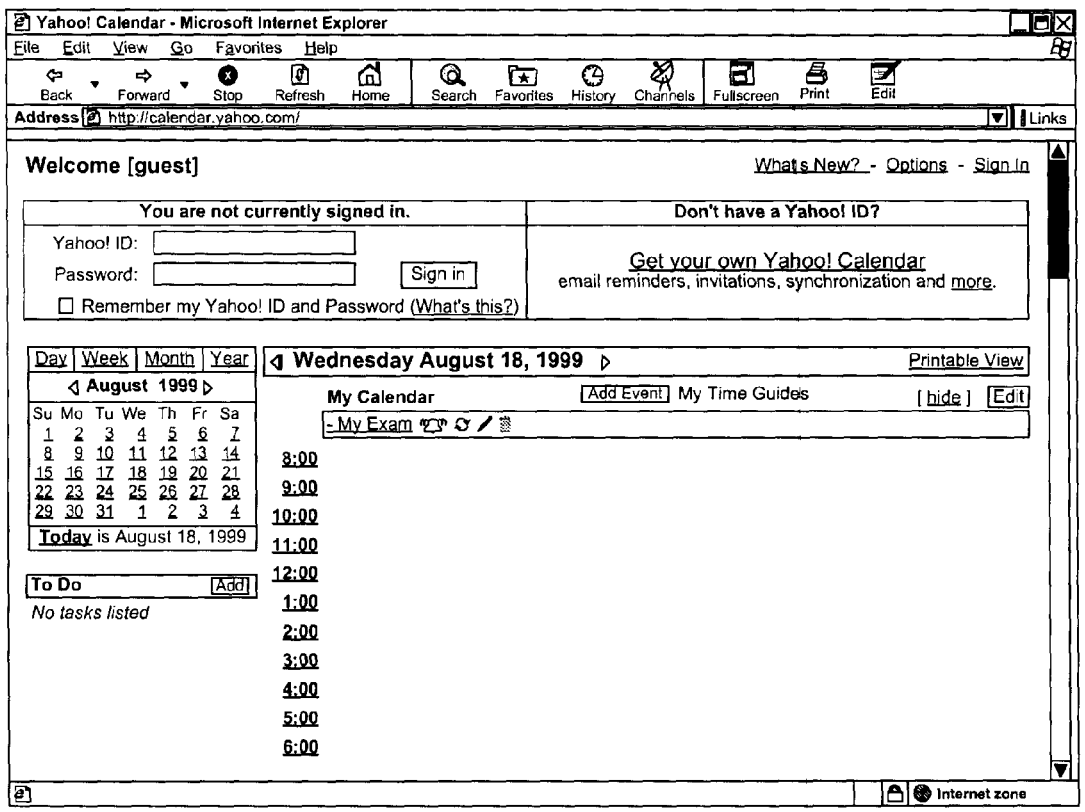
FIG. 1 is a screen shot of a web-based calendar offered by Yahoo Inc.
Figure 2A:
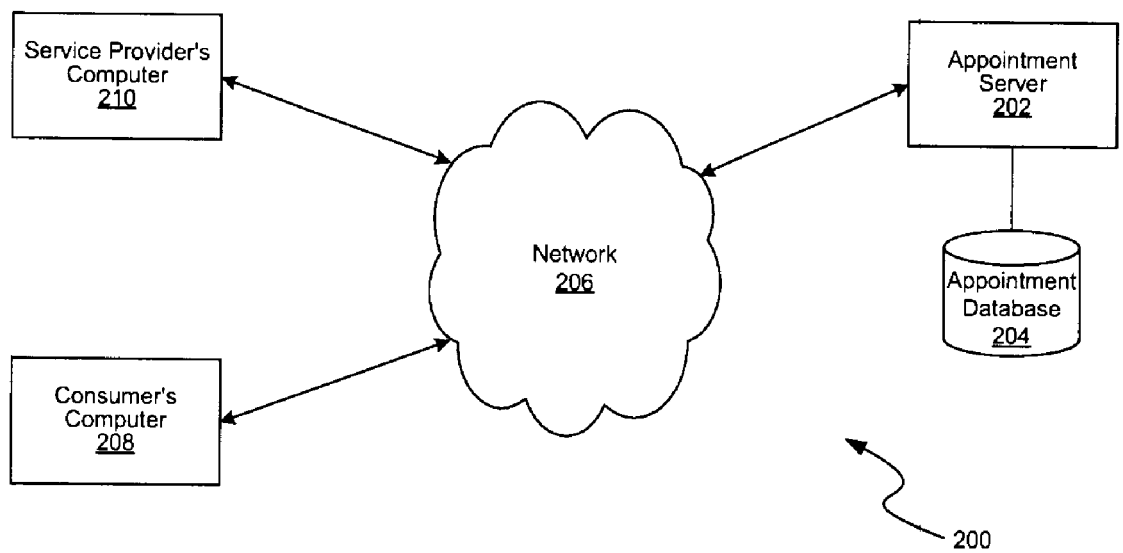
FIG. 2A is a block diagram of an on-line appointment management system according to one embodiment of the invention.

FIG. 2A is a block diagram of an on-line appointment management system 200 according to one embodiment of the invention. The on-line appointment management system 200 facilitates the making of appointments between users (e.g., consumers) and service providers. The on-line appointment management system 200 includes an appointment server 202 coupled to an appointment database 204. The appointment server 202 is also coupled to a network 206. The network 206 is, for example, a global computer network (such as the Internet) or other network (such as a local area network, a wide area network or an intranet). The network 206 can be implemented with wired technologies, wireless technologies or a combination of wired and wireless technologies. The on-line appointment management system 200 also includes a consumer's computer 208 that couples to the network 206, and a service provider's computer 210 that couples to the network 206. The computers used by consumers or service providers can take many forms and sizes, including desktop personal computers, notebook computers, personal digital assistants, portable computing devices, palm computers, etc.

The on-line appointment management system 200 allows users (e.g., consumers) to request appointments with other users (e.g., service providers), and also allows users (e.g., service providers) to accept or decline the requested appointments. For example, in one implementation, a user of the consumer's computer 208 can access the appointment server 202 through the network 206 to request an appointment with a given service provider at a particular date and time. Thereafter, the service provider can be informed of the requested appointment and then either confirm or reject the appointment.

In another implementation, the appointment server 202 also provides calendars for the users (consumers and service providers). The calendars allow the users to maintain their schedules on-line and thus accessible from various computers with access to the network 206. In this implementation, a user can still request an appointment with a service provider. Since the service provider also has a calendar, the appointment server 202 is able to determine when the service provider has time available for appointments. In requesting an appointment with the service provider, the user selects from the available appointment times. Thereafter, the service provider is notified of the requested appointment and given the opportunity to accept or decline the requested appointment. Once the requested appointment has been accepted (or confirmed), the requested appointment becomes a confirmed appointment and can appear as being "confirmed" on the respective calendars of the user and service provider.

Figure 2B:
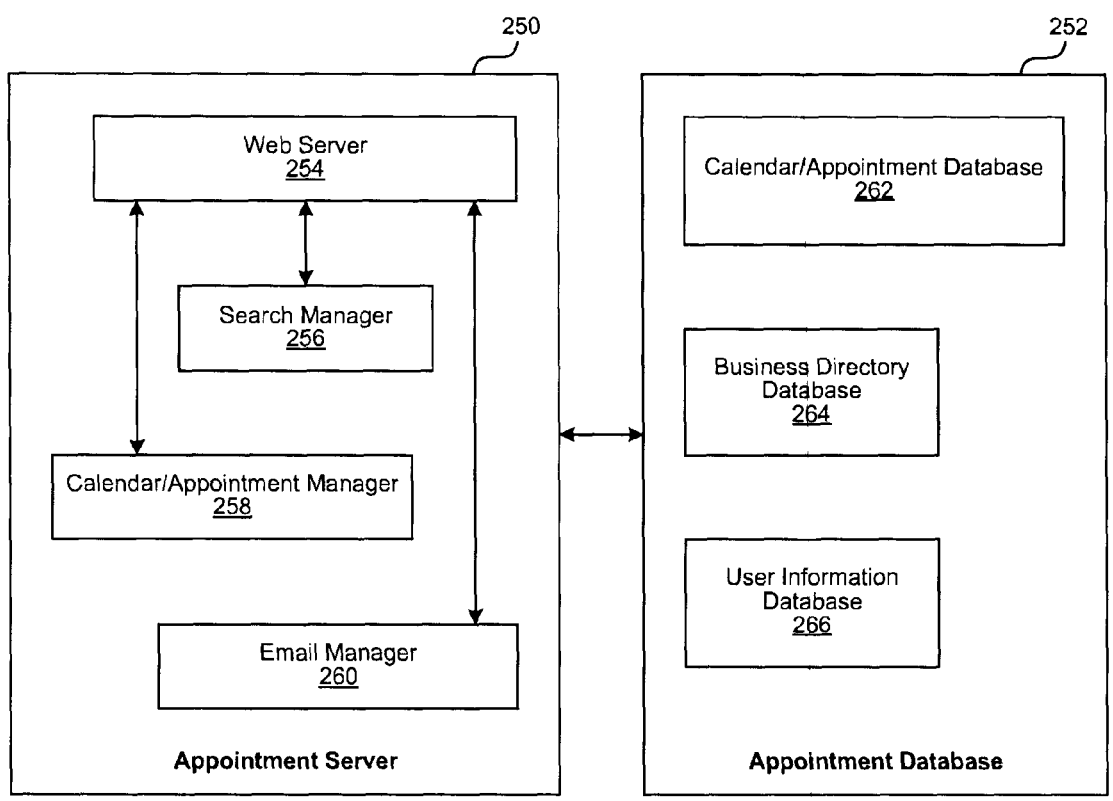
FIG. 2B is a block diagram of an appointment server and an appointment database according to one embodiment of the invention.

FIG. 2B is a block diagram of an appointment server 250 and an appointment database 252 according to one embodiment of the invention. The appointment server 250 represents a more detailed embodiment of the appointment server 202 illustrated in FIG. 2A, and the appointment database 252 represents a more detailed embodiment of the appointment database 204 illustrated in FIG. 2A.

The appointment server 250 includes a web server 254 that manages the network interaction with respect to the network 206. The web server 254 communicates or uses the resources of a search manager 256, a calendar/appointment manager 258, and an email manager 260. The search manager 256 allows the appointment server 250 to search a directory, such as a business directory, to locate businesses (i.e., service providers) of interest to a user. The calendar/appointment manager 258 provides the resources to provide users with calendars and to allow users to make appointments. The email manager 260 allows for the automatic distribution of electronic mail to provide various notifications. Each of the search manager 256, the calendar/appointment manager 258 and the email manager 260 make use of the appointment database 252 in providing their services or resources.

The appointment database 252 includes a calendar/appointment database 262, a business directory database 264, and a user information database 266. The calendar/appointment database 262 stores calendar data and appointment data for use by the appointment server 250. More particularly, the calendar/appointment manager 258 uses the data stored in the calendar/appointment database 262 when providing the users with calendars or appointment capabilities. The business directory database 264 stores a business directory that contains businesses that provides services to users. These businesses are also known as service providers. The search manager 256 of the appointment server 250 can operate to search through the business directory database 264 to identify businesses of interest to a user. The user information database 266 stores user information, such as account information, user preferences, user name, user address, user email, etc. The user information database 266 is used by the appointment server 250 to store information about users, including: user name, password, mailing address, email address, general appointment availability. The user information database 266 can also be used to improve user satisfaction by not requiring a user to repetitively enter information or provide various preferences. In addition, the email manager 260 of the appointment server 250 utilizes information in the user information database 266, namely, the email address for users to receive email notifications. Although FIG. 2B illustrates the calendar/appointment database 262, the business directory database 264, and the user information database 266 as separate databases, they could also be combined into less (e.g., one) or more databases.

Figure 3A:
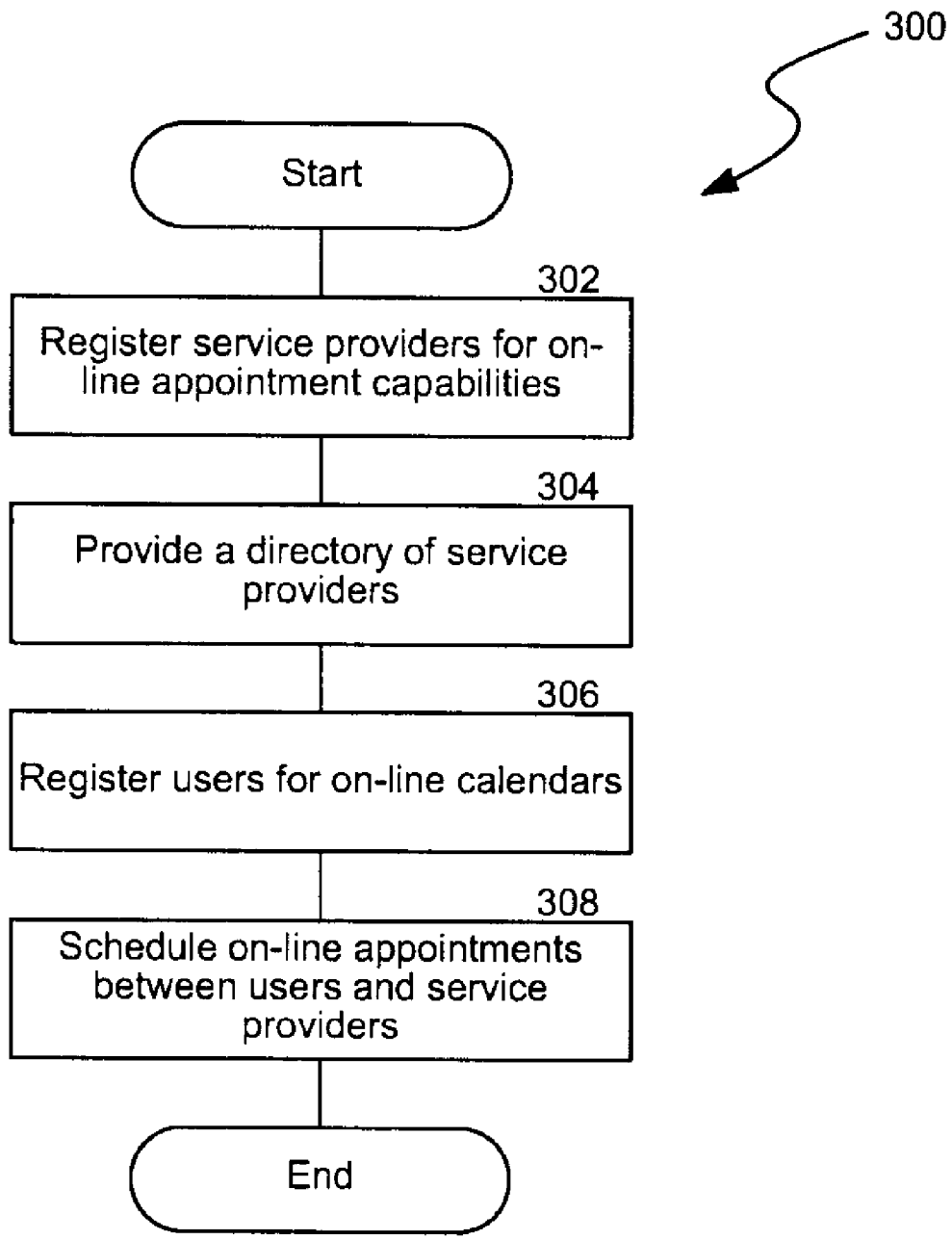
FIG. 3A is a flow diagram of an on-line appointment service processing according to one embodiment of the invention.

FIG. 3A is a flow diagram of an on-line appointment service processing 300 according to one embodiment of the invention. The on-line appointment service processing 300 registers 302 various service providers for on-line appointment capabilities. In one implementation, the registration process can identify not only contact or business information about the service providers and their offered services but also time periods of availability for appointments and particular appointment types offered. The on-line appointment service processing 300 can also provide 304 a directory of service providers that offer services which can be scheduled. The directory of service providers also allows users to search for service providers offering the types of service they desire, and then initiate an on-line appointment with such service providers as desired. In one implementation, the directory includes a plurality of categories, arranged in a hierarchy, with each of the service providers being listed in the one or more categories that relate to the services offered by the service providers.

The on-line appointment service processing 300 also registers 306 users for on-line calendars. The registration process can obtain contact information, user identifier (ID) and password, and calendar configuration information. The registration can also allow the user being registered to permit on-line appointments to be made with them. If the user permits on-line appointments to be made with them, then the registration process can also identify time periods of availability for appointments. The user ID and password provide secure access to the user's on-line calendar.

Further, the on-line appointment service processing 300 allows on-line appointments to be scheduled 308 between users and service providers. Additionally, the on-line appointment service processing 300 allows for the automatic display of appointment indications in the on-line calendars for the users or service providers, to the extent such on-line calendars are provided. Thus, scheduled appointments can appear in on-line calendars much like other events. Appointments can also be subsequently confirmed or canceled. Email notifications can also notify participants of: requested appointments, confirmation of appointments, or cancellation of appointments.

The on-line appointments can be scheduled 308 using the on-line appointment service processing 300 at any time and without the need for the service provider's office to be open for business. The on-line appointment processing 300 also is efficient, user friendly, and allows for on-line appointment management. The on-line appointments being scheduled can also be linked to (e.g., integral with) the on-line calendars of the users and service providers.

Figure 3B:
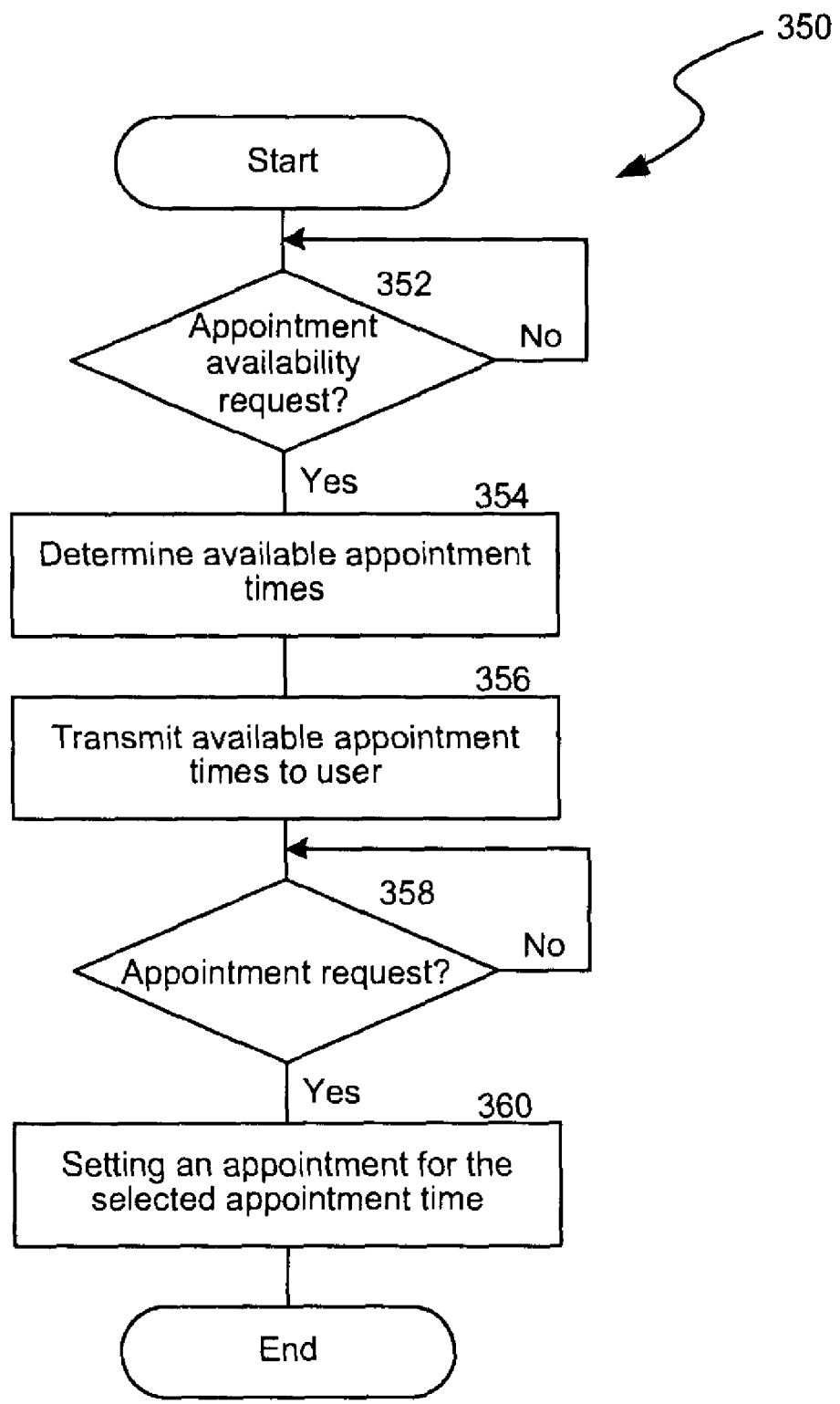
FIG. 3B is a flow diagram of appointment processing according to one embodiment of the invention.

FIG. 3B is a flow diagram of appointment processing 350 according to one embodiment of the invention. The appointment processing 350 beings with a decision 352 that determines whether an appointment availability request has been received. In other words, the appointment processing 350 does not effectively being until an appointment availability request 352 has been received.

The appointment processing 350 is, for example, performed by the appointment server 202 illustrated in FIG. 2A or the calendar/appointment manager 258 illustrated in FIG. 2B. When the decision 352 determines that an appointment availability request has been received, then available appointment times are determined 354. For example, a user may request (e.g., appointment availability request) to make an appointment with a particular service provider on a given date, and the determination 354 of the available appointment times can be determined by accessing the calendar/appointment database 262 to determine whether the particular service provider for which the appointment is requested is available.

Once the available appointment times are determined 354, the available appointment times are transmitted 356 to the user. After the available appointment times have been transmitted 356 to the user, a decision 358 determines whether an appointment request has been received. If an appointment request has not yet been received, the appointment processing 350 awaits the reception of an appointment request. Once an appointment request has been received, an appointment for the selected appointment time is set 360. For example, the appointment for the selected appointment time can be set 360 in the calendar/appointment database 262 for both the user and the service provider. After the appointment has been set 360, the appointment processing 350 is complete and ends.

Figure 4A:
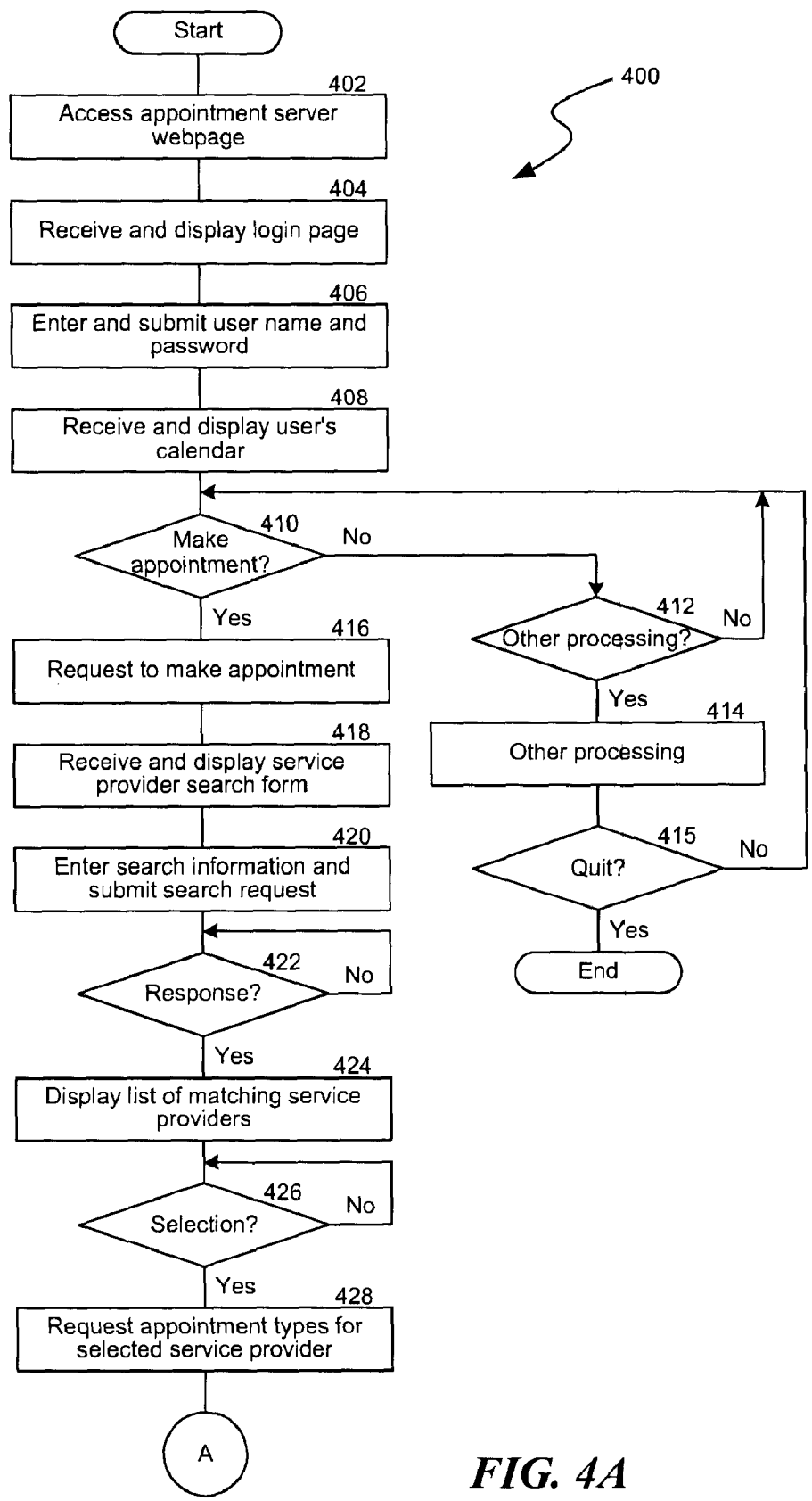
FIGS. 4A and 4B are flow diagrams of consumer-side on-line appointment processing according to one embodiment of the invention.
Figure 4B:
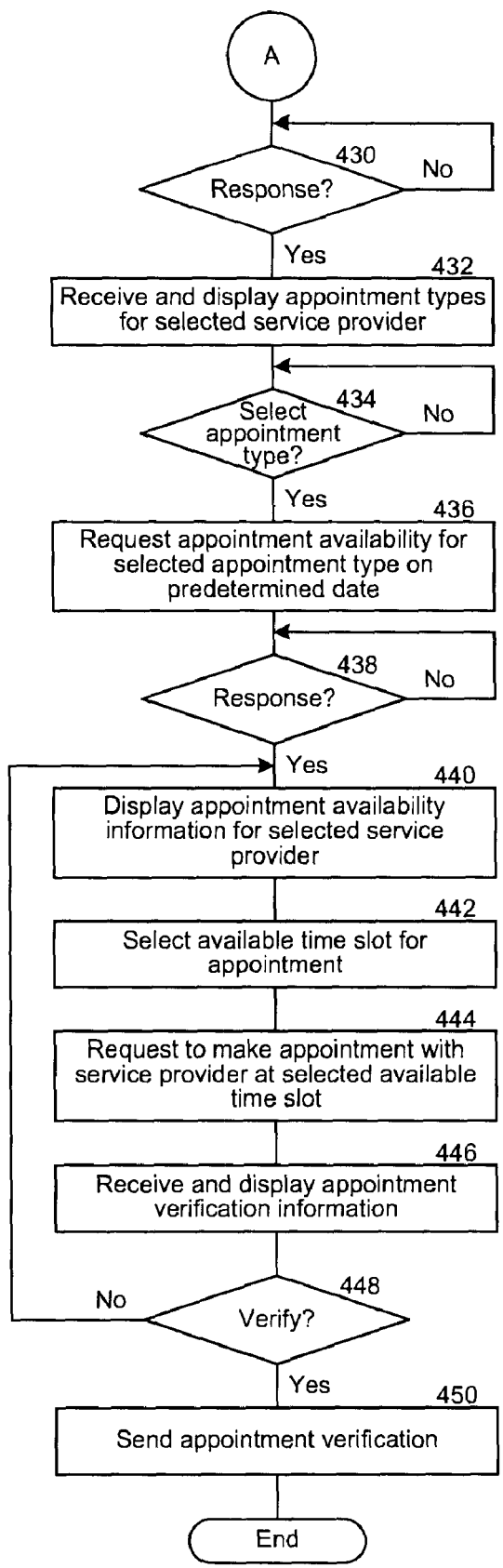

FIGS. 4A and 4B are flow diagrams of consumer-side on-line appointment processing 400 according to one embodiment of the invention. The consumer-side on-line appointment processing 400 is, for example, performed at the consumer's computer 208 illustrated in FIG. 2A.

The consumer-side on-line appointment processing 400 initially accesses 402 an appointment server web page. The appointment server web page is provided by the appointment server, e.g., appointment server 202, 250. Next, a login page is received and displayed 404. A user name and password are then entered and submitted 406. Here, the user logs onto the appointment server by completing the login page with his/her user name and password. After the appointment server has confirmed the user name and password, a user's calendar is received and displayed 408. Here, the user's calendar would be displayed on a display device associated with the consumer's computer.

At this point, the user can interact with the user's calendar being displayed to select different view or dates—so called navigation with respect to the user's calendar. Besides navigation, the user can request to add an event or make an appointment. The consumer-side on-line appointment processing 400 continues when the user requests to make an appointment. In this regard, a decision 410 determines what type of processing the user desires to perform. More particularly, a decision 410 determines whether a user desires to make an appointment. When the decision 410 determines that the user has not yet requested to make an appointment, then a decision 412 determines whether the user has requested other processing. When a user has requested other processing (e.g., navigation acts or event processing), the other processing 414 is performed and then a decision 415 determines whether to quit the consumer-side on-line appointment processing 400. When the decision 415 determines that the consumer-side on-line appointment processing 400 should quit, then the consumer-side on-line appointment processing 400 is complete and ends. On the other hand, when the decision 412 determines that the user has not requested other processing or when the decision 415 determines that the consumer-side on-line appointment processing 400 should not quit, then the consumer-side on-line appointment processing 400 returns to repeat the decision 410 and subsequent blocks.

Once the decision 410 determines that the user does desire to make an appointment, then a request 416 to make an appointment can be sent to the appointment server. After the request 416 to make an appointment has been sent, the consumer's computer will receive and display 418 a service provider search form. Search information is then entered and a search request submitted 420.

A decision 422 then determines whether a response to the search request has been received. When the decision 422 determines that a response has not yet been received, the consumer-side on-line appointment processing 400 awaits such a response. Once the decision 422 determines that a response has been received, a list of matching service providers is displayed 424. Then, the consumer-side on-line appointment processing 400 awaits the user's selection from the list of matching service providers. A decision 426 determines whether the selection has been made. When the decision 426 determines that the selection has not yet been made, the consumer-side on-line appointment processing 400 awaits such a selection.

Once the decision 426 determines that such a selection has been made, appointment types for the selected service provider are requested 428. A decision 430 then awaits a response to the request for appointment types. When the decision 430 determines that a response has not yet been received, the consumer-side on-line appointment processing 400 awaits such a response. Once the decision 430 determines that a response, namely, appointment types for the selected service provider are received, then the appointment types for the selected service provider are displayed 432.

A decision 434 then determines whether one of the appointment types being displayed 432 has been selected. When the decision 434 determines that an appointment type has not been selected, the consumer-side on-line processing 400 awaits the selection of an appointment type. Once the decision 434 determines that an application type has been selected, appointment availability for the selected appointment type on a predetermined date is requested 436. The consumer-side on-line appointment processing 400 then awaits a response to the request 436 for appointment availability.

When the decision 438 determines that a response has been received, appointment availability information for the selected service provider is displayed 440. The appointment availability information includes at least available time slots for appointments with the selected service provider. Next, an available time slot is selected 442 for the appointment being processed. Here, the user selects an available time slot from those being displayed 440 with the appointment availability information.

Once an available time slot is selected 442, an appointment with the service provider at the selected available time slot is requested 444. Thereafter, appointment verification information is received and displayed 446. The appointment server presents the appointment verification information to the user. A decision 448 then determines whether the appointment has been verified. Here, the user can either proceed with the making of the appointment if the appointment verification information is correct or repeat some or all of the making of the appointment if the appointment verification information is incorrect. When the decision 448 determines that the appointment has not been verified, then the consumer-side on-line appointment processing 400 returns to repeat the operation 440 and subsequent operations so that the appointment being made can be altered. On the other hand, when the decision 448 determines that the appointment has been verified, appointment verification is sent 450. The consumer-side on-line appointment processing 400 is then complete and ends with the appointment having been made.

Although user's calendars could be shared with a group of users or made public, in this embodiment, the user's calendar is likely private to the user because the user name and password are required for access to the user's calendar. Hence, users are not able to view or modify other's calendars or make appointments for others. In requesting an appointment with another (i.e., service provider), the available time slots pertain to the service provider's calendar. However, only the available time slots for potential appointments are display to the requestor, not the service provider's entire calendar. Further, in another embodiment, a user (e.g., service provider) may want to limit the number of available time slots shown as being available to a user requesting an appointment, so as to prevent giving the impression of not being busy. In yet another embodiment, a user (e.g., service provider) may want to bias those users requesting appointment to certain time slots. For example, the available time slots could be biased to within the morning office hours to encourage morning appointments. By providing only or primary morning time slots, users would be biased towards requesting a morning appointment. As another example, different types of appointments could be provided with different available time slots through different biasing or different availability given the appointment types.

Figure 5A:
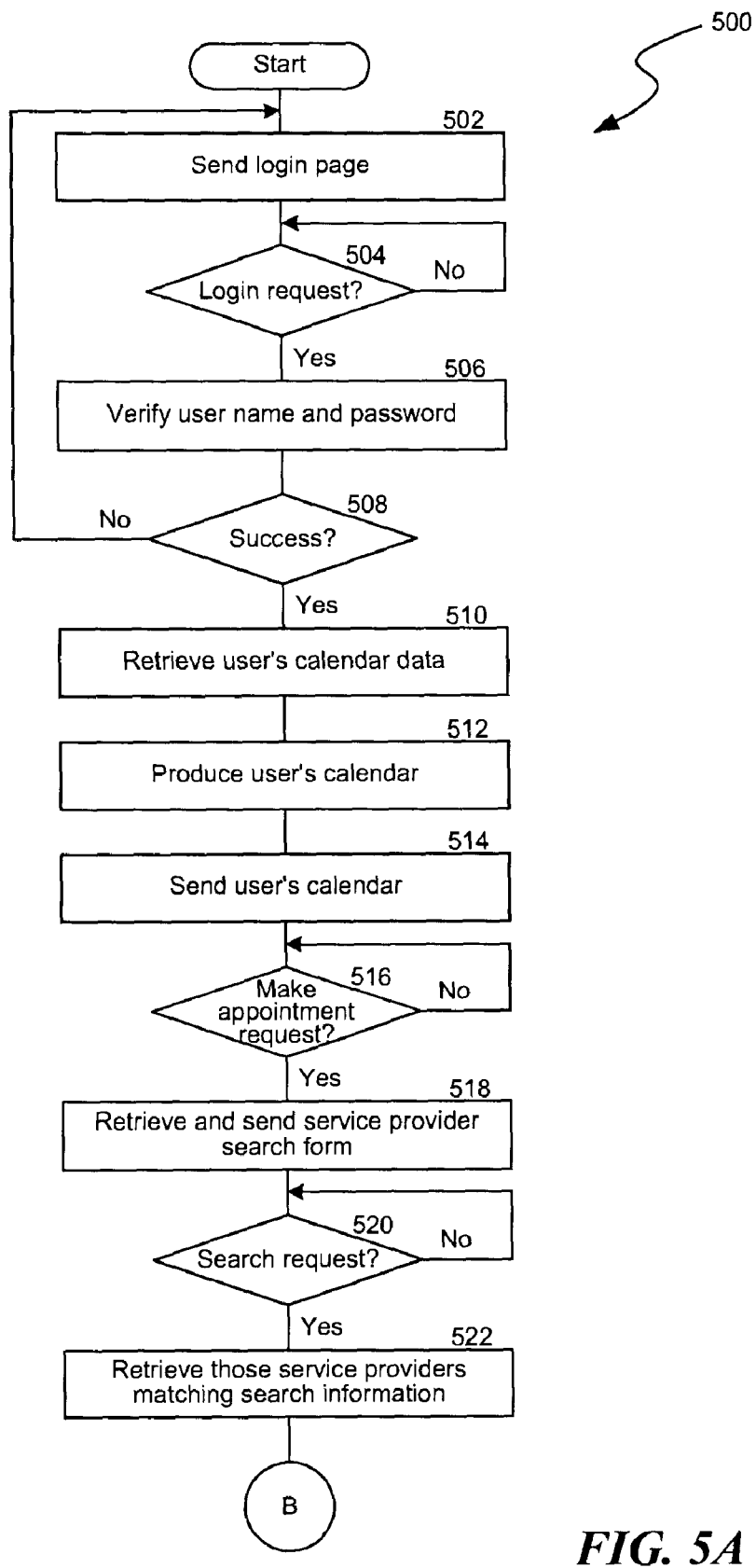
FIGS. 5A-5C are flow diagrams of server-side on-line appointment processing according to one embodiment of the invention.
Figure 5B:
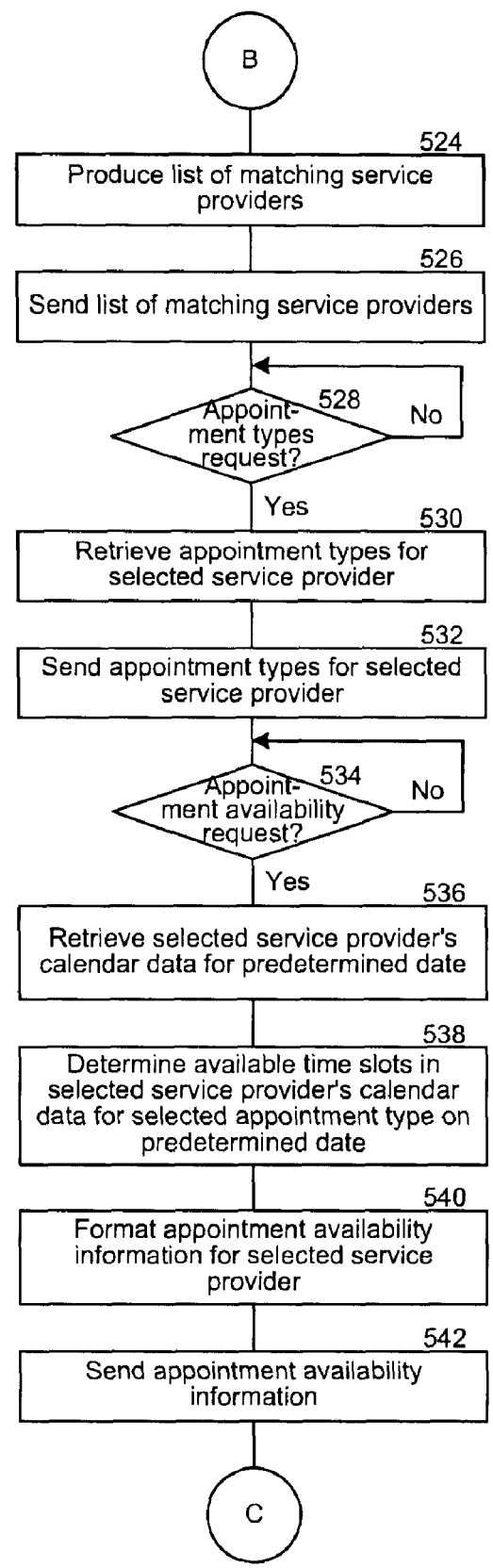
Figure 5C:
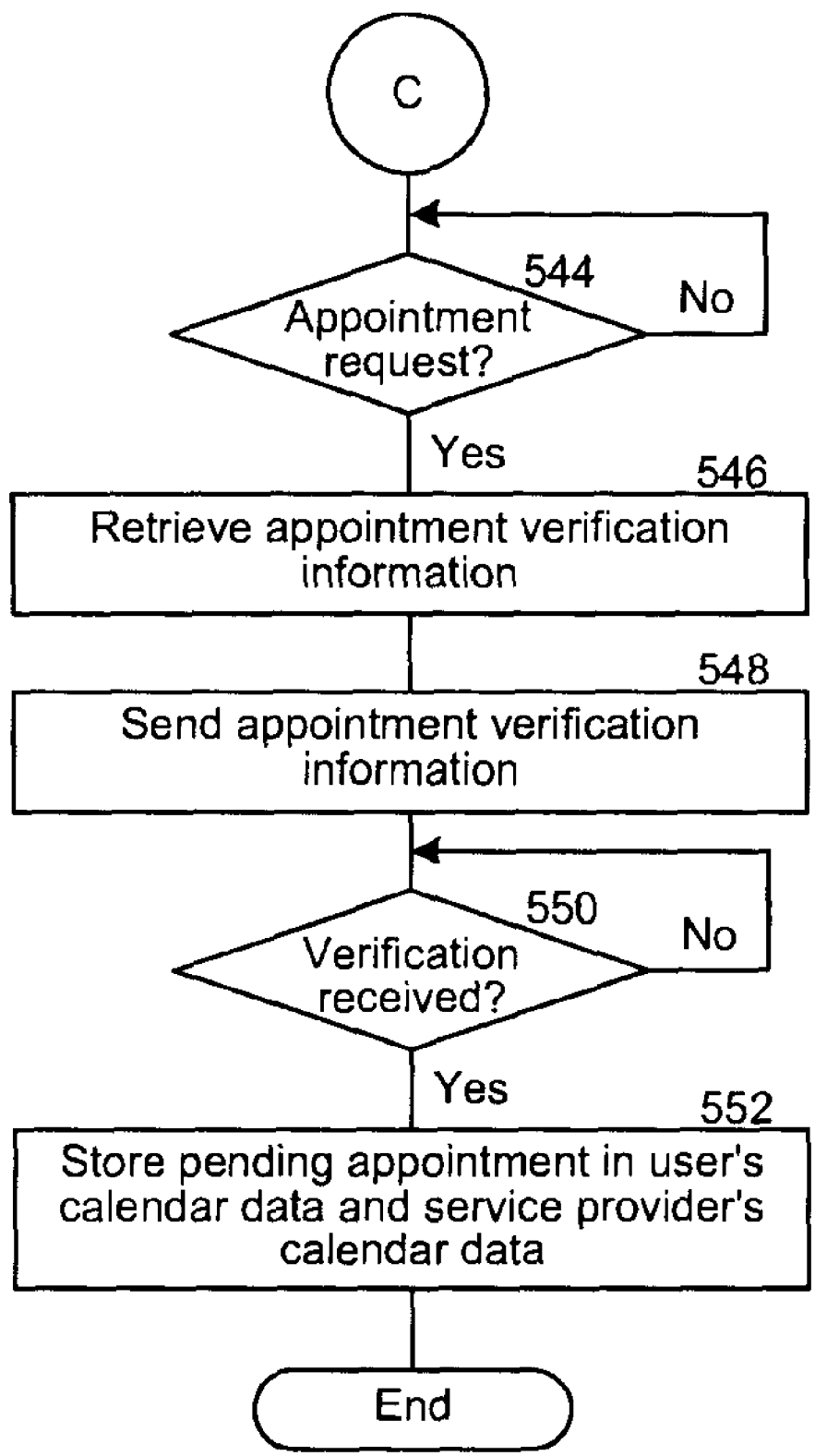

FIGS. 5A-5C are flow diagrams of server-side on-line appointment processing 500 according to one embodiment of the invention. The server-side on-line appointment processing 500 is, for example, performed by the appointment server 202 illustrated in FIG. 2A or the appointment server 250 illustrated in FIG. 2B.

The server-side on-line appointment processing 500 initially sends 502 a login page to a requesting user. Then, a decision 504 determines whether a login request has been received. When the decision 504 determines that a login request has not been received, the server-side on-line appointment processing 500 awaits such a login request. Once the decision 504 determines that a login request has been received, the user name and password associated with the login request are verified 506. A decision 508 then determines whether the verification has been successful. When the decision 508 determines that the verification has not been successful (e.g., login denied), the server-side on-line appointment processing 500 returns to repeat the send operation 502 and subsequent operations to handle subsequent login requests.

On the other hand, when the decision 508 determines that the verification has been successful (e.g., login granted), a user's calendar data is retrieved 510. For example, the user's calendar data can be retrieved from the appointment database 204 illustrated in FIG. 2A or the calendar/appointment database 262 of the appointment database 252 illustrated in FIG. 2B. A user's calendar is then produced 512 from the user's calendar data. Here, in one embodiment, the user's calendar can be produced 512 by suitably formatting the user's calendar data into a graphical user interface. As an example, the user's calendar can be produced as a markup language document (page)(e.g., HTML page). After the user's calendar is produced 512, the user's calendar is sent 514. Here, the user's calendar can be sent to the user through the network 206.

Next, a decision 516 determines whether a request to make an appointment has been received. The decision 516 causes the server-side on-line appointment processing 500 to await the reception of a request to make an appointment. Although other types of requests could be made, including an event request, the server-side on-line appointment processing 500 is primarily concerned with the making of appointments. Once the decision 516 determines that a request to make an appointment has been received, a service provider search form is retrieved and sent 518. For example, the service provider search form can be used to assist a user in locating a particular service provider registered with the appointment database 204 or the business directory database 264 of the appointment database 252.

A decision 520 then determines whether a search request has been received. Here, a search request results when the user completes and submits the service provider search form. The decision 520 causes the server-side on-line appointment processing 500 to await the reception of a search request. Once the decision 520 determines that a search request has been received, the service providers that match the search information are retrieved 522. For example, the search can search through the business directory database 264 of the appointment database 252 to identify those service providers that match the provided search information. Then, a list of matching service providers is produced 524. The list of matching service providers is then sent 526.

A decision 528 then determines whether a request for appointment type has been received. A request for appointment type results when the user selects one of the service providers from the list of matching service providers. IIn other embodiments, a service provider can additionally or alternatively be chosen by use of an address book or from a preferred provider directory where a directory search is not needed. When the decision 528 determines that a request for appointment type has not yet been received, the server-side appointment processing awaits such a request. Once the decision 528 determines that a request for appointment types has been received, appointment types for the selected service provider are retrieved 530. For example, the appointment types can be retrieved from the appointment database. After the appointment types are retrieved 530, the appointment types for the selected service provider are sent 532.

A decision 534 then determines whether a request for appointment availability has been received. A request for appointment availability results when the user selects one of the appointment types available for the selected service provider. When the decision 534 determines that a request for appointment availability has not yet been received, the server-side on-line appointment processing 500 awaits such a request. Once the decision 534 determines that a request for appointment availability has been received, the selected service provider's calendar data for the predetermined date is retrieved 536. The service provider's calendar data is, for example, retrieved 536 from the appointment database 204 or the calendar/appointment database 262 of the appointment database 252. After the service provider's calendar data is retrieved 536, available time slots in the selected service provider's calendar data for the selected appointment type on the predetermined date are determined 538. In one implementation, the selected appointment type can identify the duration of the appointment to be scheduled. In another implementation, the duration of the appointment to be scheduled can be indicated by the requestor. Appointment availability information is then formatted 540 for the selected service provider. Here, the appointment availability information can, for example, include the available time slots for the selected service provider as well as the users calendar. Such an arrangement of information allows a user to easily Schedule an appointment with the available time slots of the service provider while having the user's calendar visible. The appointment availability information can be formatted as a markup language document (page) (e.g., HTML). The appointment availability information is then sent 542.

Next, a decision 544 determines whether an appointment request has been received. Here, an appointment request results when the user selects one of the available time slots provided with the appointment availability, information. When the decision 544 determines that an appointment request has not yet been received, the server-side on-line appointment processing 500 awaits such a request. Once the decision 544 determines that an appointment request has been received, appointment verification information is retrieved 546. The appointment verification information is used to enable the user to reconfirm the details of the appointment being requested. Then, the appointment verification information is sent 548.

A decision 550 then determines whether a verification has been received. When the decision 550 determines that a verification has been received, a pending appointment is stored 552 in the user's calendar data and the service provider's calendar data. On the other hand, when the decision 550 determines that a verification has not been received, namely, that verification was denied, the operation 552 is bypassed. The denial of verification can lead to cancellation of the appointment being scheduled or returning to earlier processing to allow the user to alter the appointment being requested. Following block 552 as well as following the decision block 550 when there has been no verification the server-side on-line appointment processing 500 is complete and ends.

Figure 5D:
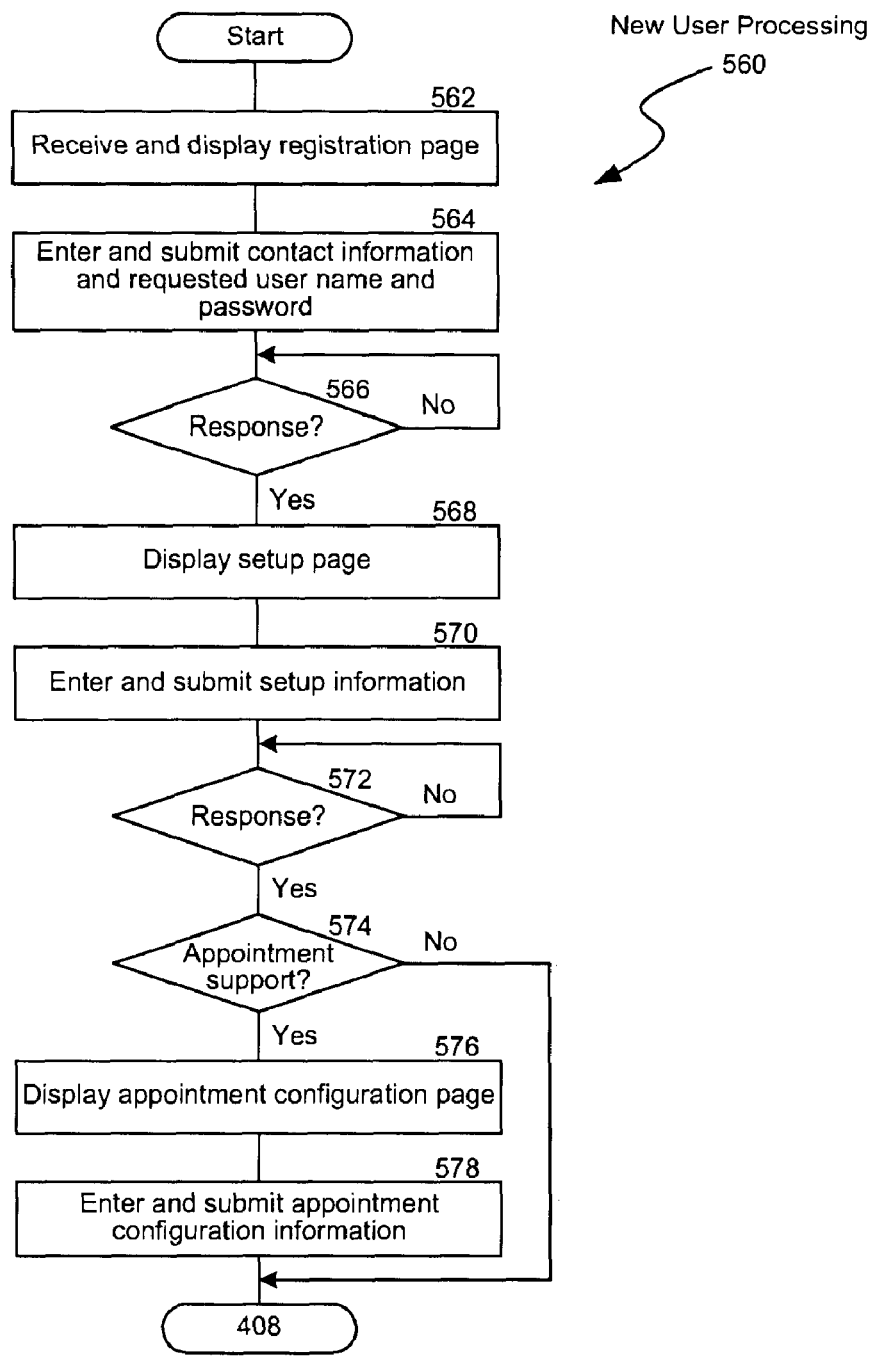
FIG. 5D is a flow diagram of client-side new user processing according to one embodiment of the invention.
Figure 5E:
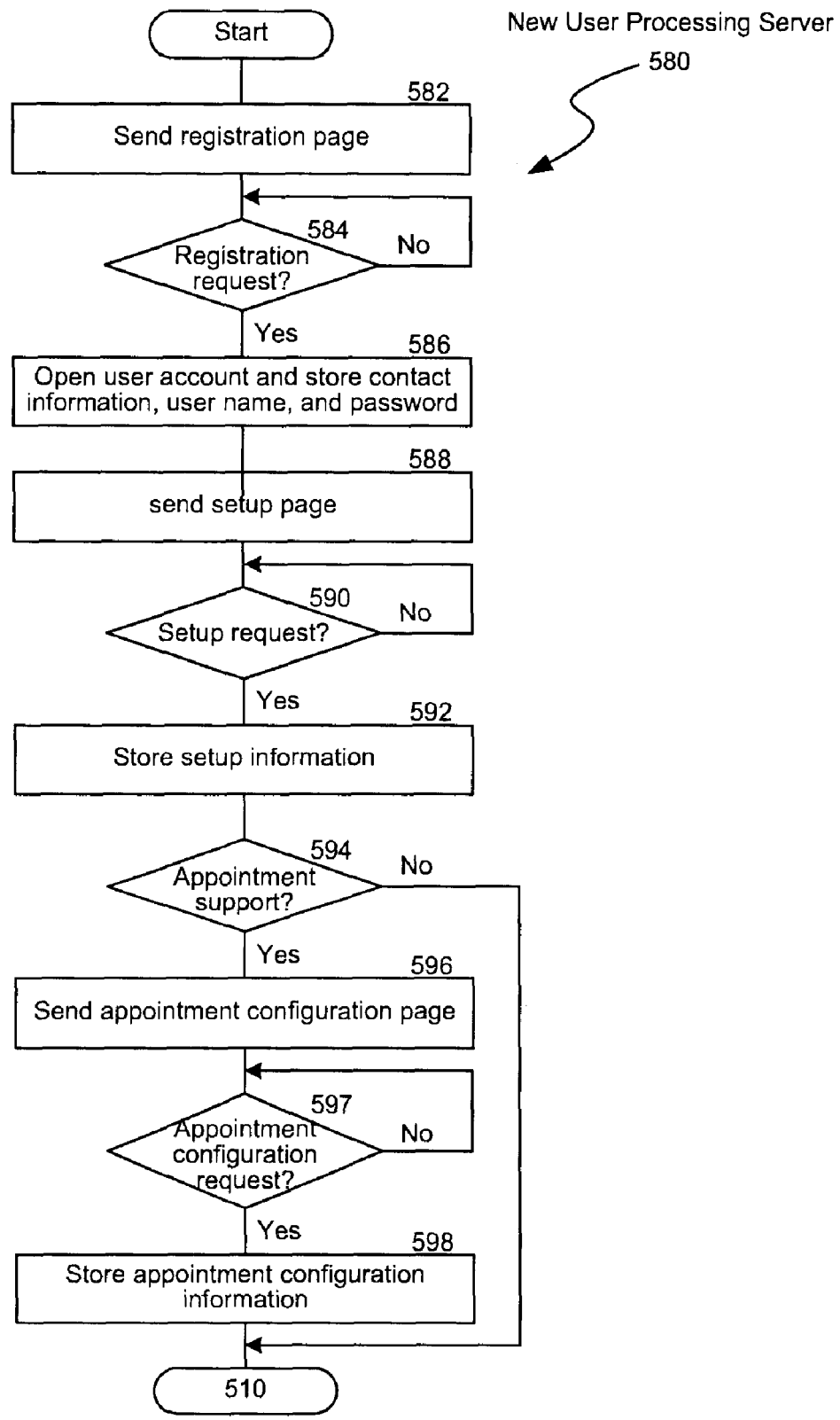
FIG. 5E is a flow diagram of server-side new user processing according to one embodiment of the invention.

Before calendar and appointment capabilities are provided to users, certain information is normally obtained from the users. This information includes, for example, contact information, setup information, and appointment configuration information. FIGS. 5D and 5E describe registration processing in which such information can be obtained.

FIG. 5D is a flow diagram of client-side new user processing 560 according to one embodiment of the invention. The client-side new user processing 560 is used to register new users with the on-line appointment system. The client-side new user processing 560 is, for example, performed by a network browser operating on a computer. As an example, the client-side new user processing 560 can operate on a consumer's computer, such as the consumer's computer 208 illustrated in FIG. 2A, or a service provider's computer, such as the service provider's computer 210 illustrated in FIG. 2A. An exemplary network browser is Internet Explorer from Microsoft Corporation.

The client-side new user processing 560 initially receives and displays 562 a registration page. The registration page allows a new user to the system to provide information about themselves. The information provided typically includes contact information as well as a requested user name and password. In one implementation, the contact information can include: first name, last name, company name, address, city, state/province, country, zip/postal code, telephone number, and email address. The user interacts with the registration page being displayed to enter the contact information and the requested user name and password. Here, the contact information and the requested user name and password are entered and submitted 564. Once submitted, the client-side new user processing 560 awaits a response from the server.

A decision 566 determines whether a response has been received. When the decision 566 determines that the response has not yet been received, the client-side new user processing 560 awaits such a response. Once the response has been received, a setup page is displayed 568. Then, setup information is entered and submitted 570. Here, the setup page can ask the user to provide setup information regarding the setup of their on-line calendar and appointment capabilities. The user provides this setup information by interacting with the setup page being displayed. In one implementation, the setup information can include: selecting a default view for a calendar, setting a default time range for the calendar, setting a time zone for the calendar, indicating whether email notifications for scheduled appointments are requested, and indicating whether others are able to schedule appointments with the user. In any case, after the setup information is entered and submitted 570, the client-side new user processing 560 awaits a response from the server. A decision 572 determines whether a response has been received. The response from the server will differ depending upon whether the user has allowed others to schedule appointments with them. A decision 574 determines whether appointment support has been enabled. When the decision 574 determines that the appointment support has been enabled, an appointment configuration page is displayed 576 after the response from the server is received. Here, when appointment support has been enabled, the response from the submission of the setup information 570 is the appointment configuration page. After the appointment configuration page is displayed 576, appointment configuration information is entered and submitted 578. The user provides the appointment configuration information by interacting with the appointment configuration page being displayed. The appointment configuration information is used to configure the operation of the appointment scheduling. For example, the appointment configuration information can indicate days and times of availability and non-availability for appointments, types of appointments that can be made as well as their duration, and whether appointments should be confirmed automatically or not. As an example, one's availability for scheduling appointments during a week can be setup so that appointments can be scheduled only on certain days (e.g., Monday-Friday), within certain time periods, and by further exclusion of certain time periods (e.g., lunch hour). The types of appointments can also be classified by industry or other categories. Following the submission 578 of the appointment configuration information, the client-side new user processing 560 ends and processing follows block 408 illustrated in FIG. 4A.

On the other hand, when the decision 574 determines that appointment support is not enabled, then the response from the submission 560 of the setup information is that the processing of the client-side new user processing 560 ends. Hence, in this case, the client-side new user processing 560 subsequently follows the processing beginning at block 408 illustrated in FIG. 4A without the need to request appointment configuration information.

FIG. 5E is a flow diagram of server-side new user processing 580 according to one embodiment of the invention. The server-side new user processing 580 interacts with the client-side new user processing 560 illustrated in FIG. 5D. The server-side new user processing 580 is, for example, performed by the appointment server 202 illustrated in FIG. 2A or the appointment server 250 illustrated in FIG. 2B.

The server-side new user processing 580 initially sends 582 a registration page to the user's computer. Then, a decision 584 causes the appointment server to await a registration request from the user's computer. When the decision 584 determines that a registration request has not yet been received, the server-side new user processing 580 awaits such a request. Once the decision 584 determines that a registration request has been received, a user account is opened and contact information, user name and password are stored 586. In one implementation, the user account can be opened or provided within the appointment database, such as the appointment database 204 illustrated in FIG. 2A or the appointment database 252 illustrated in FIG. 2B. For example, the user account and the contact information, user name and password can be stored in the user information database 266 illustrated in FIG. 2B.

Next, a setup page is sent 588. The setup page allows the user to enter setup information to specify, for example, how the user would like the default calendar setup and whether or not others are able to schedule appointments with them. Next, a decision 590 determines whether a setup request has been received. Here, the decision 590 determines whether the client-side new user processing 560 has submitted the setup information with a setup request. When the decision 590 determines that a setup request has not yet been received, the server-side new user processing 580 awaits such a request. Once the decision 590 determines that a setup request has been received, the setup information provided with the setup request is stored 592. In one implementation, the setup information is stored in the appointment database, such as the appointment database 204 illustrated in FIG. 2A or the appointment database 252 illustrated in FIG. 2B. For example, the setup information can be stored in the user information database 266 illustrated in FIG. 2B.

A decision 594 then determines whether appointment support has been enabled. Here, the setup information informs the server whether the user desires to enable others to schedule appointments with them. When the decision 594 determines that appointment support has not been requested, then the server-side new user processing 580 is complete and processing returns to block 510 in FIG. 5A so that the user's calendar can be obtained and displayed. On the other hand, when the decision 594 determines that appointment support has been requested, then an appointment configuration page is sent 596. The appointment configuration page provided by the server to the client enables the user at the client-side to enter appointment configuration information so that appointments can be more intelligently scheduled. After the appointment configuration page has been sent 596, a decision 597 determines whether an appointment configuration request has been received. This represents the return of the appointment configuration page from the user via the client-side new user processing 560. When the decision 597 determines that an appointment configuration request has not yet been received, the server-side new user processing 580 awaits such a request. Once the decision 597 determines that an appointment configuration request has been received, appointment configuration information provided with the appointment configuration request is stored 598. In one implementation, the appointment configuration information can be stored in the appointment database 204 illustrated in FIG. 2A or the user information database 266 of the appointment database 252 illustrated in FIG. 2B. After the appointment configuration information is stored 598, the server-side new user processing 580 is complete and the processing returns to block 510 illustrated in FIG. 5A.

Figure 6:
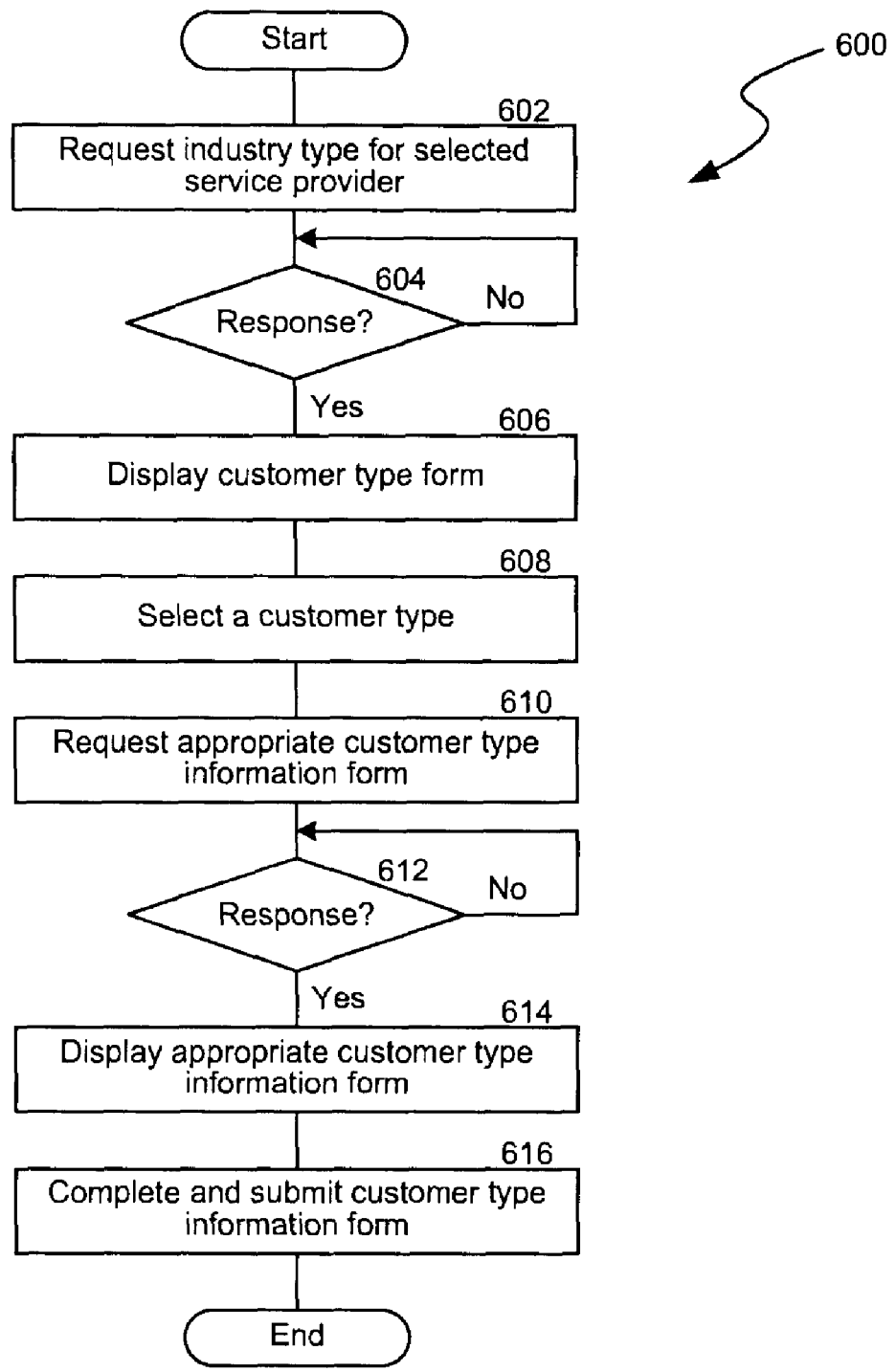
FIG. 6 is a flow diagram of client-side appointment-type processing according to one embodiment of the invention.
Figure 7:
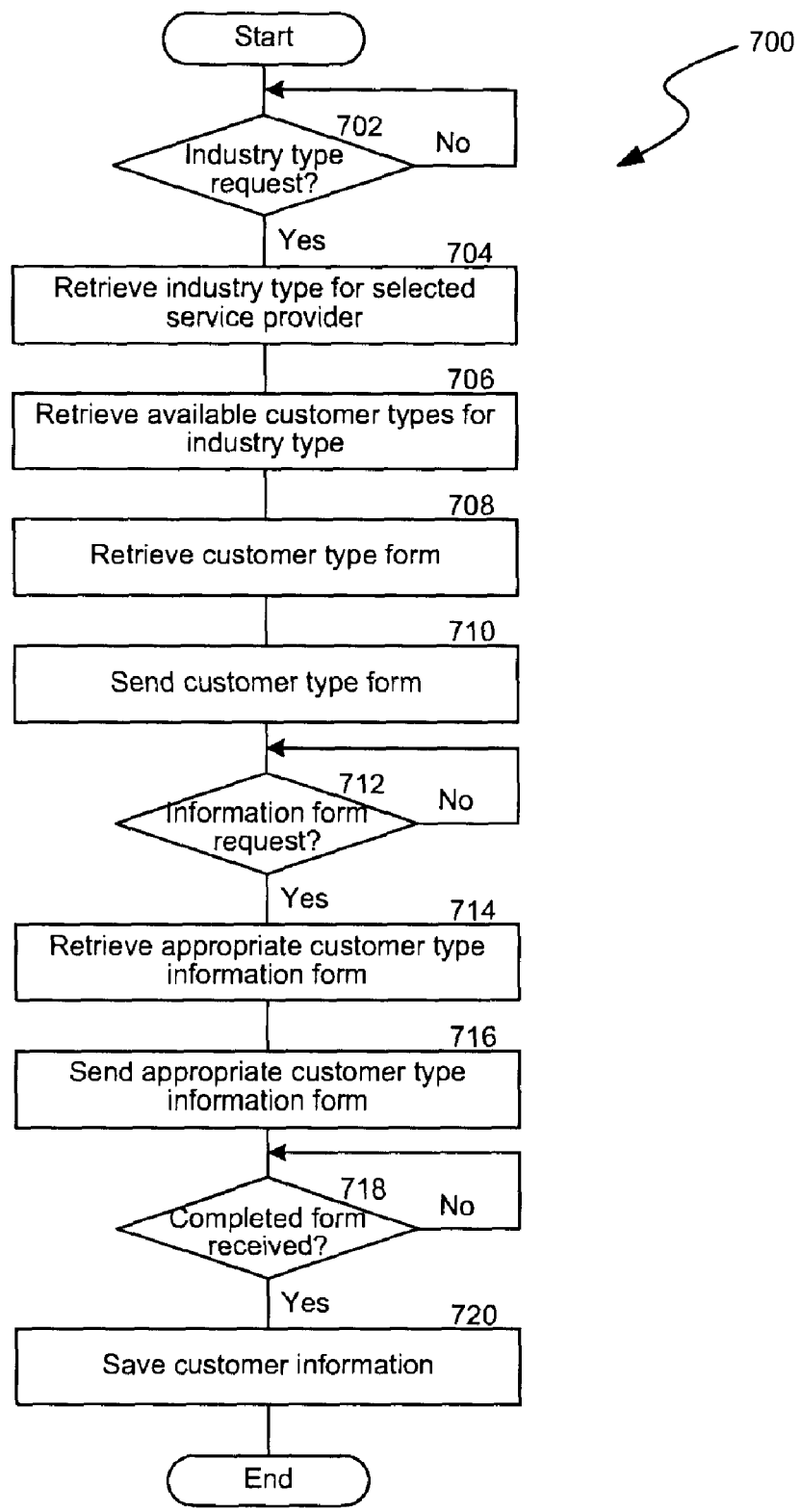
FIG. 7 is a flow diagram of server-side appointment type processing according to one embodiment of the invention.

The client-side on-line appointment processing 400 and the server-side on-line appointment processing 500 can be modified to obtain additional appointment information from a user. For example, in making certain types of appointments, some service providers desire to obtain additional information about the user. For example, in a case where a user is making an appointment with a dentist (service provider), the dentist often wants to know if the user is a new patient or an existing patient. For new patients, a patient normally has to fill out a questionnaire. For existing patients, no questionnaire is needed but confirmation of similar information could be performed. As another example, an auto repair business (service provider) may want to obtain information on the owner and vehicle. Hence, the additional information gathered often varies with industry and type of consumer (user). FIGS. 6 and 7 describe appointment type processing in which such additional appointment information can be obtained according to one embodiment of the invention.

FIG. 6 is a flow diagram of client-side appointment-type processing 600 according to one embodiment of the invention. The client-side appointment-type processing 600 is, for example, performed by the consumer's computer 208 illustrated in FIG. 2A.

The client-side appointment-type processing 600 represents optional processing that can enhance the client-side on-line appointment processing 400 illustrated in FIGS. 4A and 4B. In particular, the client-side on-line appointment processing 600 can, in one embodiment, be performed following the decision 426 and prior to the request 428 illustrated in FIG. 4A.

The client-side appointment-type processing 600 initially requests 602 an industry-type for the selected service provider. Here, the selection of one of the service providers causes the request for the industry type. Next, a decision 604 determines whether a response from the appointment server has been received. Here, the response is a consumer type form that is provided to the consumer's computer from the appointment server. When the decision 604 determines that the response has not yet been received, the client-side appointment-type processing 600 awaits such a response. Once the decision 604 determines that the response has been received, the customer type form is displayed. For example, the customer type form would be displayed on a display screen associated with the consumer's computer. Then, a customer type is selected 608. The customer type form thus enables the user to identify the type of customer they are (e.g., new or existing) to the appointment server. For example, the user of the consumer's computer can make a selection with respect to the customer type form being displayed on the display screen. For example, if the service provider were a dentist, the customer type form could provide options for the user to designate themselves as a new patient or an existing patient. After the customer type has been selected 608, an appropriate customer type information form is requested 610. In other words, once the customer type has been selected, a request is sent to the appointment server requesting 610 the customer type information form that is associated with the selected customer type. Next, a decision 610 determines whether a response has been received. Here, the response is the appropriate customer type information form that is provided by the appointment server. When the decision 612 determines that the response to the request 610 has not yet been received, then the client-side appointment type processing 600 awaits such a response. Once the decision 612 determines that the response has been received, the appropriate customer type information form is displayed 614. For example, the appropriate customer type information form can be displayed on the display screen associated with consumer's computer. Thereafter, the customer type information form is completed and submitted 616. Here, for example, the user of the consumer's computer would interact with the customer type information form being displayed to enter information and then once the customer type information form has been sufficiently completed would submit the form to the appointment server 202. After the completion and submission of the customer type information form, the client-side appointment-type processing 600 is complete and ends.

FIG. 7 is a flow diagram of server-side appointment type processing 700 according to one embodiment of the invention. The server-side appointment type processing 700 is, for example, performed by the appointment server 202 illustrated in FIG. 2A or the appointment server 250 illustrated in FIG. 2B.

The server-side appointment type processing 700 represents optional processing associated with the server-side on-line appointment processing 500 illustrated in FIGS. 5A-5C. In particular, the server-side appointment type processing 700 is optional processing can, in one embodiment, be performed following the decision 528 and prior to retrieving 530 illustrated in FIG. 5B.

The server-side appointment type processing 700 begins with a decision 702 that determines whether an industry type request has been received. When the decision 702 determines that an industry type request has not yet been received, the server-side appointment type processing 700 awaits such a request. Once the decision 702 determines that an industry type request has been received, an industry type for the selected service provider is retrieved 704. Then, available customer types for the industry types are retrieved 706. As an example, the industry types and available customer types can be retrieved from the appointment database 204 illustrated in FIG. 2A or the appointment database 252 illustrated in FIG. 26. Next, a customer type form is retrieved 708. The customer type form can be predetermined or dynamically generated. The customer type form is then sent 710. The customer type form is sent 710, for example, to the consumer's computer where it is received and displayed as described in the client-side appointment type processing 600 illustrated in FIG. 6.

Next, a decision 712 determines whether an information form request has been received. When the decision 712 determines that an information form request has not yet been received, the server-side appointment type processing 700 awaits such a request. Once the decision 712 determines that an information form request has been received, the appropriate customer type information form is retrieved 714. Then, the appropriate customer type information form is sent 716.

A decision 718 next determines whether a completed form has been received. Here, the server-side appointment type processing 700 is awaiting the submission of the customer type information form from the client-side appointment type processing 600. When the decision 718 determines that the completed form has not yet been received, the server-side appointment type processing 700 awaits the reception of the completed form. Once the decision 718 determines that the completed form has been received, the customer information provided in the completed form is saved 720. For example, the customer information is saved 720 in the appointment database 204 or the user information database 266 of the appointment database 252. Thereafter, the server-side appointment type processing 700 is complete and ends.

After a consumer (user) has interacted with an appointment server to request an appointment with a service provider, the service provider can be given an opportunity to review the requested appointments from various consumers and either accept or decline the requested appointments.

Figure 8A:
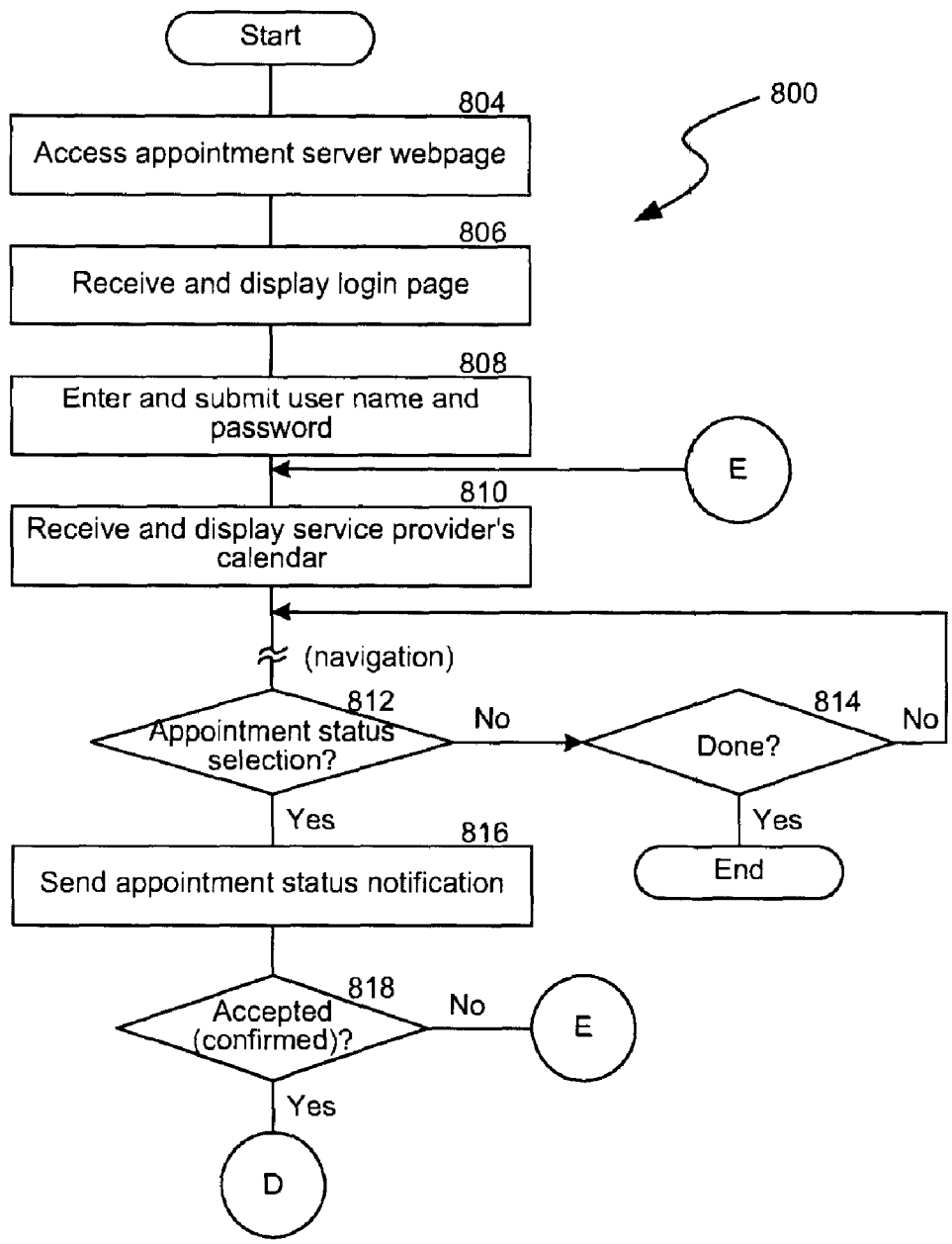
FIGS. 8A and 8B are flow diagrams of service provider appointment review processing according to one embodiment of the invention.
Figure 8B:
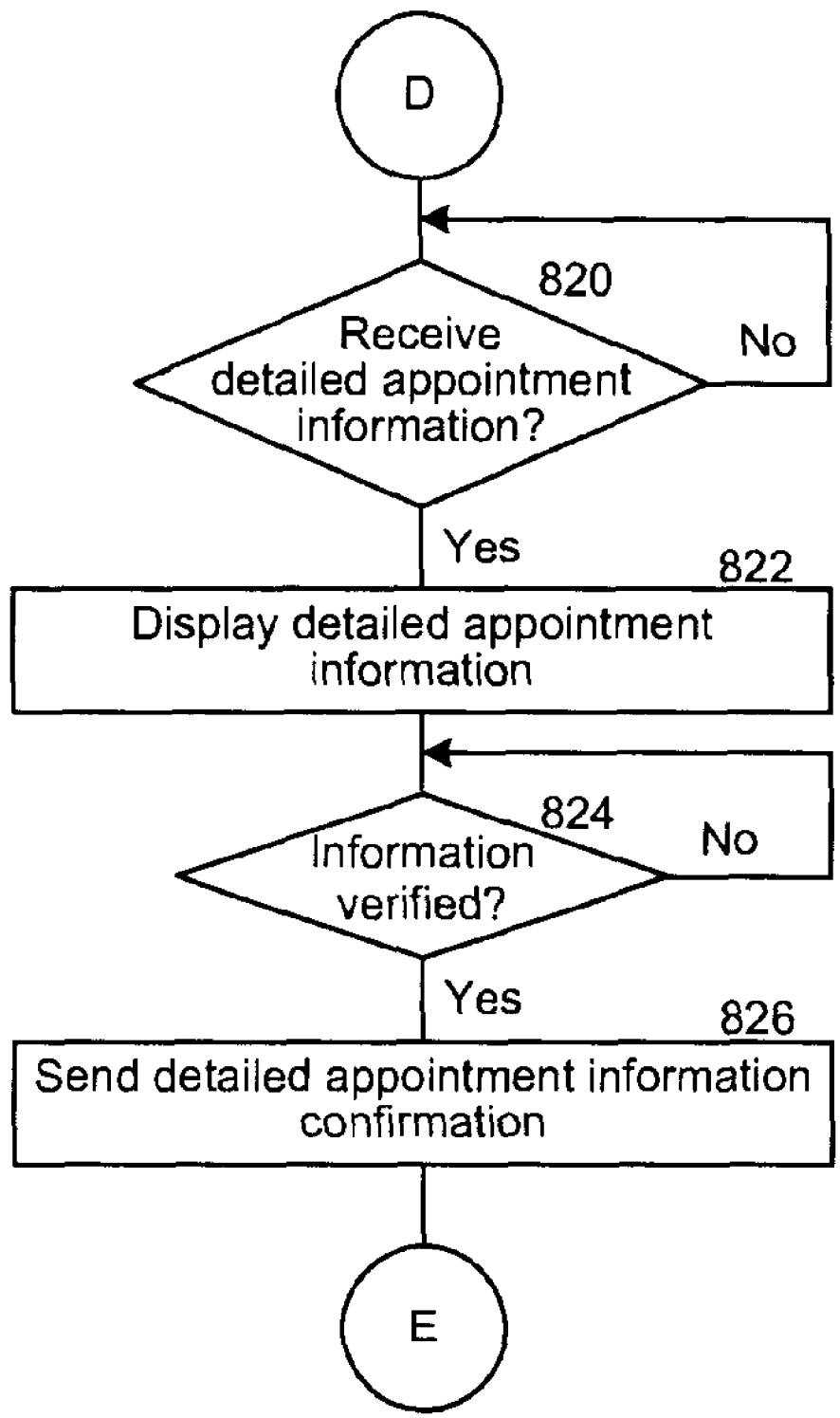

FIGS. 8A and 8B are flow diagrams of service provider appointment review processing 800 according to one embodiment of the invention. The service provider appointment review processing is, for example, performed on the service provider's computer 210. Typically, the service provider appointment review processing 800 would be performed in conjunction with a network browser operating on the service provider's computer 210.

The service provider appointment review processing 800 typically begins sometime after an email notification has been received by the service provider. More particularly, in one embodiment, the service provider is provided with an email notification when a consumer has requested an appointment with the service provider. As an example, such an email notification can inform the service provider of the name of the requestor and the date and time when the requestor desires an appointment. The service provider, upon receiving the email notification, can initiate access to the appointment server to review the requested appointment. Hence, although the invocation of the service provider appointment review processing 800 typically follows the reception of an email notification, in more general terms is activated whenever requested by the service provider. Thus, the service provider appointment review processing 800 begins when activated by a service provider.

After being activated, the appointment server webpage is accessed 804. The appointment server webpage, as noted above, is provided by the appointment server (e.g., appointment server 202, 250). Next, a login page is received and displayed 806. Here, the login page can be received from the appointment server and displayed on a display screen associated with the service provider's computer. Then, the service provider enters and submits 808 a user name and password. Then, assuming the login was successful, the service provider appointment review processing 800 receives and displays 810 the service provider's calendar. Here, the service provider's calendar is supplied by the appointment server.

Following the display of the service provider's calendar, the service provider can perform various navigation acts or operations with respect to the service provider's calendar provided by the appointment server. Eventually, the service provider desires to accept or decline a requested appointment. For example, to initiate acceptance or decline of a requested appointment, the service provider could select an icon or button being displayed. As an example, the icon or button can be displayed with the service provider's calendar. A decision 812 determines whether an appointment status selection has been made for a particular requested appointment. When the decision 812 determines that an appointment status selection has not been made, then a decision 814 determines whether the service provider appointment review processing 800 is done. When the decision 814 determines that the service provider appointment review processing 800 is done, the service provider appointment review processing 800 is complete and ends. On the other hand, when the decision 814 determines that the service provider appointment review processing 800 is not completed, then processing returns to repeat the navigation acts or operations and subsequent blocks including the decision 812.

Alternatively, when the decision 812 determines that an appointment status selection has been made, an appointment status notification is sent 816. Here, the appointment status notification provides an indication to the appointment server as to whether the requested appointment is accepted or declined. An accepted appointment is also referred to as a confirmed appointment. Also, depending on whether the requested appointment has been accepted or declined, the service provider appointment review processing 800 operates differently. In particular, a decision 818 determines whether the requested appointment has been accepted. When the decision 818 determines that the requested appointment has not been accepted (i.e., declined), the service provider appointment review processing 800 returns to repeat the operation 810 and subsequent operations. On the other hand, when the decision 818 determines that the requested appointment has been accepted, a decision 820 determines whether detailed appointment information has been received. Here, the appointment server will forward or send to the service provider's computer detailed appointment information on the appointment that has been accepted. When the decision 820 determines that detailed appointment information has not yet been received, the service provider appointment review processing 800 awaits such information. Once the decision 820 determines that detailed appointment information has been received, the detailed appointment information is displayed 822. For example, the detailed appointment information can be displayed on a display screen associated with the service provider's computer 210. Next, a decision 824 determines whether the detailed appointment information has been verified. Here, the service provider is provided with an opportunity to verify the particular information included in the detailed appointment information. Hence, the service provider reviews the detailed appointment information displayed on the display screen and then verifies its accuracy. When the decision 824 determines that the information has not yet been verified, the service provider appointment review processing 800 awaits such verification. Although not illustrated in FIGS. 8A and 8B, alternatively, the service provider could indicate that it desires to decline the requested appointment that was previously accepted, in which case the requested appointment would be declined and the processing could return to repeat the operation 810 and subsequent operations. However, when the decision 822 determines that the information has been verified, detailed appointment confirmation is sent 824. For example, the detailed appointment confirmation is sent 824 to the appointment server to inform the appointment server that the particular requested appointment and its details have been confirmed (accepted). Thereafter, the service provider appointment review processing 800 returns to repeat the operation 810 and subsequent operations so that other requested appointments can be reviewed or other navigation acts performed.

Figure 9A:
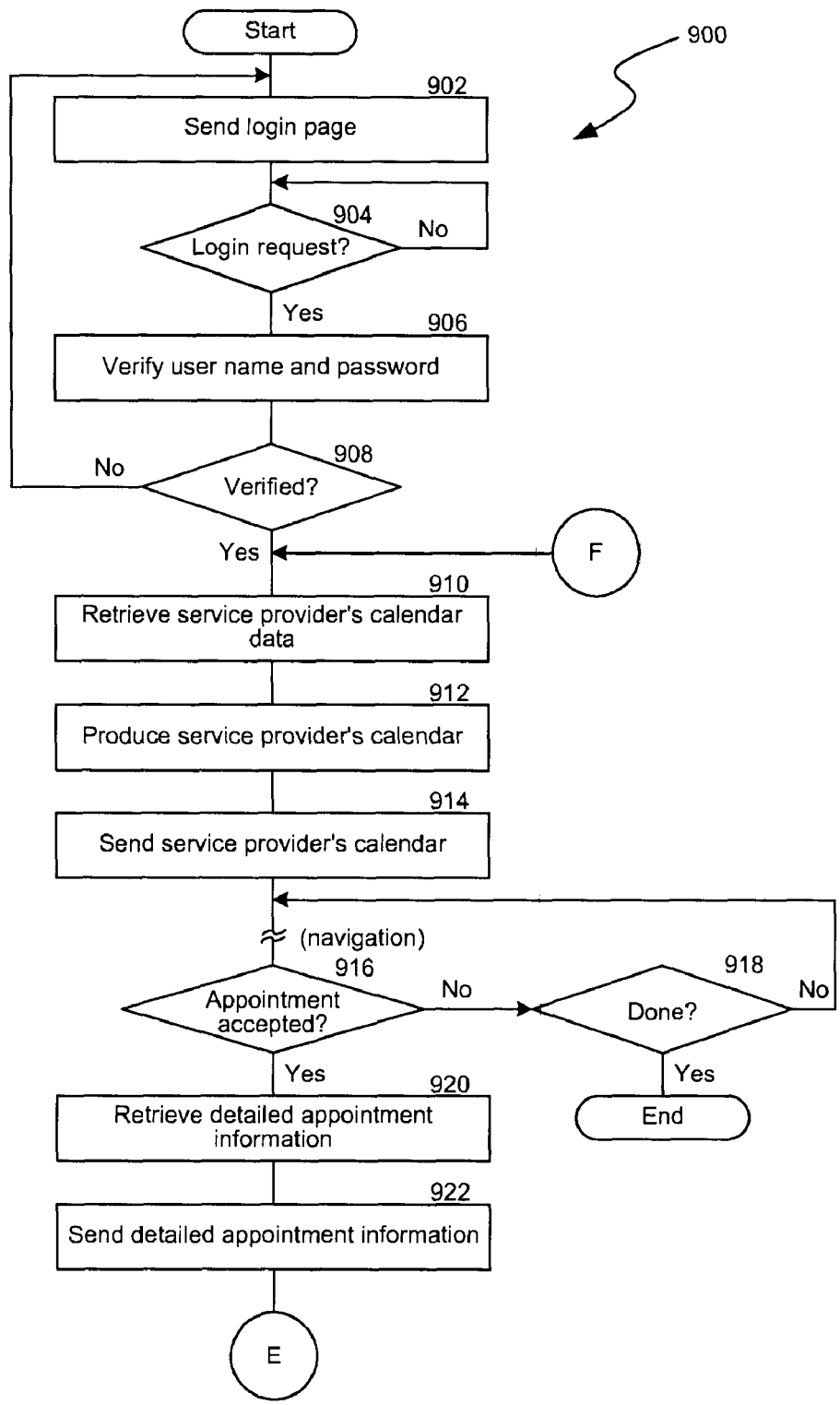
FIGS. 9A and 9B are flow diagrams of server-side appointment review processing according to one embodiment of the invention.
Figure 9B:
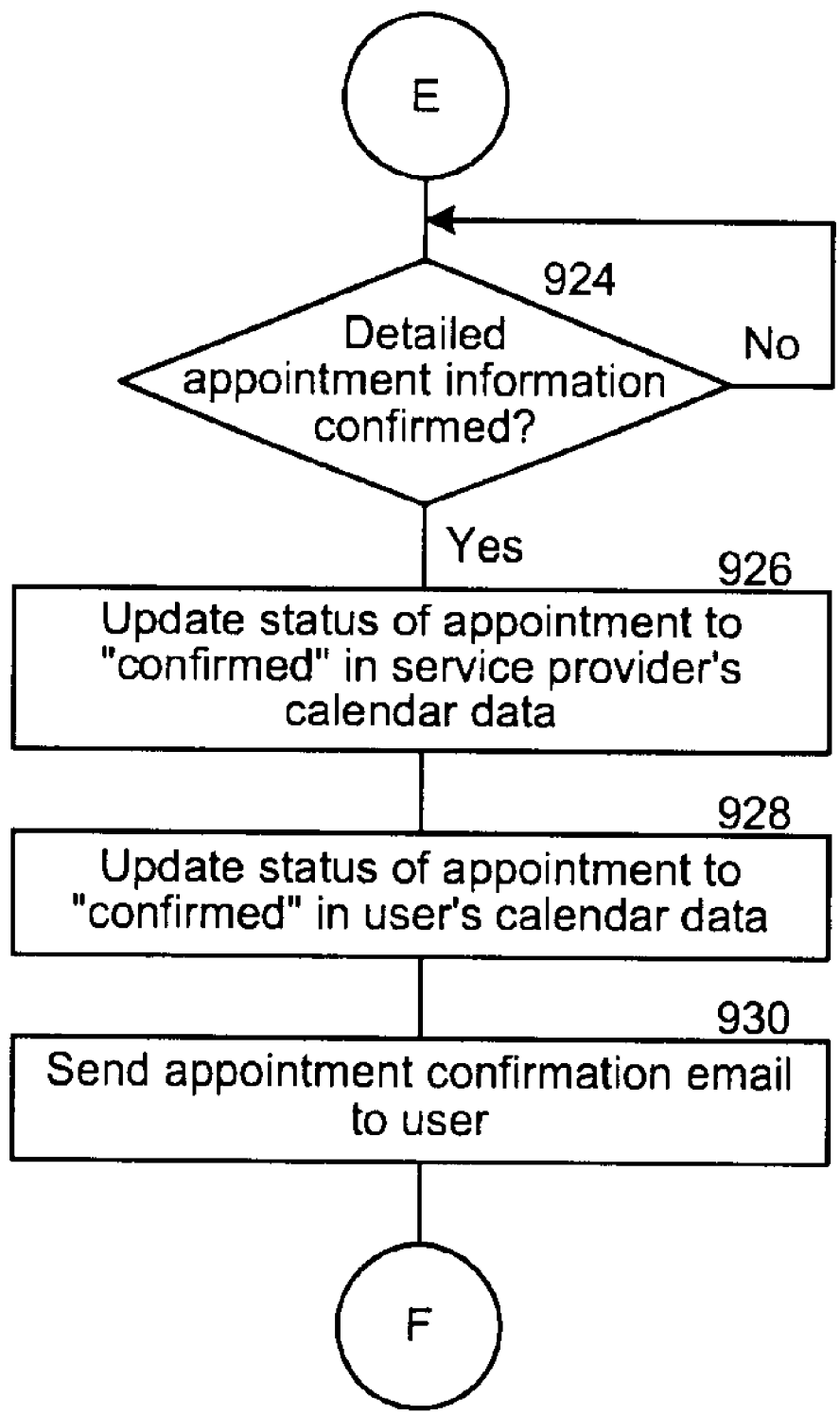

FIGS. 9A and 9B are flow diagrams of server-side appointment review processing 900 according to one embodiment of the invention. The server-side appointment review processing 900 is, for example, performed by the appointment server 202 illustrated in FIG. 2A or the appointment server 252 illustrated in FIG. 2B. The server-side appointment review processing 900 interacts with the service provider's computer 212 which performs the service provider appointment review processing 800.

The server-side appointment review processing 900 sends 902 a login page. Typically, the login page would be in response to a request by the service provider's to access the appointment server website. Next, a decision 904 determines whether a login request has been received. When the decision 904 determines that a login request has not yet been received, the server-side appointment review processing 900 awaits such a request. Once the decision 904 determines that a login request has been received, the user name and password associated with the login request are verified 906. A decision 908 then determines whether the user name and password have been correctly verified. When the decision 908 determines that the user name and password were not able to be verified, then access is denied and the processing returns to repeat the operation 902. On the other hand, when the decision 908 determines that the user name and password are correctly verified, then service provider's calendar data is retrieved 910. Here, for example, the service provider's calendar data can be retrieved from the appointment database 204 illustrated in FIG. 2A or the calendar/appointment database 262 of the appointment database 252 illustrated in FIG. 2B. Then, a service provider's calendar is produced 912. Here, the service provider's calendar is produced 912 in accordance with the service provider's calendar data that has been retrieved 910. After the service provider's calendar has been produced 912, the service provider's calendar is sent 914.

Thereafter, the server-side appointment review processing 900 can perform various actions or operations such as altering the calendar view being provided or sent to different days, months or weeks. In any event, since the service provider will eventually request an appointment confirmation, the server-side appointment review processing 900 will recognize when the service provider is accepting or declining an appointment. In this regard, a decision 916 determines whether an appointment has been accepted (or rejected). Here, an appointment status notification is sent to the appointment server by the service provider following acceptance or cancellation of a requested appointment. When the decision 916 determines that an appointment has been declined by the service provider, a decision 918 determines whether the server-side appointment review processing 900 is done. When the decision 918 determines that the server-side appointment review processing is done, then the server-side appointment review processing 900 is complete and ends. On the other hand, when the decision 918 determines that the server-side appointment review processing 900 is not done, then the processing returns to the decision 916 to await another appointment status notification for another requested appointment.

In this embodiment, the requested appointments (e.g., pending appointments) are reviewed minimal information about the appointments, for example, date, time and requestor's name. Once the decision 916 determines that an appointment has been accepted (i.e., confirmed), detailed appointment information is retrieved 920. The detailed appointment information is then sent 922. Here, the detailed appointment information is retrieved 920 from the appointment database 204, 252 and sent 922 to the service provider. As an example, the detailed appointment information provides more information on the appointments that were accepted. As an example, the detailed information can include date, time, type of appointment, a message from requestor, and contact information. Next, a decision 924 determines whether the detailed appointment information has been confirmed. The service provider can confirm the detailed appointment information. When the decision 924 determines that the detailed appointment information has not yet been confirmed, the server-side appointment review processing 900 awaits such a confirmation. When the decision 924 determines that the detailed appointment information has been confirmed, the status of the appointment is updated 926 to "confirmed" in the service provider's calendar data at the appointment database. In addition, the status of the appointment is updated 928 to "confirmed" in the user's calendar data at the appointment database. Also, an appointment confirmation email is sent 930 to the user. As an example, the appointment confirmation email serves to notify the consumer that his/her previously requested appointment has been confirmed (accepted). Of course, in other embodiments, the appointment confirmation email need not be sent to the user. Following operation 930, the server-side appointment review processing 900 returns to repeat the operation 910 and subsequent operations so that additional requested appointments can be reviewed.

Although appointment review was discussed above as being performed by a service provider, any user (e.g., consumer or service provider) permitting appointments to be made with them can likewise review appointments. Also, the appointment review could operate to provide the detailed appointment information before the service provider is asked to initially confirm or decline a requested appointment.

Figure 10:
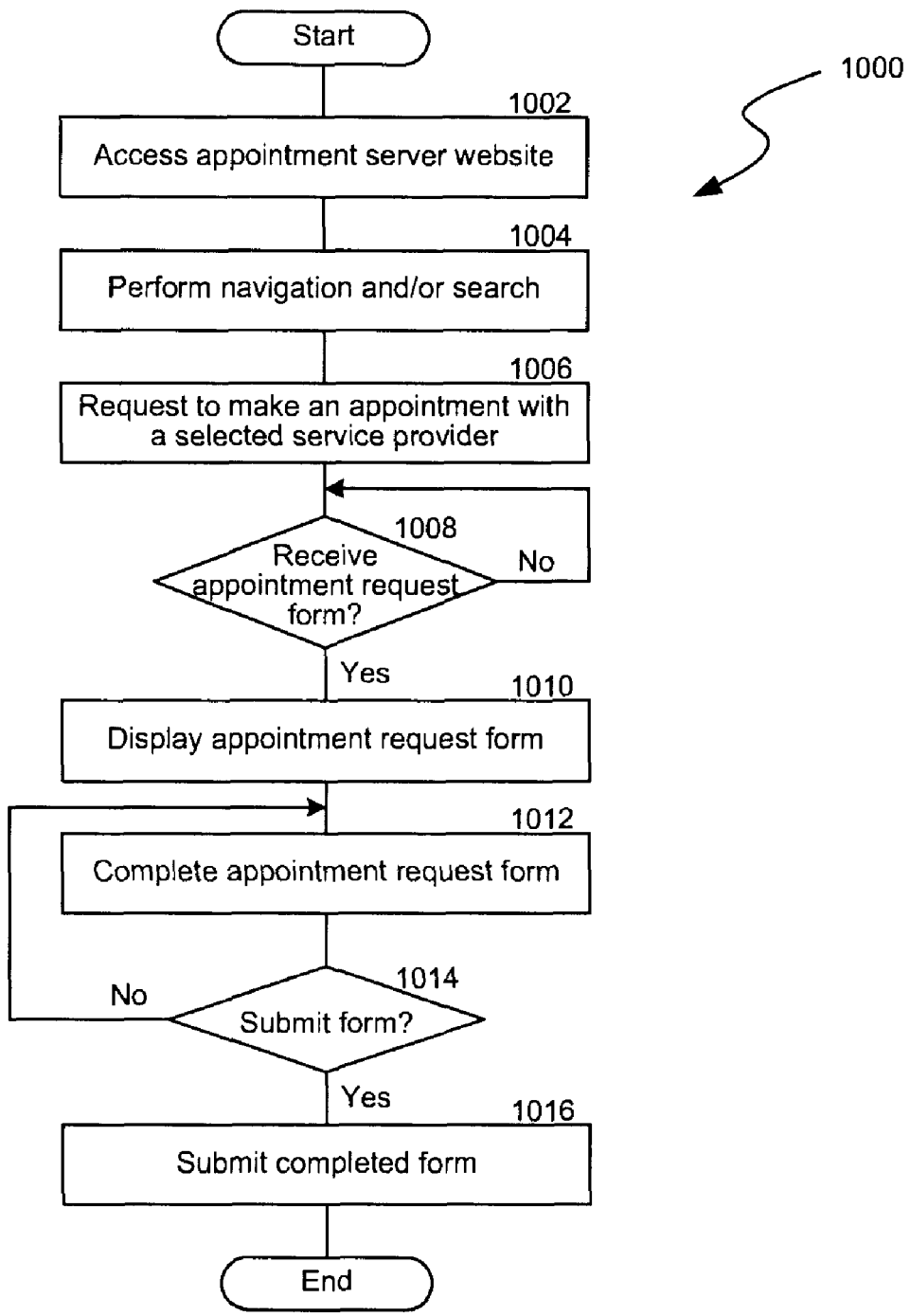
FIG. 10 is a flow diagram of client-side restricted appointment request processing according to one embodiment of the invention.
Figure 11:
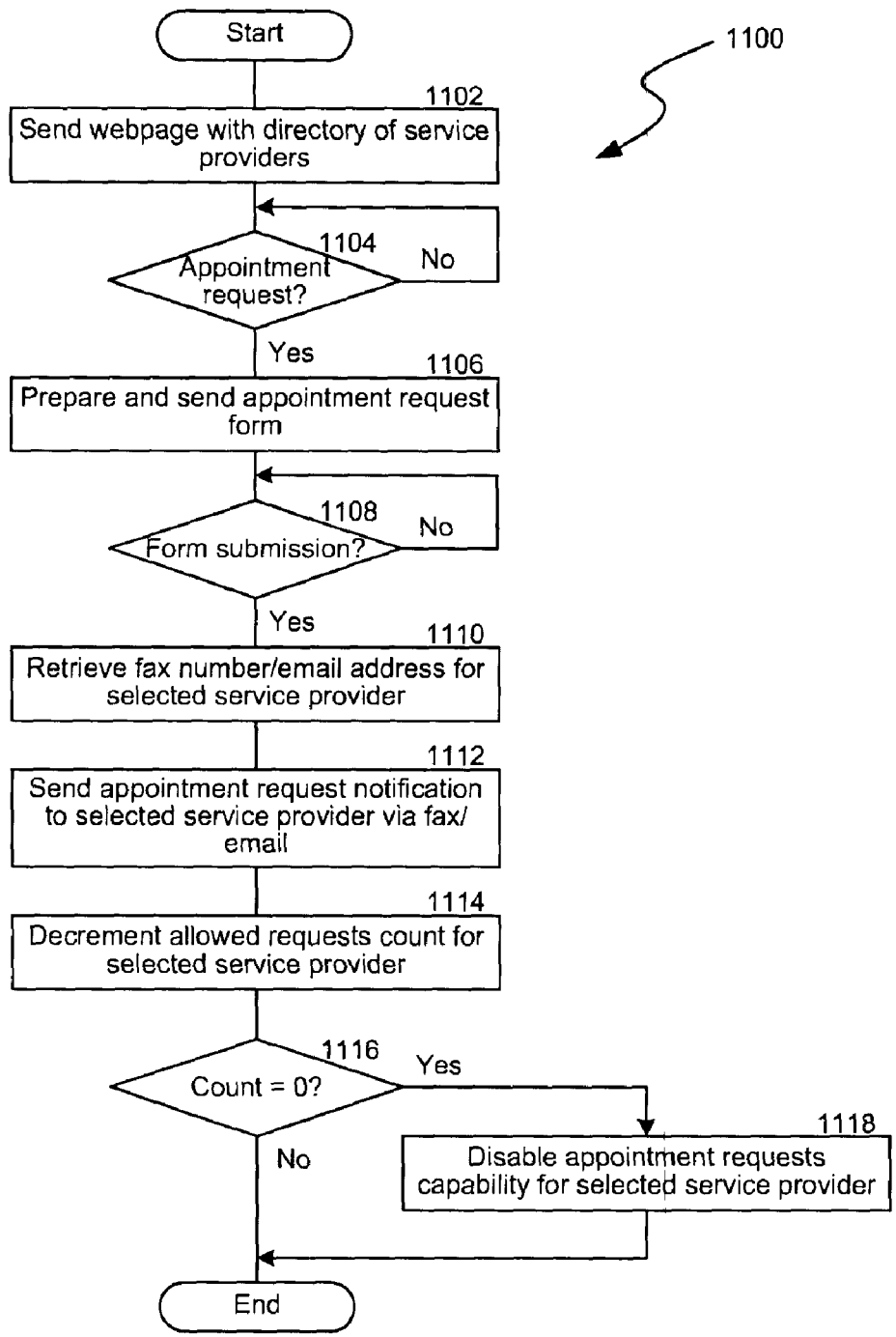
FIG. 11 is a flow diagram of a server-side restricted appointment request processing according to one embodiment of the invention.

According to another aspect of the invention, an appointment server can operate to notify a selected service provider via facsimile or electronic mail that a user (customer) desires to make an appointment on a given date at a given period of time. In this regard, the service provider can be considered known but unregistered for on-line appointment services with the appointment server. As such, the appointment server can only partially manage the appointment request. In particular, the consumer will access the appointment server in a general manner and make an appointment by filling out an appointment form and submitting the form. Then, the appointment server will receive the appointment form that has been submitted by the consumer and prepare a facsimile or electronic mail notification to the selected service provider indicating that the consumer has requested to make a particular appointment with the service provider. Upon receiving the facsimile or electronic mail notification, the service provider can contact the consumer through electronic mail, telephone or mail. FIGS. 10 and 11 explain this restricted type of appointment processing according to one embodiment of the invention.

FIG. 10 is a flow diagram of client-side restricted appointment request processing 1000 according to one embodiment of the invention. The client-side restricted appointment request processing 100 is, for example, performed by the consumer's computer 208 illustrated in FIG. 2A.

The client-side restricted appointment request processing 1000 initially accesses 1002 an appointment server website. Then, navigation and/or search operations are performed 1004. Here, a user can interact with the appointment server website to review a directory of service providers, obtain listings of particular types of service providers, review address book entries, etc. so as to eventually select a particular service provider for which an appointment is to be requested. Eventually, the consumer will cause the client-side restricted appointment request processing 1000 to request 1006 to make an appointment with the particular service provider. Following the request 1006, a decision 1008 determines whether an appointment request form has been received. Here, the appointment request form will be received from the appointment server in response to the request 1006. When the decision 1008 determines that the appointment request form has not yet been received, the client-side restricted appointment request processing 1000 awaits the reception of the appointment request form. Once the decision 1008 determines that the appointment request form has been received, the appointment request form is displayed 1010. Here, the appointment request form is displayed on the display screen of the consumer's computer. Next, the appointment request form is completed 1012. Here, the user of the consumer's computer fills in information requested by the appointment request form to complete the form. As an example, the information requested includes appointment date, duration and perhaps a message. Next, a decision 1014 determines whether the appointment request form is to be submitted. When the decision 1014 determines that the appointment request form is not yet ready to be submitted, the restricted appointment request processing 1000 returns to repeat the block 1012 and subsequent blocks. On the other hand, when the decision 1014 determines that the appointment request form is to be submitted, the completed form is submitted 1016. After the completed form is submitted 1016, the restricted appointment request processing 1000 is complete and ends.

FIG. 11 is a flow diagram of a server-side restricted appointment request processing 1100 according to one embodiment of the invention. The server-side restricted appointment request processing 1100 is, for example, performed by the appointment server 202 illustrated in FIG. 2A or the appointment server 250 illustrated in FIG. 2B.

The server-side restricted appointment request processing 1100 initially sends 1102 a webpage with a directory of service providers. Here, the webpage is part of the appointment server website and is provided to the consumer's computer upon access to the appointment server website. A decision 1104 then determines whether an appointment request has been received. When the decision 1104 determines that an appointment request has not yet been received, the server-side restricted appointment request processing 1100 awaits such a request. Once the decision 1104 determines that an appointment request has been received, an appointment request form is prepared and sent 1106. The appointment request form can be generic or customized for different industry types.

Next, a decision 1108 determines whether a completed appointment request form has been submitted. When the decision 1108 determines that the completed appointment request form has not yet been submitted, the server side restricted appointment request processing 1100 awaits the reception of a completed appointment request form. On the other hand, when the decision 1108 determines that the completed appointment request form has been submitted, a facsimile number or email address for the selected service provider is retrieved 1110. Here, the facsimile number or email address for the selected service provider are available from the appointment database (e.g., the business directory database 264). Then, an appointment request notification is sent 1112 to the selected service provider via facsimile or electronic mail. The appointment request notification can, for example, resemble the completed appointment request form.

Thereafter, in one embodiment, to limit the number of appointment requests that will be serviced by the appointment server without the service providers being registered with the system to participate in on-line appointment services, additional processing can be performed such as contained in operations 1114-1118 of FIG. 11. Namely, an allowed request count for the selected service provider can be decremented 1114 after each appointment request notification is sent 1112 to the selected service provider. Then, a decision 1116 determines the count is zero (0). When the decision 1116 determines that the count has become zero (0), the capability for the selected service provider to receive appointment requests when unregistered can be disabled 1118. As a result, service providers can receive a limited number of appointment requests from consumers even while the service providers are unregistered with the appointment server, yet still be motivated to formally register with the appointment server. Alternatively, when the decision 1116 determines that the count is not zero (0), as well as following the operation 1118, the server-side restricted appointment request processing 1100 is complete and ends.

Although the above discussion primarily concerned a user requesting an appointment with a service provider on a particular date, the appointment system can also consider multiple or alternative dates. By considering multiple or alternative dates, the users have more options in which to schedule an appointment. Also, the user requesting an appointment could, when requesting an appointment, provide alternative choices of times (i.e., time slots). For example, beside a first choice, the user could provide a second choice and a third choice. The service provider can then review the appointment request and have some scheduling options for the appointment.

Moreover, although the above discussion has primarily discussed the request for an appointment by a consumer and then the confirmation of the requested appointment by the service provider, the appointment system also permits the service provider to request an appointment with the consumer and then allow the consumer to confirm the appointment. Hence, consumer and service providers are users, and user can both request and confirm appointments.

Also, although the above discussion primarily concerns making appointments from one user to another user, the invention is also applicable to making appointment from one user to many users. For example, one user may want to arrange a meeting with two or more other users an could do so be requesting an appointment in accordance with the appointment availability of the two or more other users. Multiple users could also be grouped together to share a calendar and appointments. For example, a group of individuals could be associated with an on-line calendar provided by the appointment server, and then the group is effectively a user.

Still further, the above discussion described the scheduling of appointments as initially requested and then confirmed. The requested appointment was then initially provided as a pending appointment upon being requested, and then either canceled or confirmed by the service provider. In another embodiment, the requested appointment could initially be deemed set and then thereafter cancelled by the service provider if not desired. In such an embodiment, the operation would be the same but the terminology slightly different.

According to another aspect of the invention, a service provider's computer can include a synchronization application. The synchronization application is a separate application program that operates on the service provider's computer to synchronize a local appointment management system with the appointment database provided at the appointment server.

Figure 12:
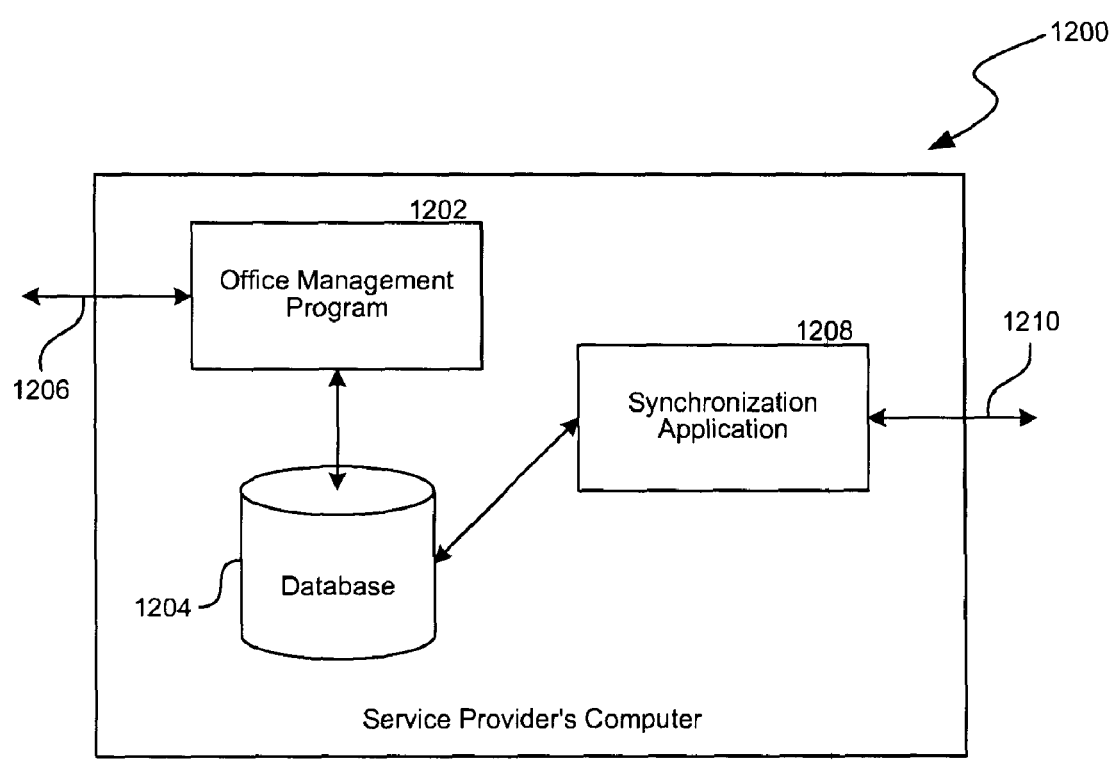
FIG. 12 is a block diagram of a service provider's computer according to one embodiment of the invention.

FIG. 12 is a block diagram of a service provider's computer 1200 according to one embodiment of the invention. The service provider's computer 1200 includes an office management program 1202 that is typically provided in a service provider's establishment. The office management program 1202 is typically an integrated software package that includes functions or modules such as calendar and email. The office management program 1202 may also include time and billing modules, management modules, etc.

The office management program 1202 is coupled to a database 1204 that stores data associated with the office management program 1202. The office management program 1202 can be coupled to various internal users at the service provider's establishment over a local network 1206. The service provider's computer 1200 also includes a synchronization application 1208 coupled to an external network (e.g., the Internet) through a network link 1210. The synchronization application 1208 operates to synchronize the appointment data from the appointment database provided by the appointment server with the database 1204 managed by the office management program 1202. In this regard, appointments scheduled with the appointment server are able to be presented in the calendar module of the office management program 1202. Still further, if desired, the service provider's on-line calendar maintained by the appointment server can be synchronized with the calendar module (i.e., local calendar) of the office management program 1202.

Figure 13:
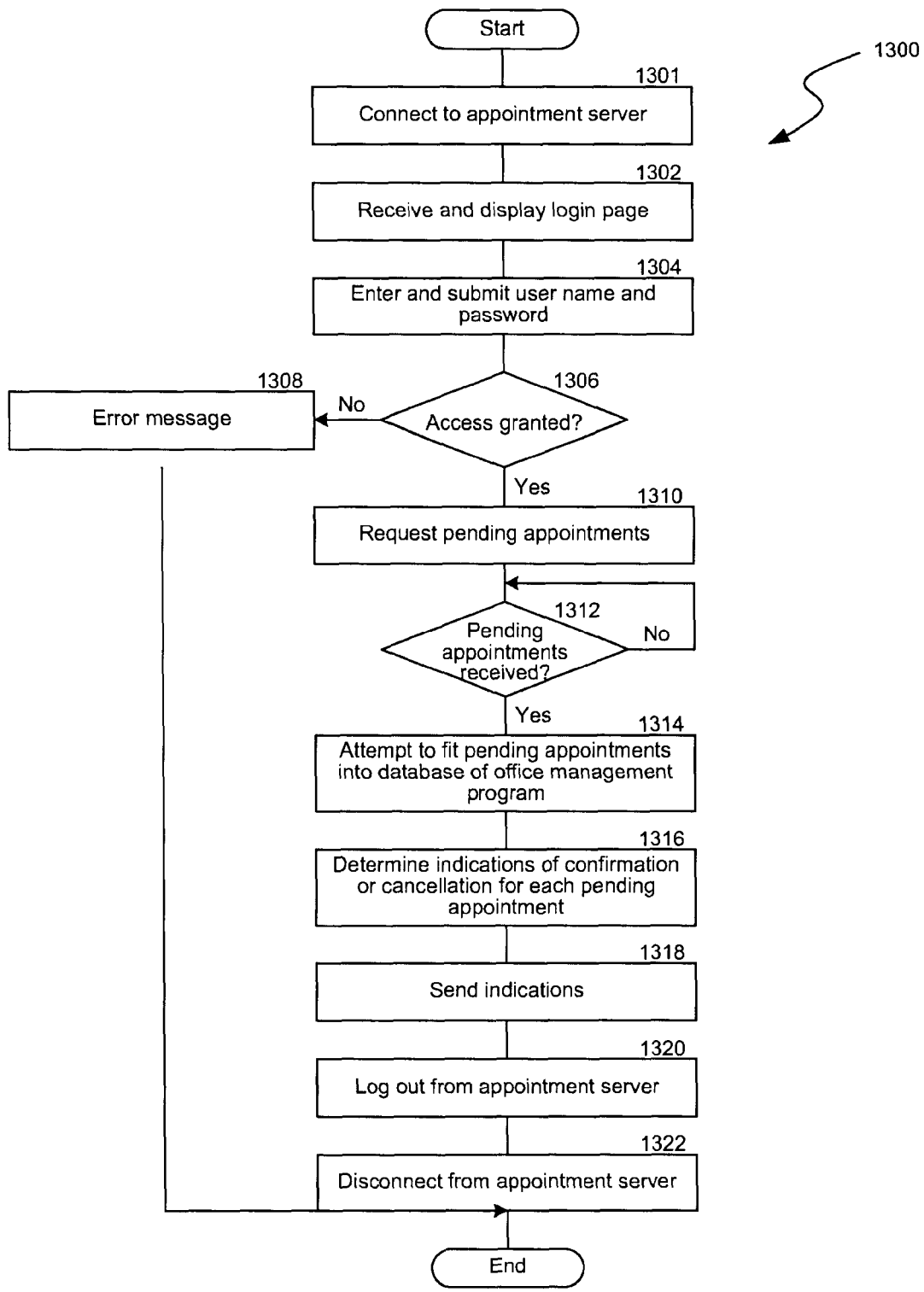
FIG. 13 is a flow diagram of synchronization application processing according to one embodiment of the invention.

FIG. 13 is a flow diagram of synchronization application processing 1300 according to one embodiment of the invention. The synchronization application processing 1300 is, for example, performed by the synchronization application 1208 illustrated in FIG. 12. In one implementation, the synchronization application processing 1300 can be scheduled to periodically start such that the synchronization regularly occurs.

The synchronization application processing 1300 initially connects 1301 the synchronization application to an appointment server. Then, the synchronization application will receive and display 1302 a login page. In response to the login page, the synchronization application will enter and submit 1304 a user name and password. Next, a decision 1306 determines whether access to the appointment server has been granted. Here, the appointment server will notify the synchronization application whether access has been granted or denied. When the decision 1306 determines that access has not been granted (i.e., access denied), an error message is provided 1308 to the synchronization application.

On the other hand, when the decision 1306 determines that access has been granted, the synchronization application requests 1310 pending appointments. A decision 1312 then determines whether the pending appointments that have been requested have been received. When the decision 1312 determines that the pending appointments have not yet been received, the application synchronization processing 1300 waits to receive the pending appointments. Once the pending appointments have been received, the synchronization application attempts 1314 to fit the pending appointments into the database 1204 of the office management program 1202. Then, the synchronization application processing 1300 determines 1316 indications of confirmation or cancellation for each of the pending appointments. Here, the service provider can manually interact with the synchronization application or the synchronization application can automatically determine whether the pending appointments fit. For example, if a pending appointment conflicts with an existing appointment or event in the service provider's local calendar at the office management program 1202, the synchronization application can automatically cancel the pending appointment. Likewise, if a pending appointment does not conflict with an existing appointment or event in the service provider's calendar at the office management program 1202, the synchronization application can automatically accept (confirm) the pending appointment. In any case, after the indications are determined 1316, the indications are then sent 1318. The synchronization application then logs out 1320 from the appointment server. The synchronization application then disconnects 1322 from the appointment server. Following the operation 1322, as well as following the operation 1308, the appointment synchronization processing 1300 is complete and ends.

Figure 14:
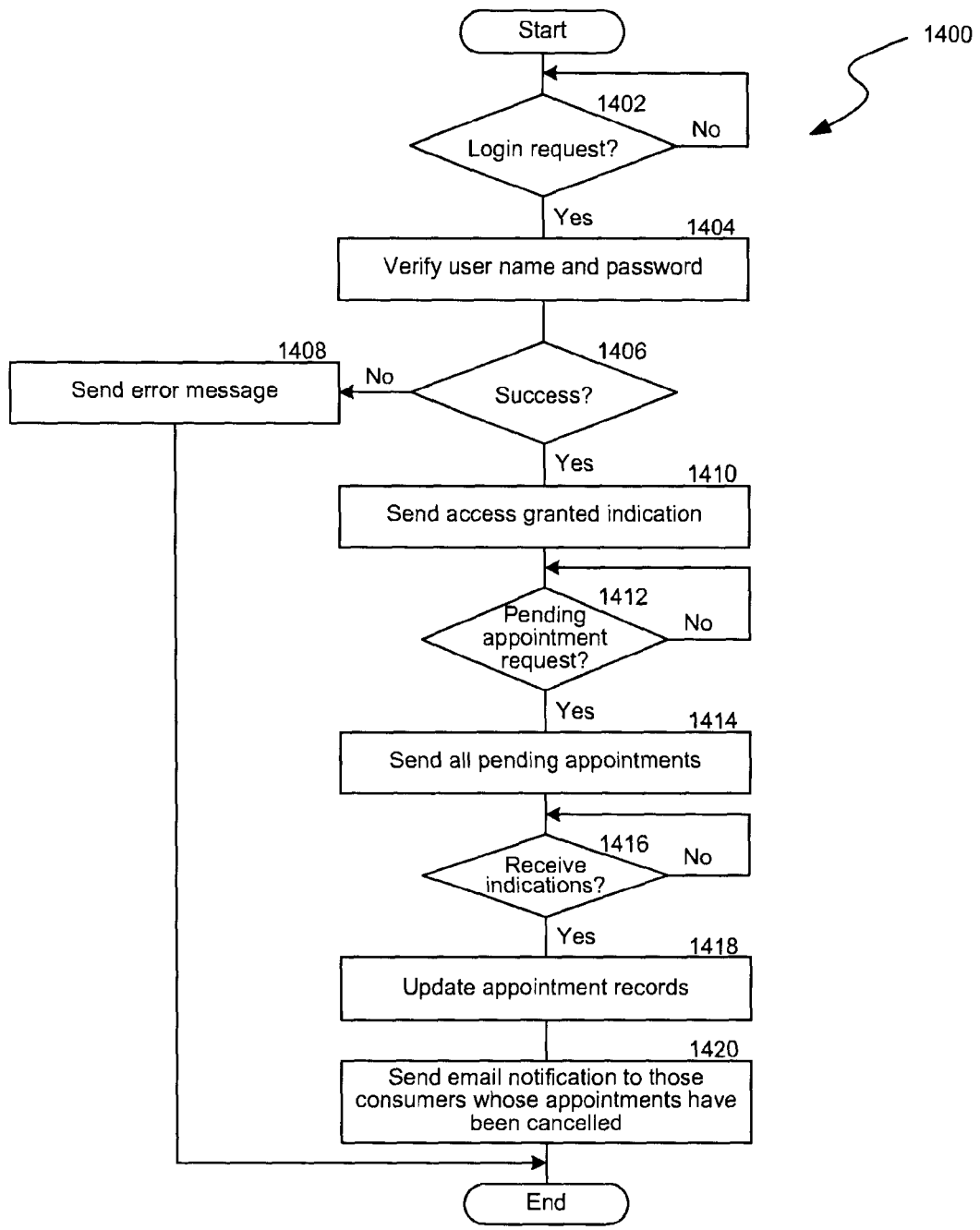
FIG. 14 is a flow diagram of server-side appointment synchronization processing according to one embodiment of the invention.

FIG. 14 is a flow diagram of server-side appointment synchronization processing 1400 according to one embodiment of the invention. The server-side appointment synchronization processing 1400 begins when a login request from the synchronization application has been received. More particularly, a decision 1402 determines whether a login request has been received. When the decision 1402 determines that a login request has not yet been received, the server-side appointment synchronization processing 1400 awaits such a request. Once the decision 1402 determines that a login request has been received, the user name and password associated with the login request are verified 1404. A decision 1406 then determines whether the user name and password have been successfully verified. When the decision 1406 determines that the user name and password have not been successfully verified, an error message is sent 1408.

On the other hand, when the decision 1406 determines that the user name and password have been successfully verified, then an access granted indication is sent 1410 to the synchronization application. Then, a decision 1412 determines whether a pending appointment request has been received. When the decision 1412 determines that a pending appointment request has not yet been received, the server-side appointment synchronization processing 400 awaits such a request. Once the decision 1412 determines that a pending appointment request has been received, all pending appointments are sent 1414 to the synchronization application. Here, all the pending appointments are first located within the appointment database and those located are then retrieved and sent 1414 to the synchronization application.

Next, a decision 1416 determines whether confirmation/cancellation indications have been received from the synchronization application. When the decision 1416 determines that the indications have not yet been received, the server-side appointment synchronization processing 1400 awaits such indications. When the decision 1416 determines that the indications have been received, appointment records are updated 1418 at the appointment database. For example, if a pending appointment has been confirmed (accepted), then the appointment record for the particular appointment is updated to indicate its status as being confirmed. On the other hand, if a pending appointment has been cancelled, the appointment record for the cancelled appointment is removed from the appointment database. Then, an email notification can be sent 1420 to those consumers whose appointments have been cancelled. The email notification can inform the consumers that their requested appointments have been cancelled and they should contact the service provider for additional information. Optionally, email notifications could be sent to those consumers whose appointments have been accepted. Regardless of the email notifications, the users' calendars would be updated to indicate that the appointment is confirmation or that the appointment has been cancelled. Thereafter, the server-side appointment synchronization processing 1400 is complete and ends.

Another aspect of the invention is the notification and confirmation processing for appointments. Various notifications pertaining to appointment were also discussed above. Notifications can advise the service provider that a consumer has requested an appointment. Notifications can inform the consumer that the service provider has accepted (confirmed) or refused the requested appointment. Notifications can also inform the consumer or service provider that a previously accepted appointment has been canceled. The email manager 260 of the appointment server 256 can initiate these notifications when appropriate.

Further, another aspect of the invention pertain to a method of doing business. The business method provides free on-line calendars and on-line appointment setting capabilities to consumers and provides fee-based calendars and on-line appointment accepting capabilities to service providers. For example, service providers could pay a monthly fee. Optionally, the business method provides email notifications to service providers when appointments are requested. Also, the business method may provide email notifications to consumers when their requested appointments are confirmed. The business method may also provide consumers with reminders for their upcoming appointments. The calendars of the consumers and service providers can also store information on other meetings or events besides appointments. Events that are scheduled can also make use of notifications. Further, the calendars of the consumers and service providers can also provide service providers or users with on-line address books.

Another aspect of the invention pertains to a graphical user interface for scheduling appointments. The graphical user interface simultaneously displays on a display screen (i) a first user's daily calendar indicating the user's availability, and (ii) available time slots of a second user with which the appointment is being scheduled.

FIGS. 15-39 are representative screen shots of an on-line appointment system, namely a graphical user interface therefor, according to one or more embodiment of the invention. The screen shots are illustrative of the operation of the invention but are not to be deemed restrictive in scope of the invention.

Figure 15:
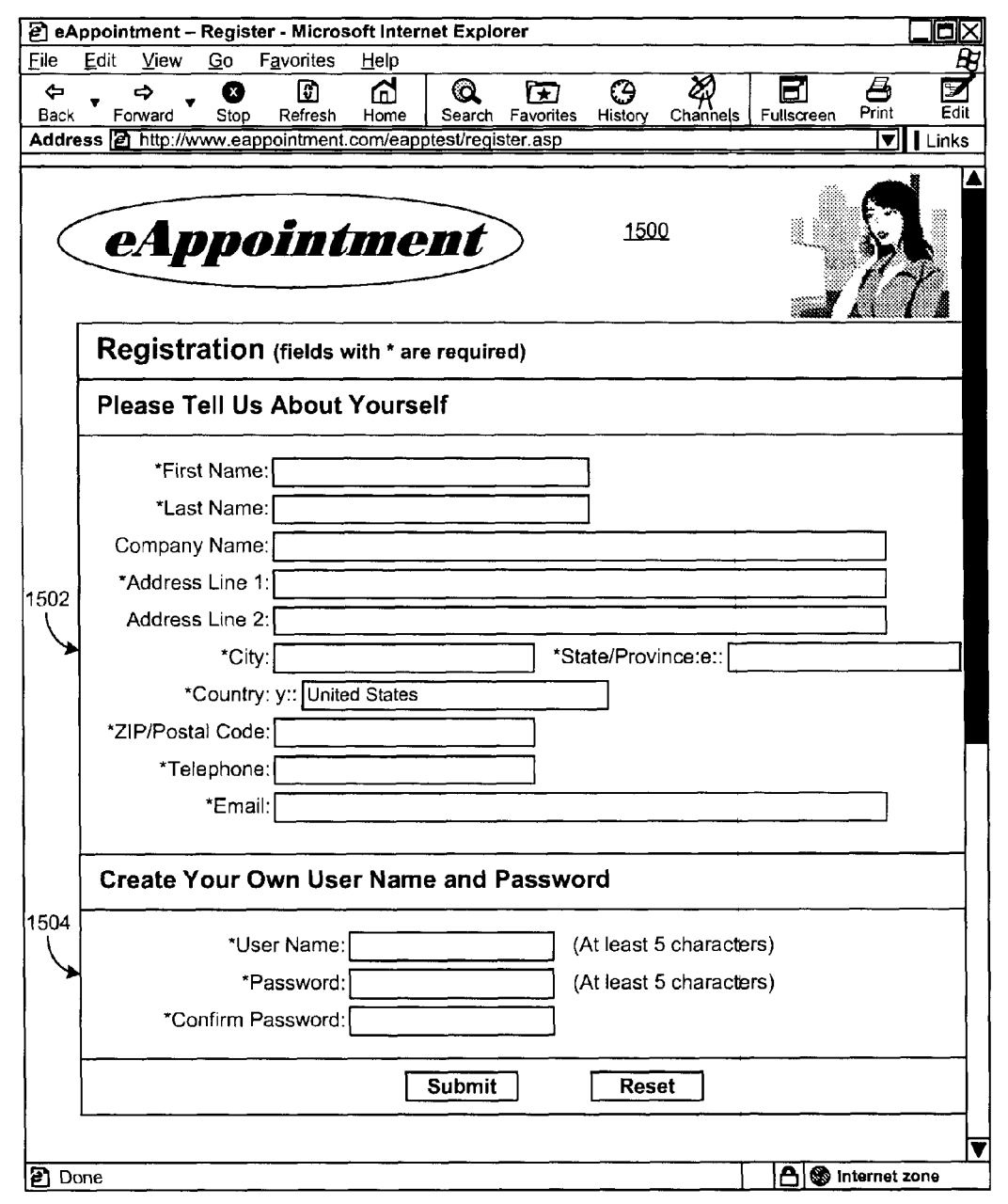

FIG. 15 is a registration screen in which a new user to the appointment system can register on-line. The registration screen depicts a registration page 1500 displayed by a network browser on a user's computer. In this and subsequent examples, the network browser is Microsoft Internet Explorer. The registration page 1500, for example, pertains to the registration page received and displayed 562 with respect to the client-side new user processing 560 illustrated in FIG. 5D. The registration page 1500 includes a first section 1502 that requests contact information from a user, and a second section 1504 that requests a user name and password from the user.

Figure 16:
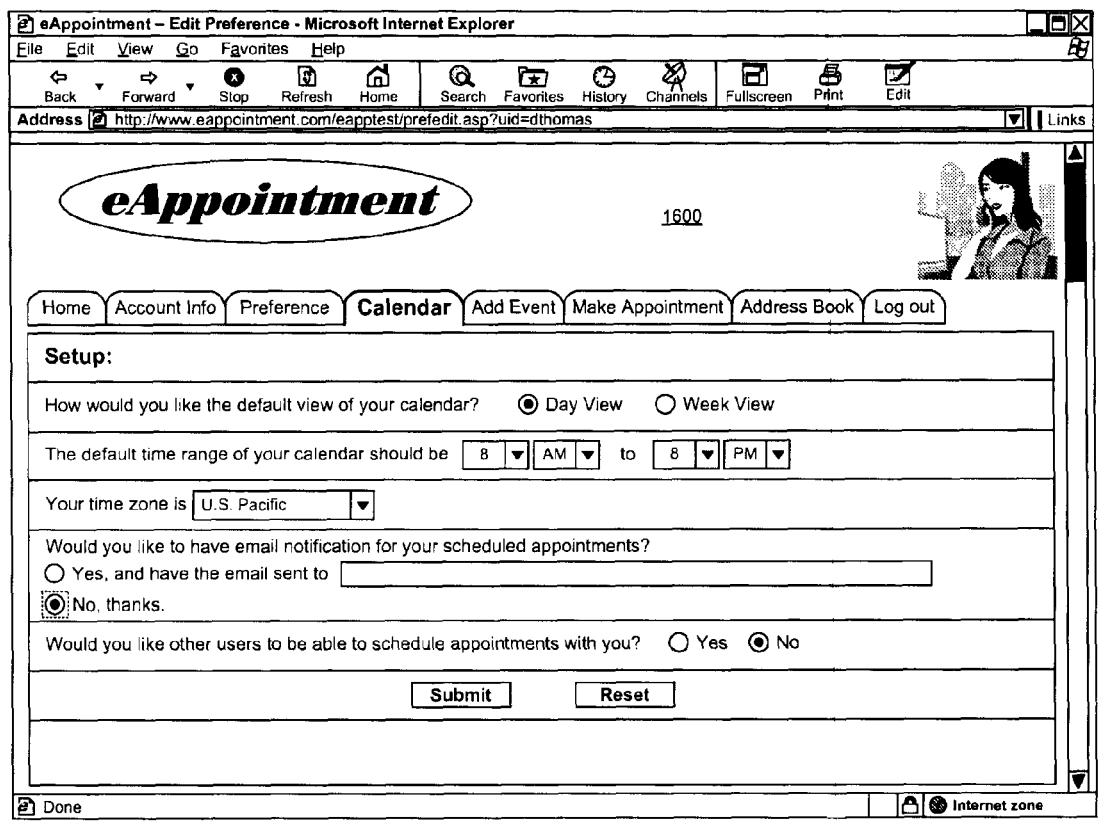
FIG. 16 is a setup screen in which a user can configure how he/she wishes his/her calendar to appear when he/she accesses the appointment website.

FIG. 16 is a setup screen in which a user can configure how he/she wishes his/her calendar to appear when he/she accesses the appointment website. The setup screen depicts a setup page 1600 displayed by a network browser on a user's computer. The setup page 1600, for example, pertains to the setup page displayed 568 with respect to the client-side new user processing 560 illustrated in FIG. 5D. The setup page 1600 allows the user to: set a default view of calendar to daily or monthly view; set default time range for calendar; set time zone; request that email notifications be sent to the user for scheduled appointments; and set whether others are permitted to schedule appointments with them or not.

Figure 17:
FIG. 17 is an appointment availability screen in which the user provides additional information concerning their availability for scheduling appointments, types of appointments, etc., assuming that the user is permitting appointments.

FIG. 17 is an appointment availability screen in which the user provides additional information concerning their availability for scheduling appointments, types of appointments, etc., assuming that the user is permitting appointments. The appointment availability screen depicts an appointment configuration page 1700 displayed by a network browser on a user's computer. The appointment configuration page 1700, for example, pertains to the appointment configuration page displayed 576 with respect to the client-side new user processing 560 illustrated in FIG. 5D. The appointment configuration page 1700 allows the user to specify: days and times of availability or unavailability for appointments, types of appointments that can be made as well as their duration, and whether appointments should be confirmed automatically or not. If an appointment is automatically confirmed, the user with which an appointment has been made does not get the opportunity to decline the requested appointment but can nevertheless cancel the automatically confirmed appointment. More particularly, the appointment configuration page 1700 allows the user to specify: whether appointments are to be automatically confirmed; availability for scheduling appointment during a normal week (including days and hours during the week of availability); other times during the week of availability; any times during the week of unavailability (e.g., lunch hour); type of appointment other can make; user category; and whether default information form (e.g., customer type information form) for the service type is to be used. As an example, one's availability for scheduling appointments during a week can be setup so that appointments can be scheduled only on certain days (e.g., Monday-Friday), within certain time periods, and by further exclusion of certain time periods (e.g., lunch hour). The types of appointments can also be classified by industry or other categories.

Figure 18:
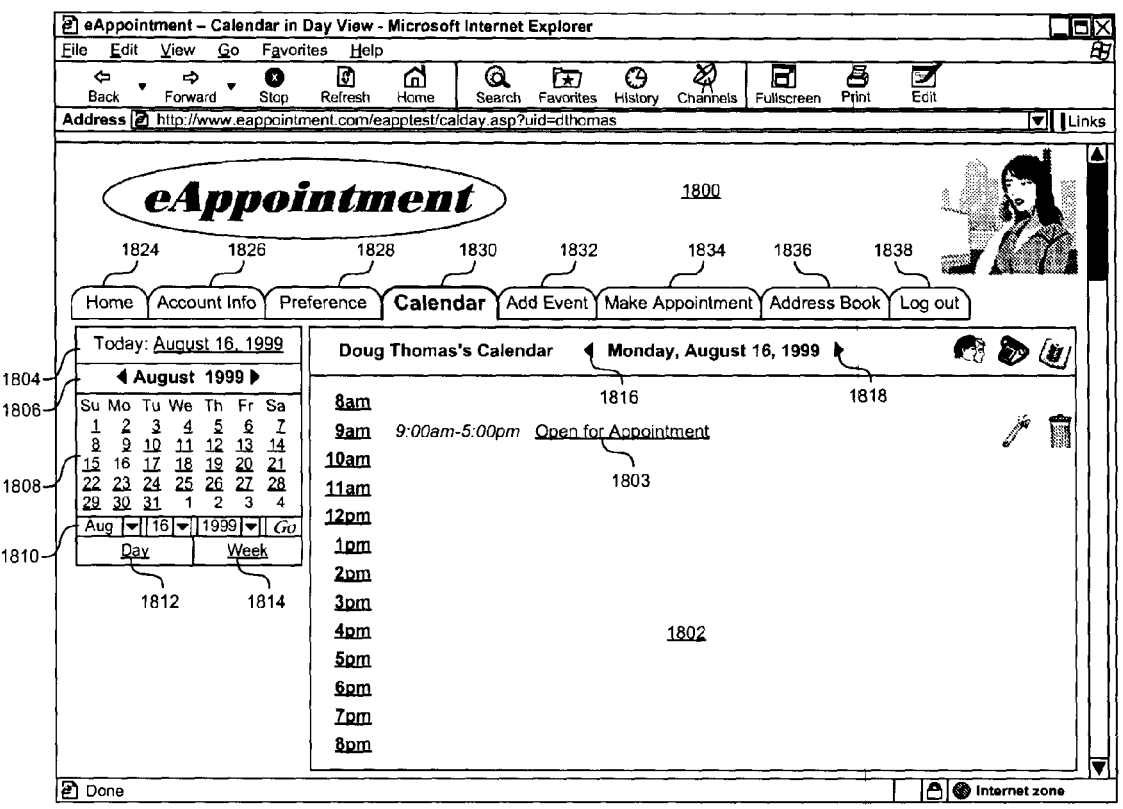
FIG. 18 is a user's calendar screen in which a user's calendar page is depicted.

FIG. 18 is a user's calendar screen in which a user's calendar page 1800 is depicted. The user's calendar page 1800 includes a user's calendar 1802 in a daily view format with the default time period extending from 8:00 a.m. to 8:00 p.m. In this example, an availability indication 1803 indicates that the user is open to receiving appointment from 9:00 a.m. to 5:00 p.m. The user's calendar page 1800 also includes an today's date indicator 1804, a month-to-month navigation device 1806, a selected month's condensed calendar 1808 allowing navigation to any day of the selected month, a specific date navigation device 1810, a daily view request device 1812 and a monthly view request device 1814 for the user's calendar, day-to-day navigation devices 1816 and 1818, a change appointment availability device 1830, and a delete device 1822. The user's calendar page 1800 also include request tabs 1824-1838. A home tab 1824 request that the home page be displayed. An account information tab 1826 requests an account information page so that account information can be reviewed or changed. A preferences tab 1828 requests a setup page and/or appointment configuration page. A calendar tab 1830 requests the user's calendar page. An add event tab 1832 requests an add event page so that a user can add an event to their calendar. A make appointment tab 1834 requests a make an appointment page. An address book tab 1836 requests an address book page. A logout tab 1838 requests that the user be log out from the appointment server.

Figure 19:
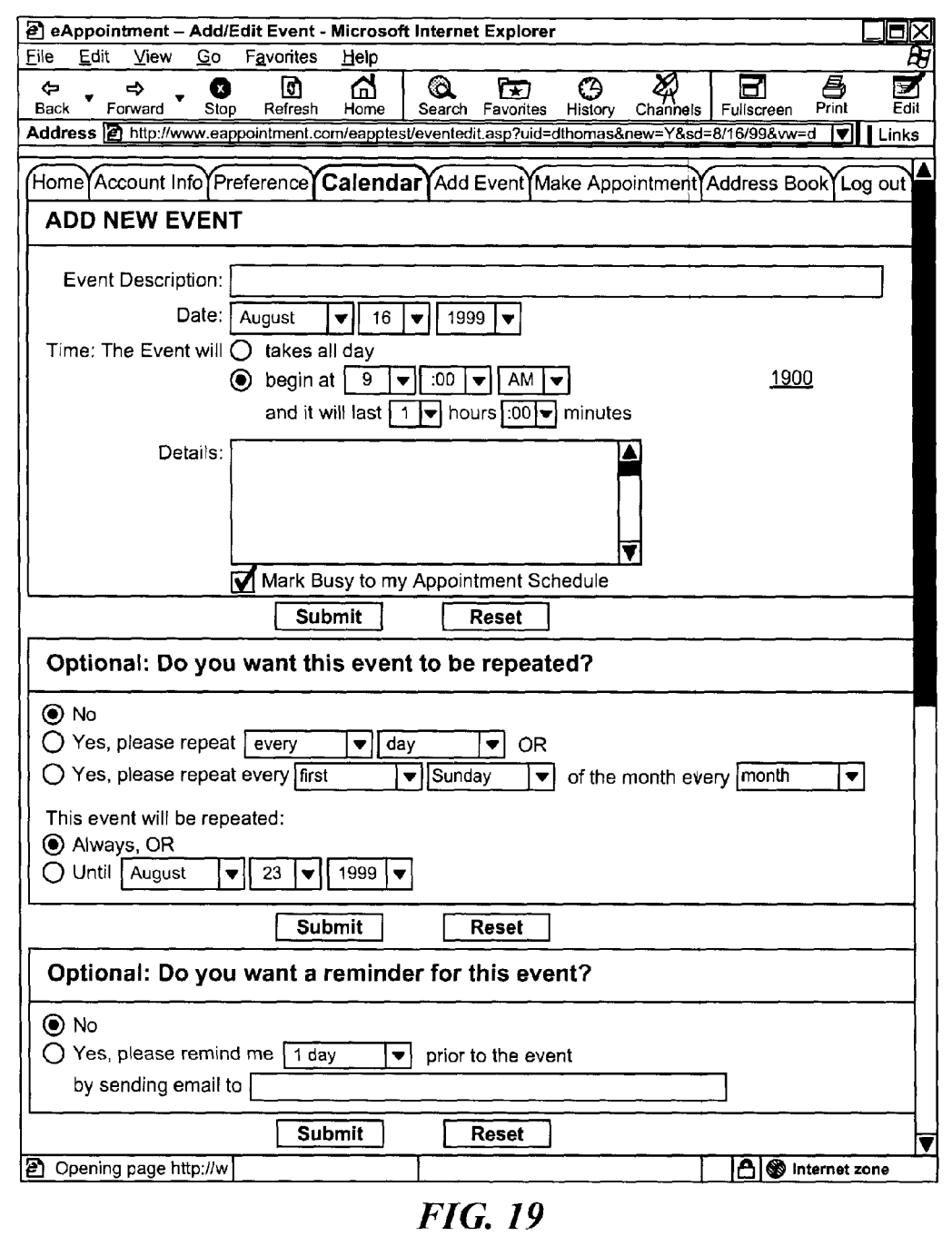
Figure 21:
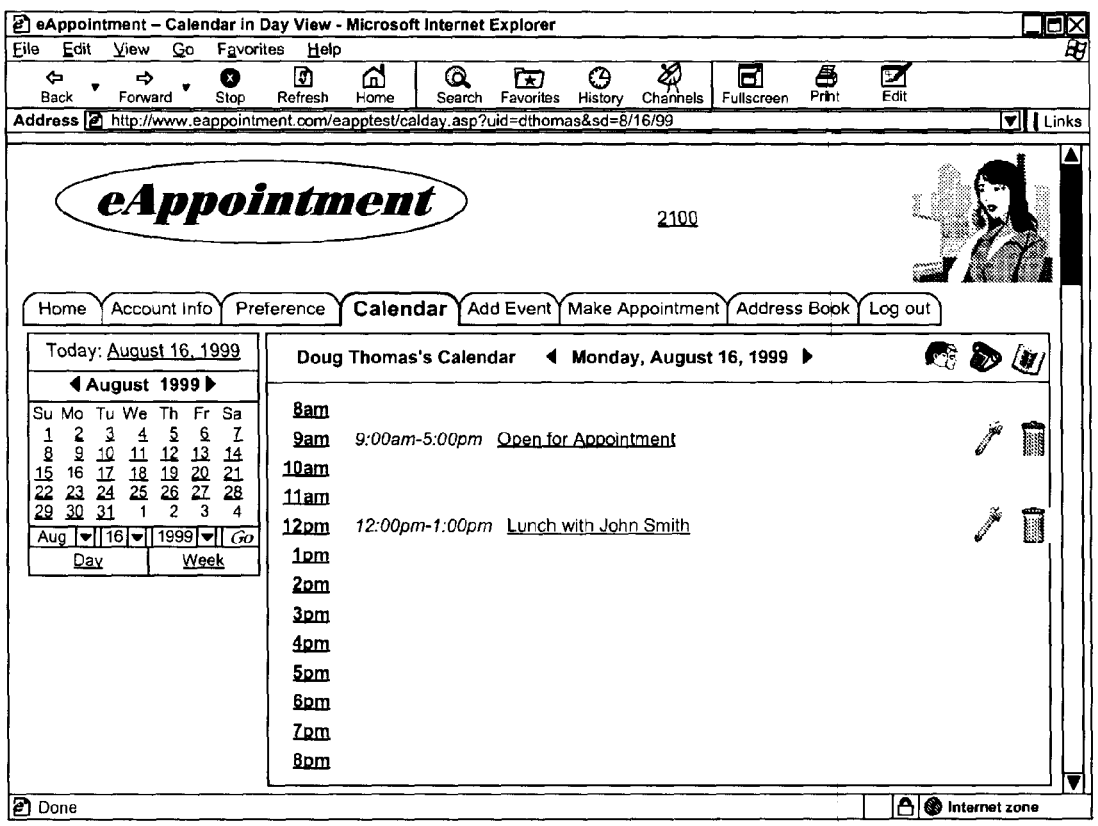
FIG. 21 is an exemplary user's calendar screen in which an updated user's calendar page is depicted.

With respect to the user's calendar, a user can schedule an event on his/her own calendar using the add event tag 1832 of the graphical user interface. FIG. 19 is an add event screen which an add event page 1900 is displayed. The add event page 1900 allows information to be provided to the appointment system when a user desires to add a new event to his/her calendar. FIG. 20 is an exemplary add event screen in which a new event is being requested for addition to the user's calendar via an add event page 2000. In this example, the event description is "Lunch with John Smith", the date is Aug. 16, 1999, the event starts at 12:00 p.m. and lasts one hour, and the details are that they are to "Meet at the Pub". Further, a check box indicates that the user's calendar is to mark this time period as busy so that other appointments are not scheduled during this time period. The event can also be repeated, and reminders for the event can be scheduled. FIG. 21 is an exemplary user's calendar screen in which an updated user's calendar page 2100 is depicted. In particular, the user's calendar page 1800 of FIG. 18 has been updated in FIG. 21 to include the new event described with respect to FIG. 20.

Figure 22:
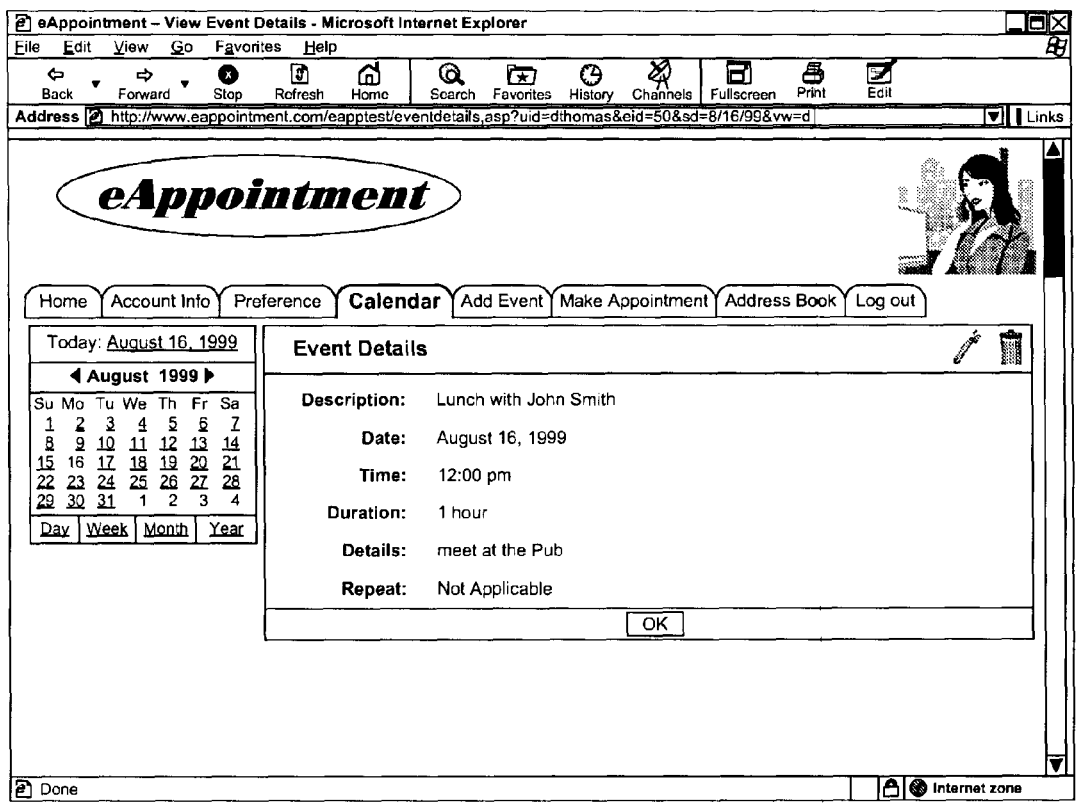
FIG. 22 is an event details screen in which event details pertaining to the event scheduled with respect to FIG. 20 are visible on the display screen.

FIG. 22 is an event details screen in which event details pertaining to the event scheduled with respect to FIG. 20 are visible on the display screen. Event details summarize the description, date, time, duration and details for the event. The event details can be requested by the user by selecting the event entry in the user's calendar which operates like a hyperlink. In this example, the event entry is "Lunch with John Smith".

Figure 23:
FIG. 23 depicts a screen containing a search form that a user can utilize in searching for a service provider with whom the user is interested in making an appointment.
Figure 24:
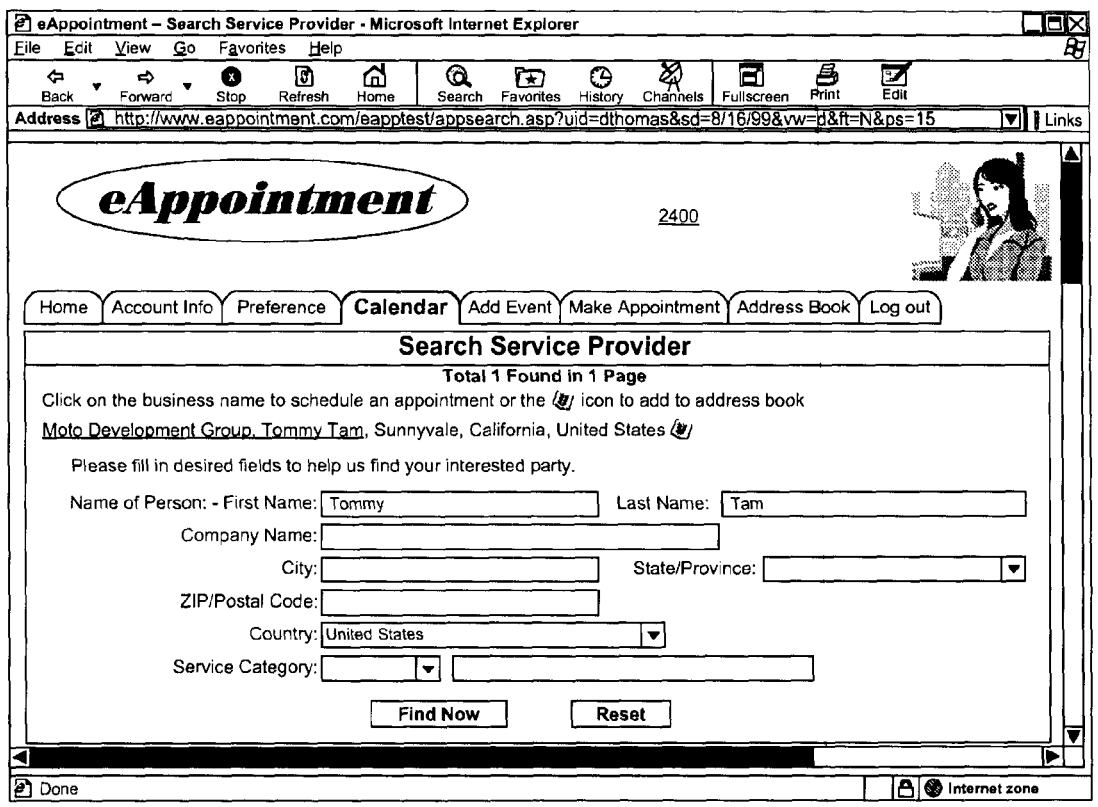
FIG. 24 depicts a screen contain a search results page which contain the search results of a search carried out using the search form of FIG. 23.
Figure 25:
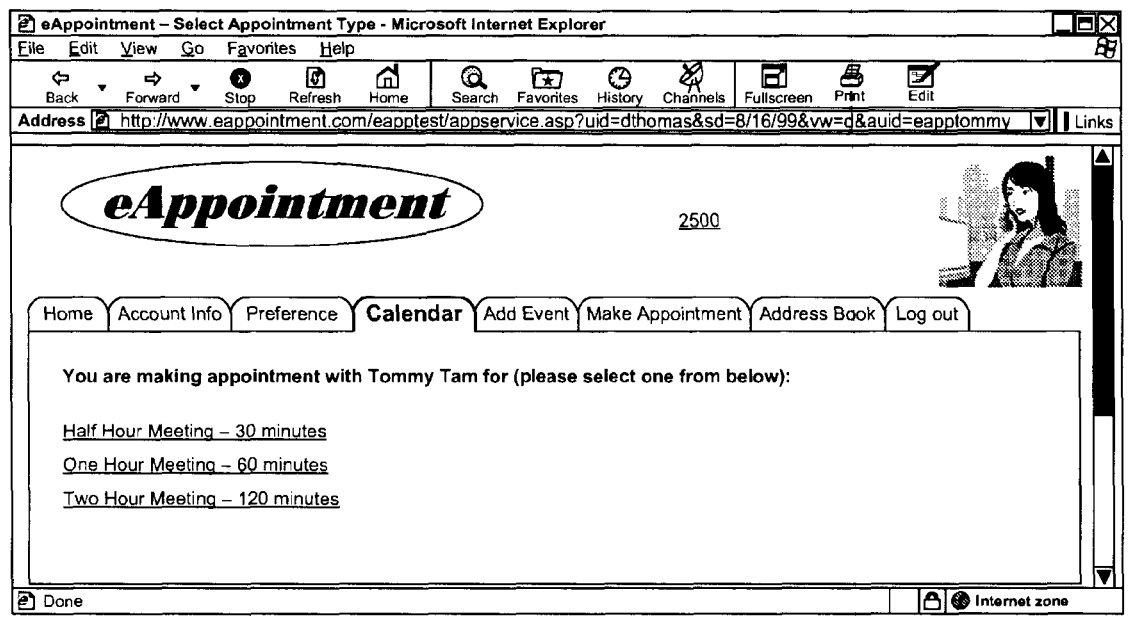
FIG. 25 is a screen depicting an available appointment types page for the selected service provider.

FIG. 23 depicts a screen containing a search form 2300 that a user can utilize in searching for a service provider with whom the user is interested in making an appointment. The search form allows searching of a business directory database by name of a person, company name or location, service category, or any combination thereof. The search form, for example, pertains to the service provider search form displayed 418 with respect to the client-side on-line appointment processing 400 illustrated in FIG. 4. FIG. 24 depicts a screen contain a search results page 2400 which contain the search results of a search carried out using the search form 2300 of FIG. 23. The search results page 2400 lists those service provides that match the search criteria. In this example, there is one matching service provider, namely, Tommy Tam of Accela Corporation. Also repeated in the search results page 2400 is the completed search form (e.g., which resembles the search form 2300) that was used to locate the service provider. The search results page 2400, for example, pertains to the list of matching service providers displayed 424 with respect to the client-side on-line appointment processing 400 illustrated in FIG. 4. FIG. 25 is a screen depicting an available appointment types page 2500 for the selected service provider (i.e., Tommy Tam). The available appointment types page 2500 is displayed after one of the matching service providers is selected (e.g., from the search results page 2400). The available appointment types page 2500, for example, pertains to the list of appointment types displayed 432 with respect to the client-side on-line appointment processing 400 illustrated in FIG. 4.

Figure 26:
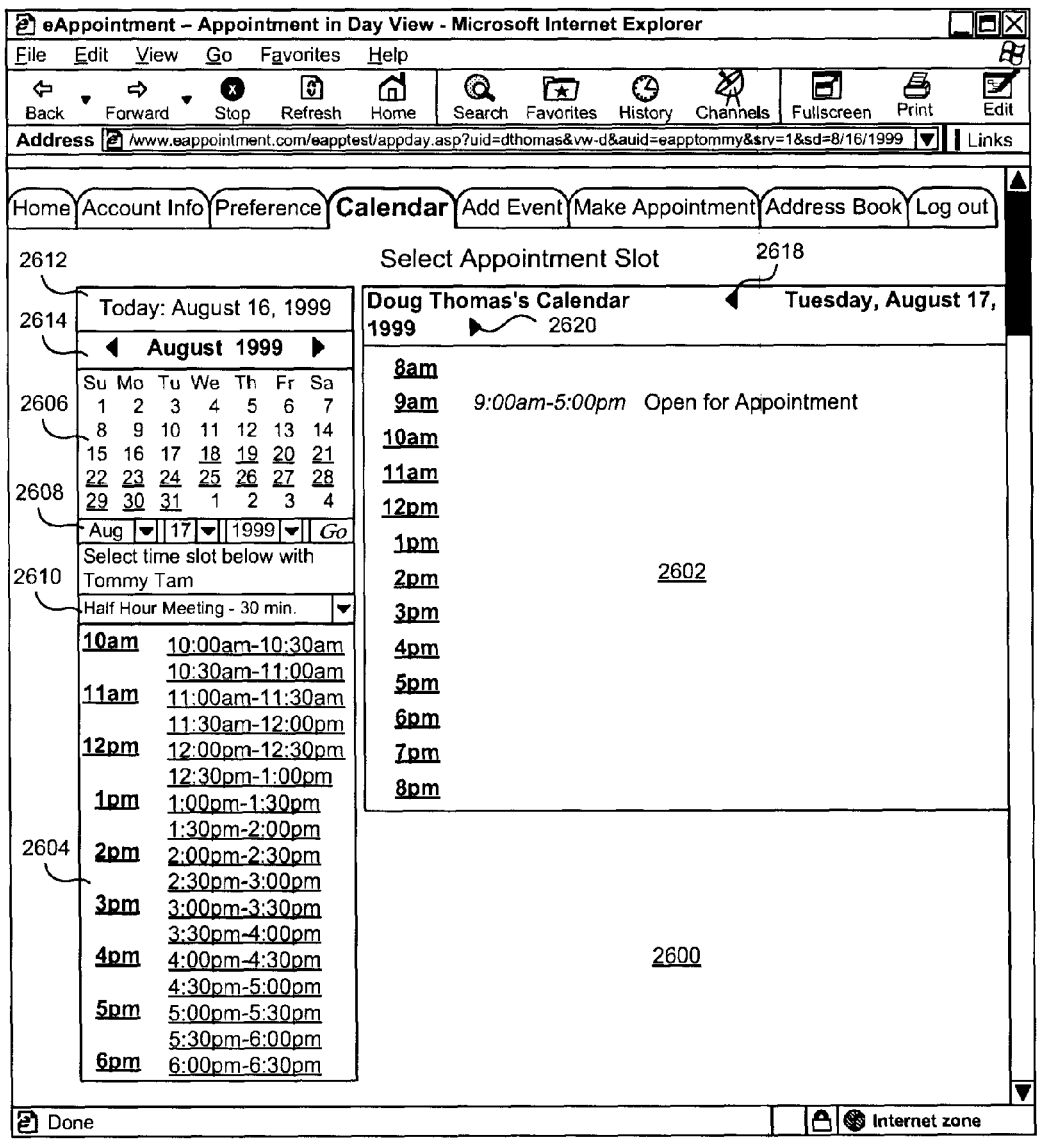
FIG. 26 depicts an appointment time slot selection screen.

FIG. 26 depicts an appointment time slot selection screen 2600. The appointment time slot selection screen 2600 allows a user to select an appointment time slot. In this example, the appointment time slot selection screen 2600 includes a user's calendar, namely in a daily view for the day of the appointment to be scheduled, and a listing of available time slots. The user's calendar is provided in a first region 2602 and the listing of available time slots is provided in a second region 2604. In this example, the type of meeting requested was a "Half Hour Meeting" so the available time slots are provided in increments of thirty minutes. A condensed monthly calendar is also provided in a third region 2606 to allow easy user navigation to different dates or months. With respect to FIG. 26, the user is able to view the user's calendar, in daily view, as well as the available time slots, both at the same time. Hence, the user can easily determine what time to schedule the appointment given his/her calendar as well as the availability of the selected service provider. Hence, a user would select one of the available time slots in which to schedule the appointment. The appointment time slot selection screen 2600 can also include an appointment date selector 2608 (i.e., a specific date navigation device) that displays the determined date for the appointment being scheduled and also allow the user to change the determined date. The appointment time slot selection screen 2600 can also include an appointment type indicator 2610 that indicates the appointment type being scheduled as well allow the user to change do different appointment types. The appointment time slot selection screen 2600 also includes an today's date indicator 2612, a month-to-month navigation device 2614, day-to-day navigation devices 2618 and 2620. The appointment time slot selection screen 2600 can further include request tabs, such as request tabs 1824-1838 shown in FIG. 18.

Still further, although not shown in FIG. 26, the appointment time slot selection screen 2600 can further display an indication of the next available appointment date. For example, if the user is not offered any time slots for the determined date or if the user is not satisfied with the time slots offered on the determined date, then the next available appointment date can provide the user with a quick link to request the re-display of the appointment time slot selection screen 2600 for the next available appointment date. This could be the next day or could be the several days in the future depending on the days that the service provider allows for appointments. Also, if desired, this could be limited to the next available appointment date in the future that has some open time slots.

Figure 27:
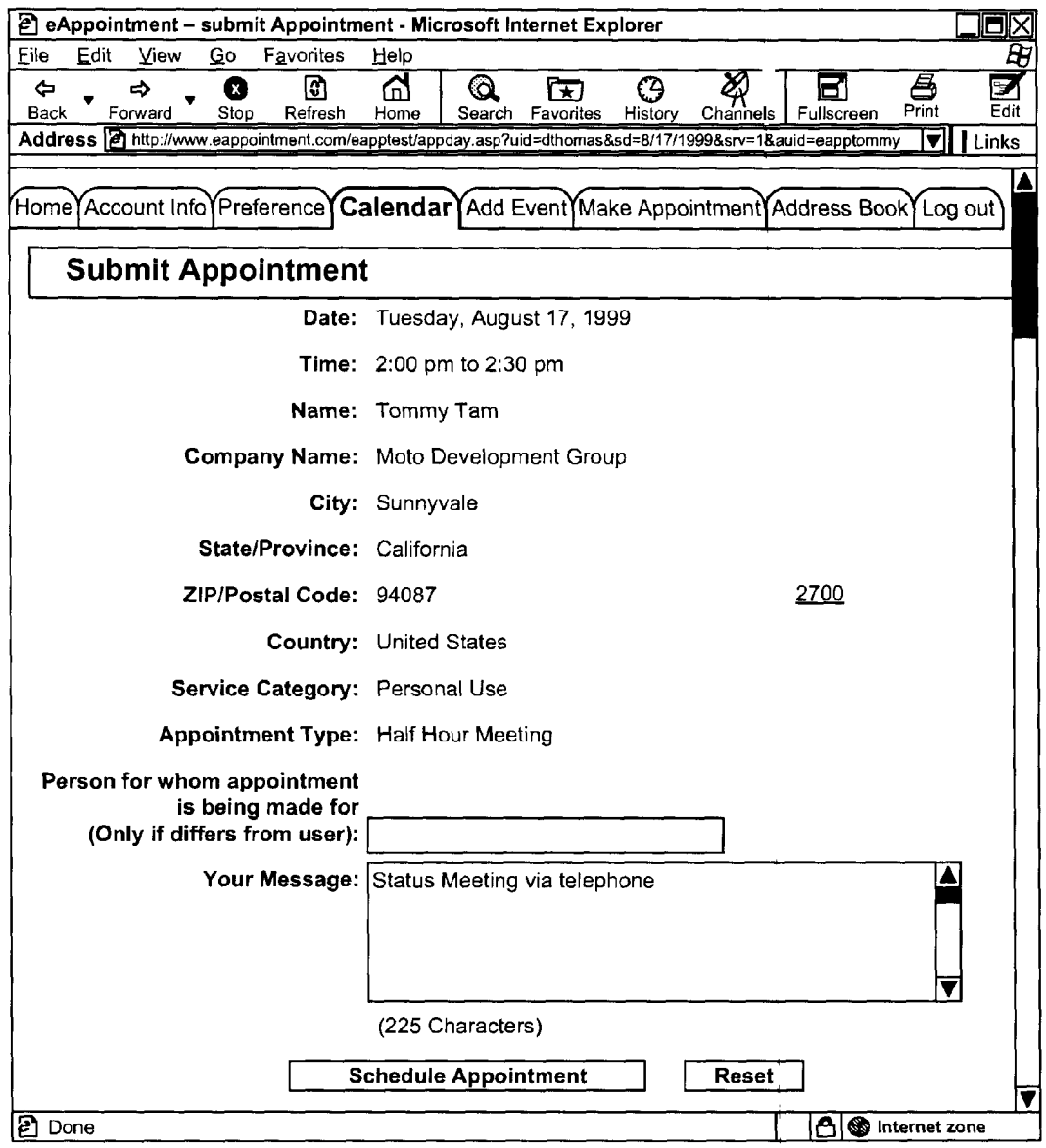
FIG. 27 depicts an appointment details screen.

Following selection of an available time slot, such as presented by the appointment time slot selection screen 2600 of FIG. 26, the user could next be presented with an appointment details screen 2700 such as illustrated in FIG. 27 in which the appointment details can be confirmed and in which a user message can be provided. In FIG. 27, the appointment details include, date, time, name, company name, city, state/province, ZIP/postal code, country, service category, appointment type, and a message. In FIG. 27, the message provided for the particular appointment is "Status Meeting via telephone". By selecting the "Scheduled Appointment" button, the appointment will be scheduled. Additionally, the appointment system allows appointments to be made for others.

Figure 28:
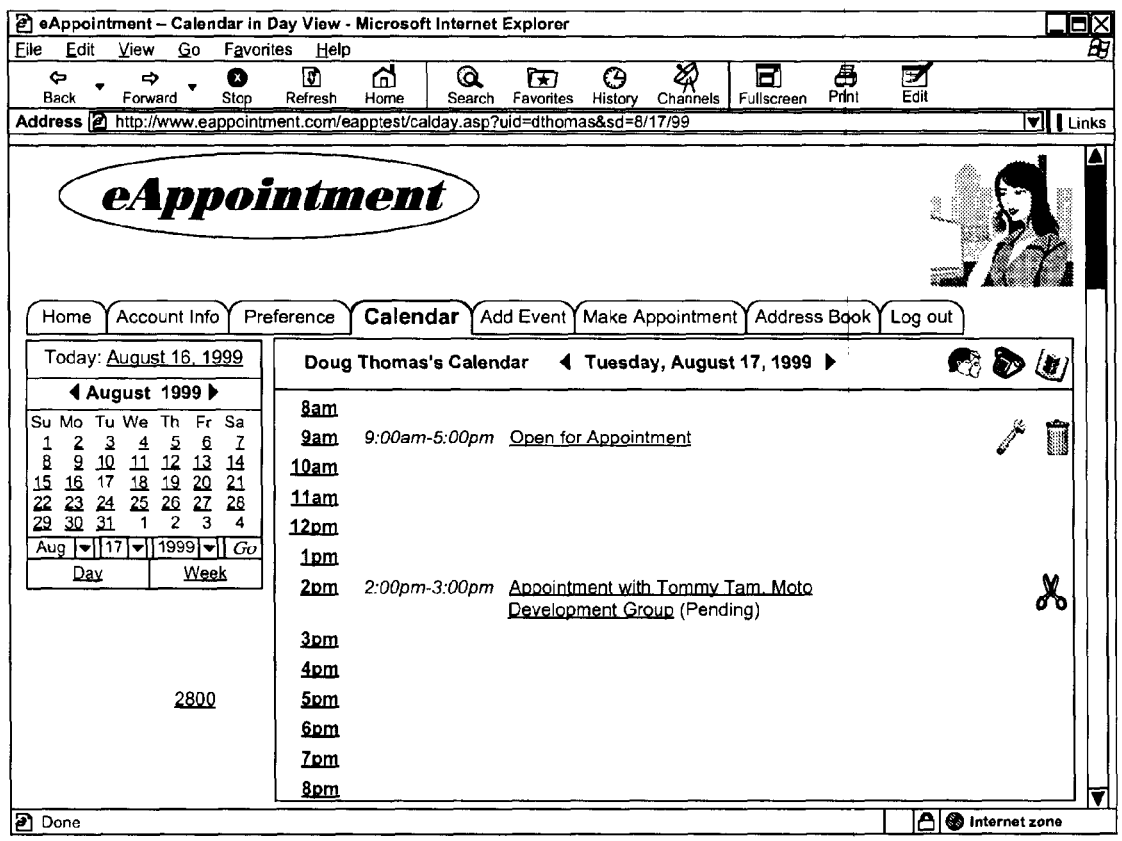
FIG. 28 is a user's calendar screen in which a user's calendar page is depicted.

FIG. 28 is a user's calendar screen in which a user's calendar page 2800 is depicted. The user's calendar page 2800 includes a screen shot of the user's calendar after the appointment has been scheduled, and thus represents an updated version of the user's calendar screen as compared to the user's calendar screen shown in FIG. 18. Here, the appointment is scheduled from the user's perspective. More specifically, the appointment has been requested and is thus "pending" until "confirmed" (accepted) by the selected service provider. Hence, in FIG. 28, the appointment is illustrated within the user's calendar at the appropriate date and time (and duration) and with a short description of the appointment. Here, the appointment is shown as having a status of "pending".

Figure 29:
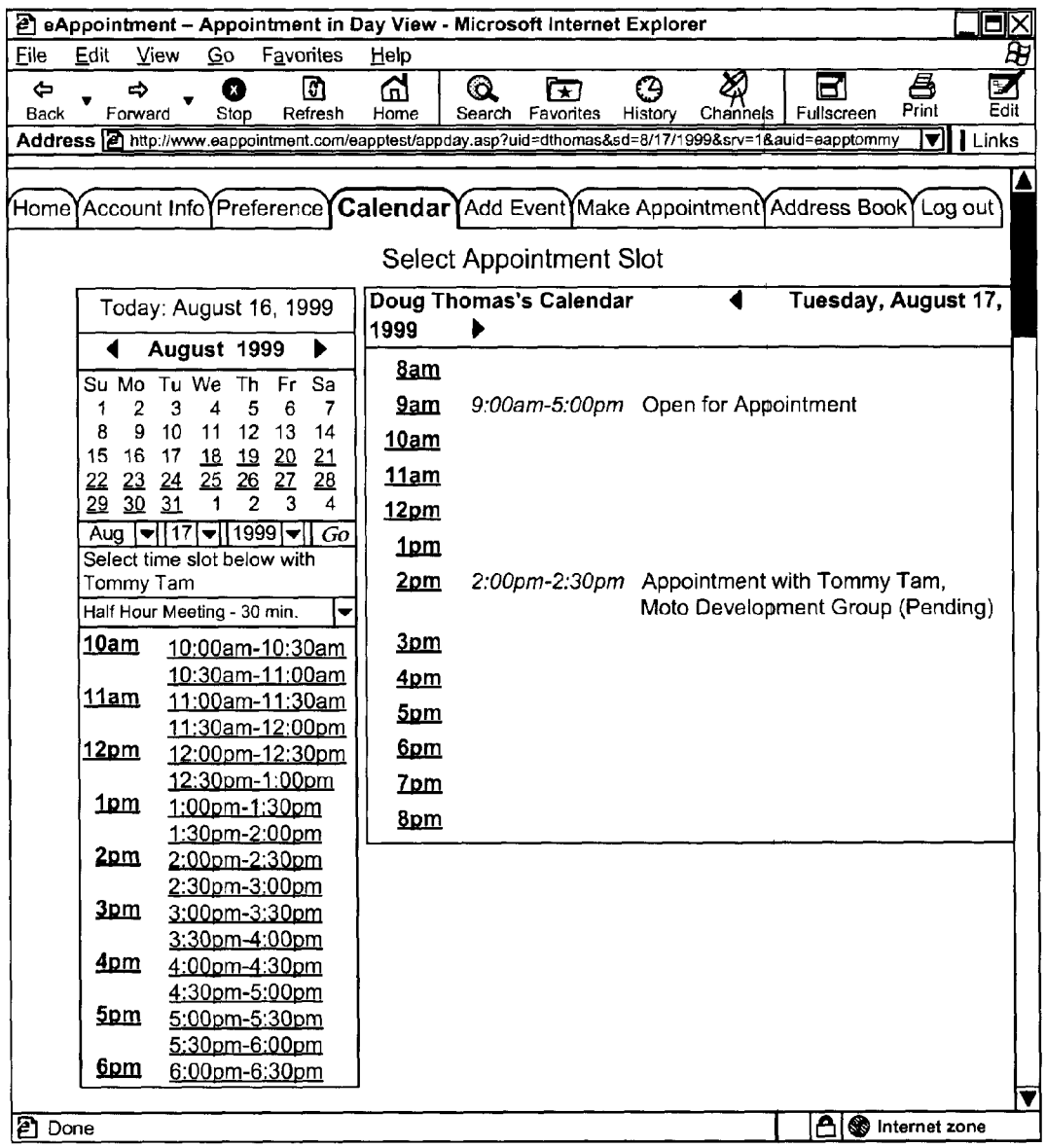
FIG. 29 illustrates the user's calendar screen of FIG. 28 after the selected service provider has confirmed the requested appointment.

After the selected service provider is notified of the requested appointment and, thereafter, accepts (or confirms) the requested appointment, the appointment system will update the user's calendar (as well as the service provider's calendar) to update the status to that of "confirmed". FIG. 29 illustrates the user's calendar screen of FIG. 28 after the selected service provider has confirmed the requested appointment.

Figure 30:
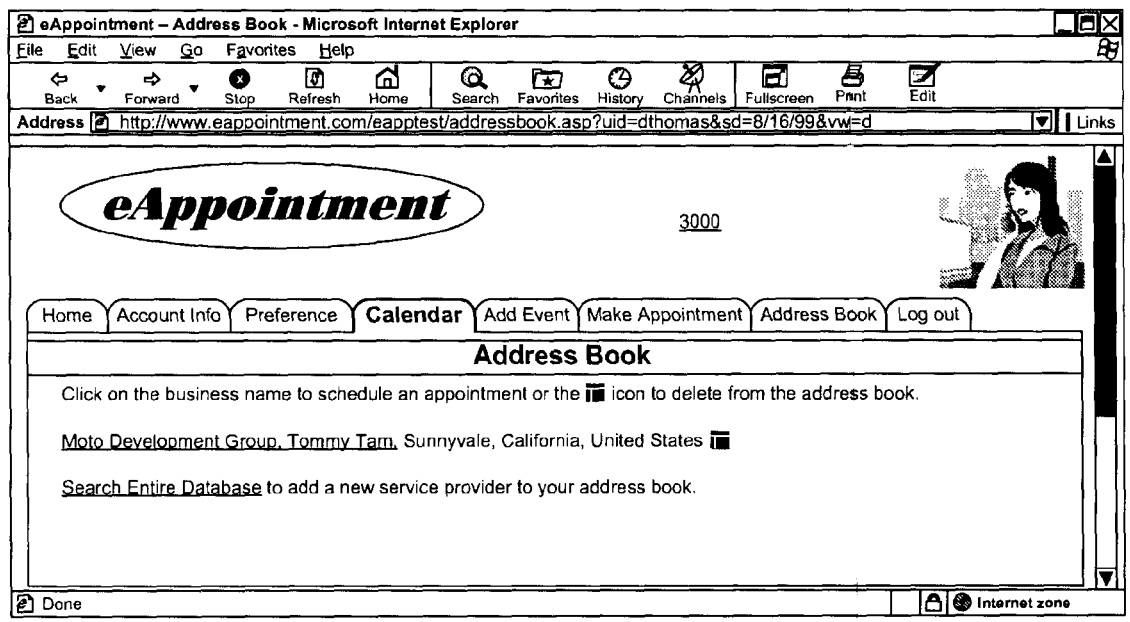
FIG. 30 depicts an address book screen that provides an address book for the user.

FIG. 30 depicts an address book screen 3000 that provides an address book for the user. The address book is maintained by the appointment server. The appointment system allows users to maintain an address book on-line and utilize those businesses or individuals provided in their address book to make appointments quickly. Hence, to schedule an appointment, the user can go directly to the address book to select an individual or business or can instead use the search form discussed above.

FIGS. 31-39 are screen depictions associated with the scheduling and confirmation of a requested appointment from the respective of two registered users. In this example, the registered users of the appointments are both individuals.

Figure 31:
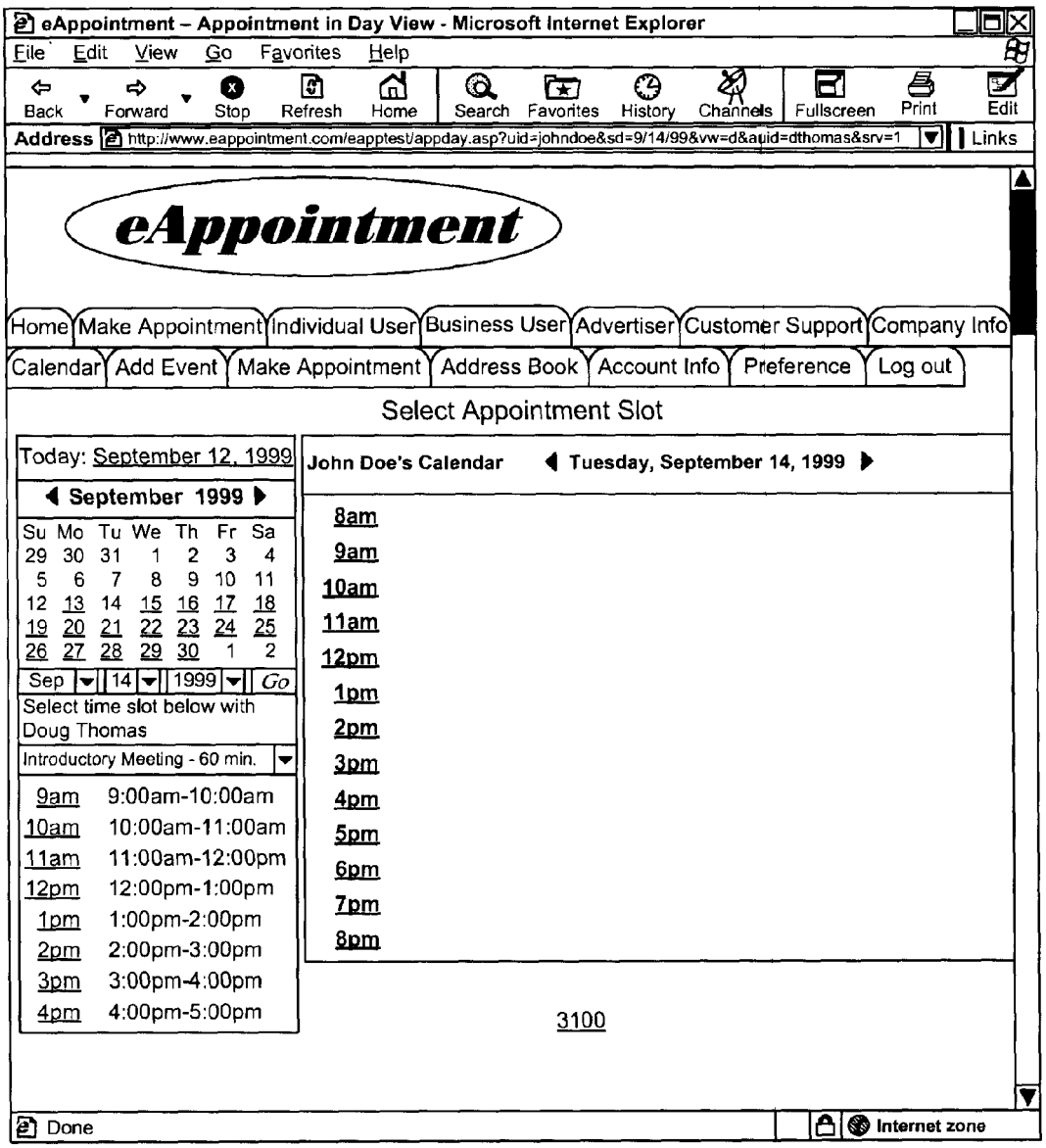
Figure 32:
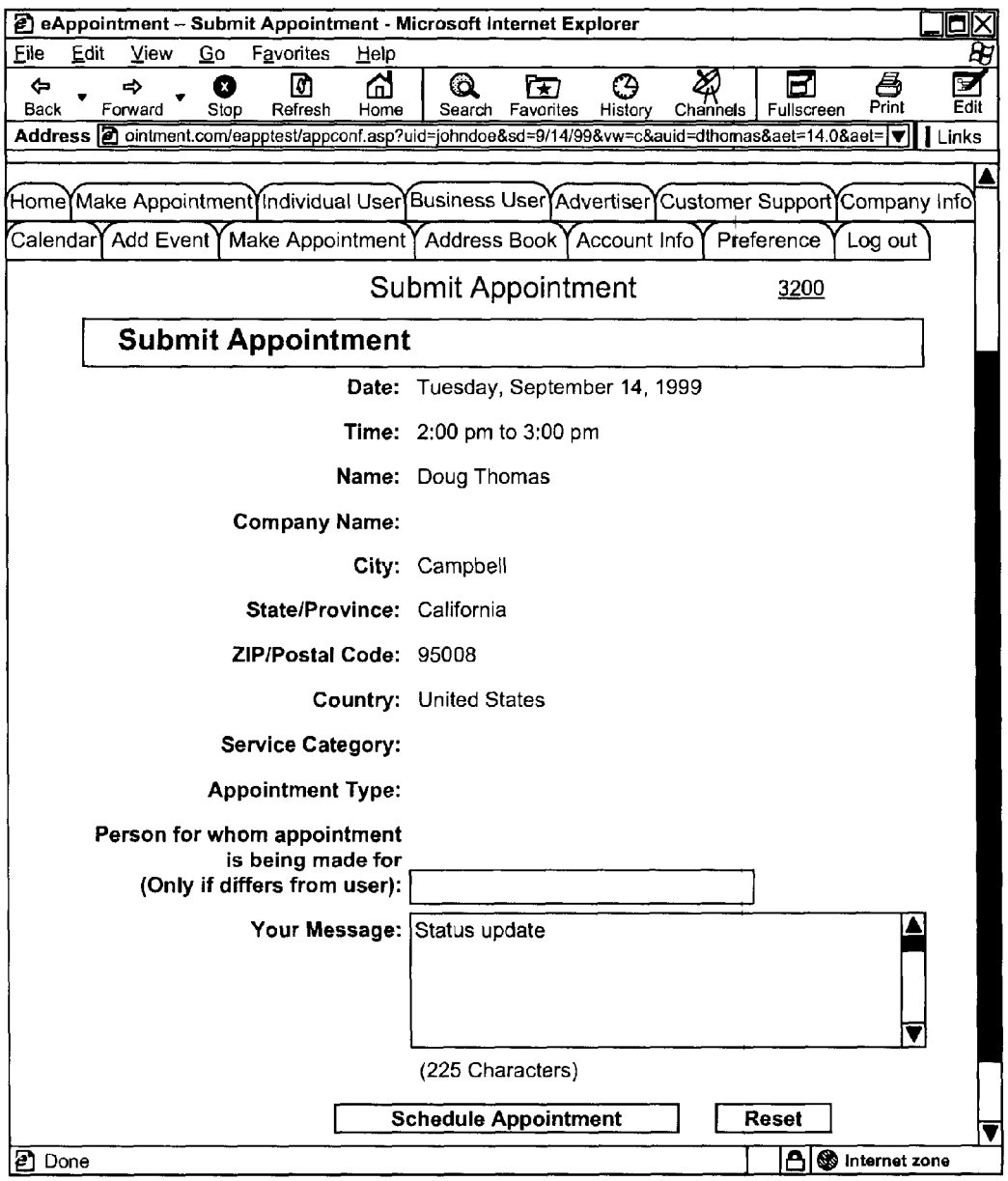

FIG. 31 depicts an appointment time slot selection screen 3100 that resembles that resembles the time slot selection screen 2600 illustrated in FIG. 26. Using the appointment time slot selection screen 2600, the first user selects one of the available time slots, in this example, 2:00 p.m.-3:00 p.m. on Sep. 14, 1999. In response to the selection of the time slot, an appointment scheduling confirmation page 3200 is presented such as shown in FIG. 32. The appointment scheduling confirmation page 3200 provides the details regarding the appointment to be scheduled. The appointment scheduling confirmation page 3200 can provide an area in which the requestor of the appointment can provide a message to the requestee. If the user is satisfied with the details of the appointment as described in the appointment confirmation display page 3200, the user selects the "Schedule Appointment" button. At this point, the on-line appointment system schedules the requested appointment with the first and second users.

Figure 33:
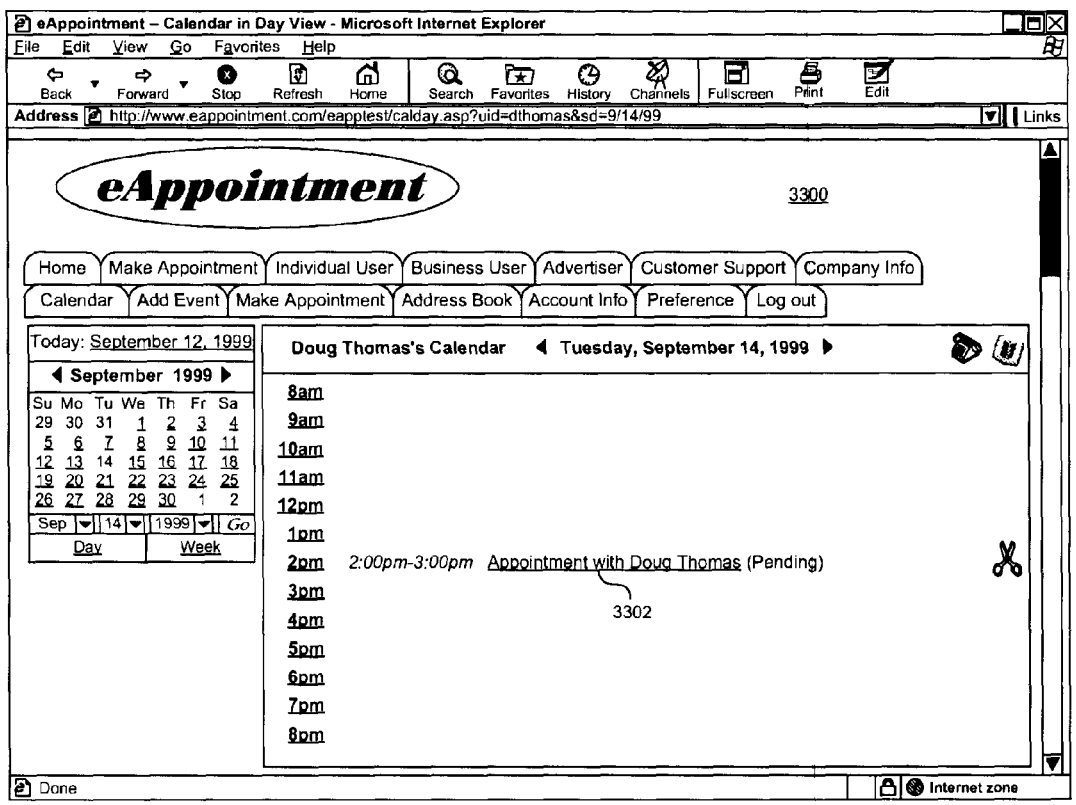

Following the scheduling of the appointment, the srr's calendar screen is depicted with the user's calendar page 3300 as shown FIG. 33. The user's calendar page 3300 is similar to the user's calendar page 2800 illustrated in FIG. 28. It should be noted that the appointment that was scheduled, as explained with respect to FIGS. 31 and 32, now appears in the user's calendar page 3300 as a pending appointment. The entry in the user's calendar displayed with the user's calendar page 3200 includes a link 3202 (e.g., a hyperlink) to details regarding the appointment. Upon selecting the link, the appointment details are displayed such as presented in an appointment detail screen 3400 illustrated in FIG. 34.

Figure 34:
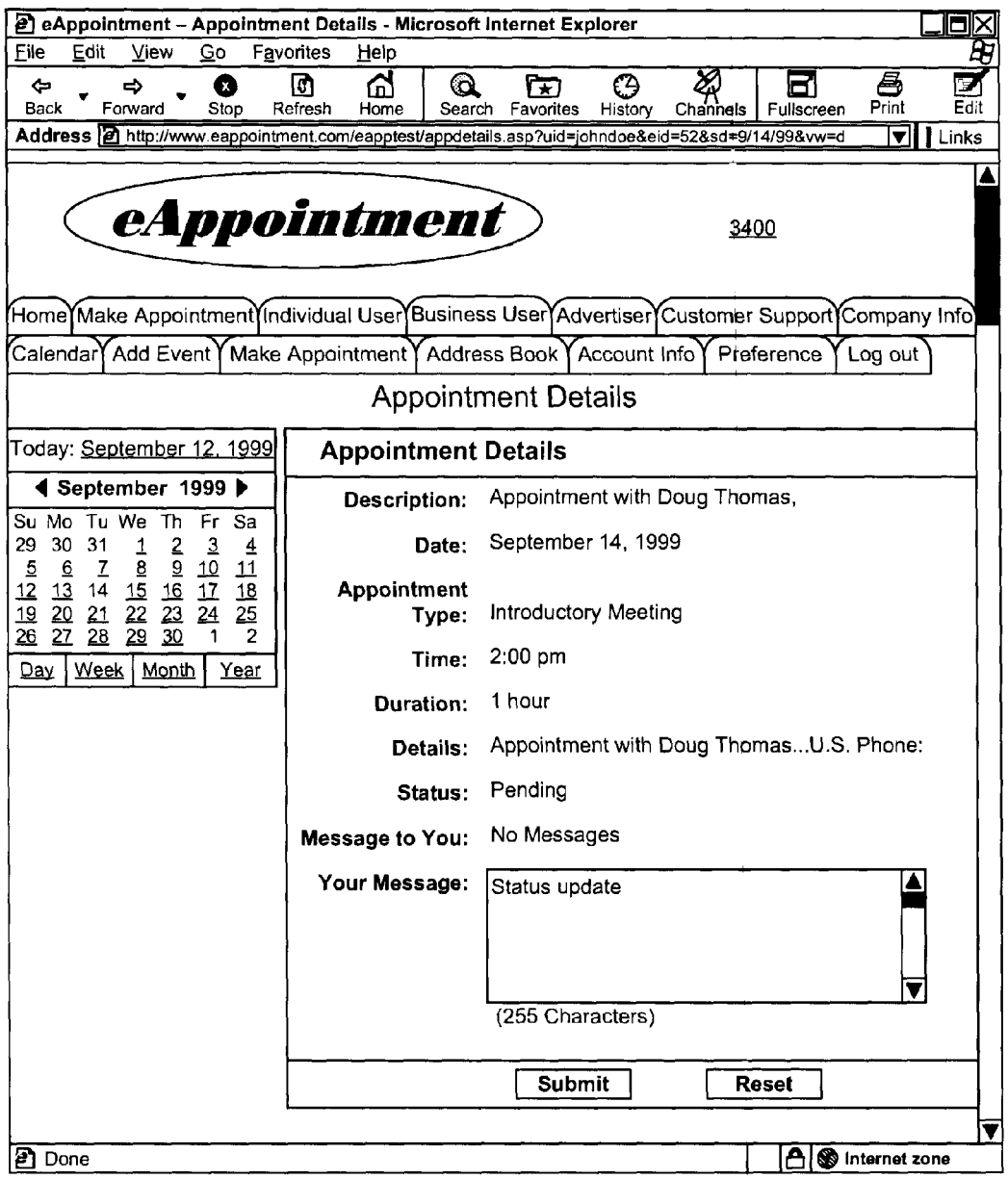
Figure 35:
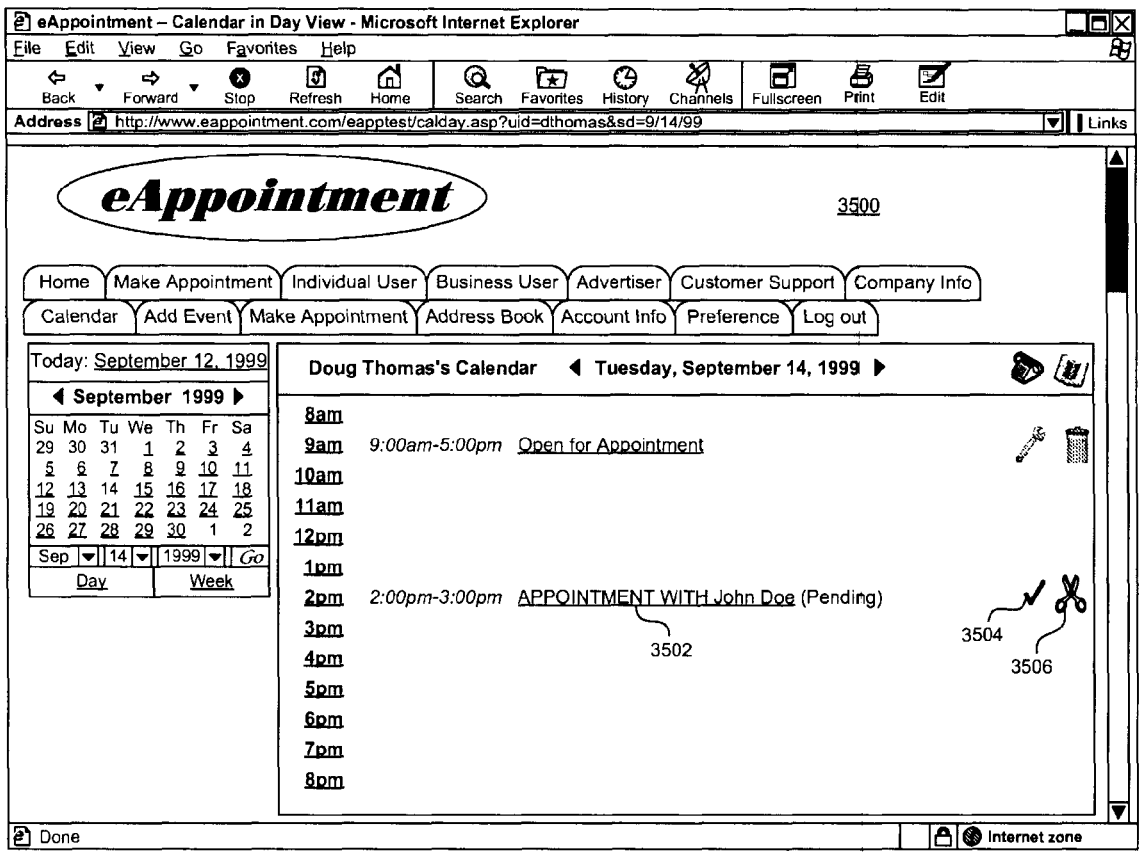
Figure 36:
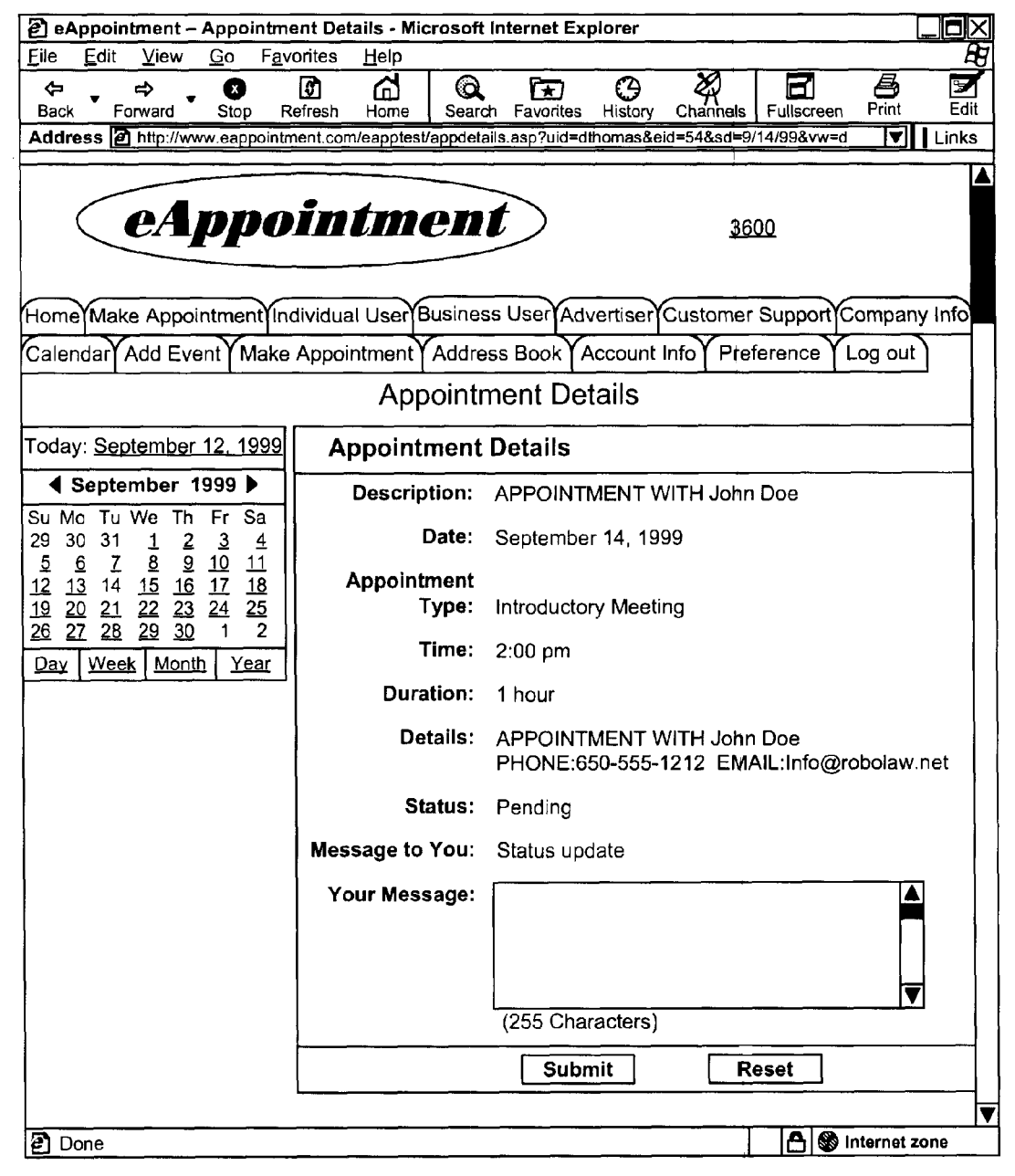
Figure 37:
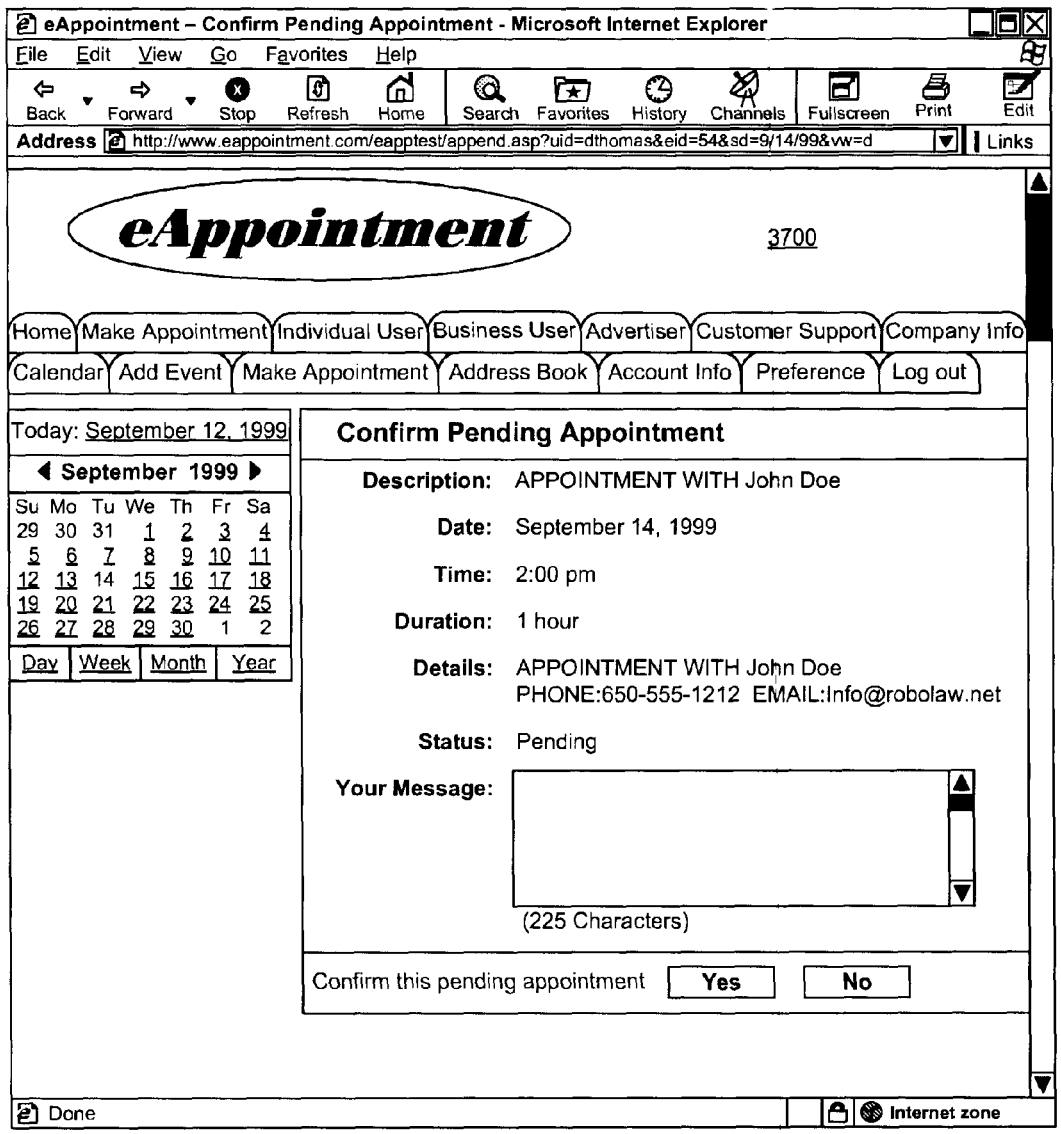
Figure 38:
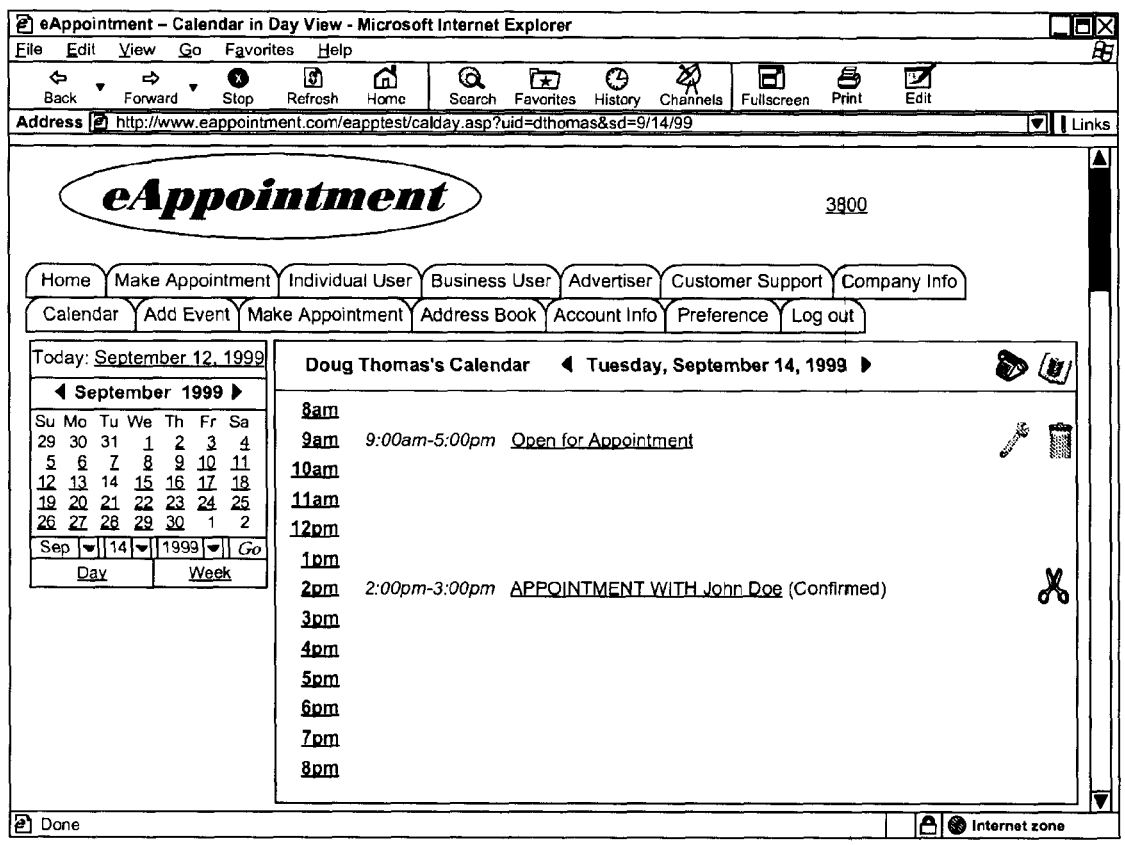
Figure 39:
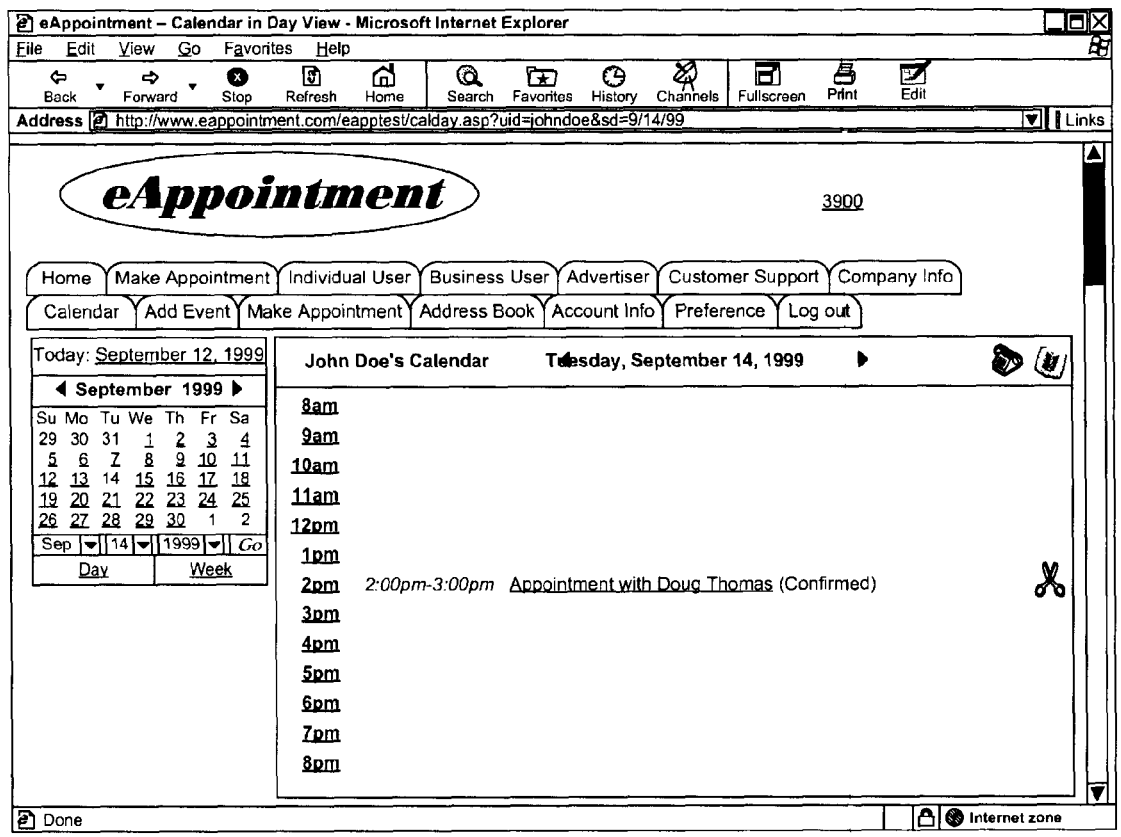

Now, from the perspective of the second user, the user with whom the appointment has been scheduled, the second user's calendar is depicted such as shown in a user's calendar page 3500 of a user's calendar screen illustrated in FIG. 35. Note that in the user's calendar shown in FIG. 35, the previously scheduled appointment appears as a pending appointment. This entry in the user's calendar also includes a link 3502 (e.g. a hyperlink) to details regarding the appointment. Upon selection of the link 3502, an appointment details screen 3600 can be presented to the user such as illustrated in FIG. 36. The appointment detail screen 3600 represents the screen presented to the second user, while the appointment, detail screen 3400 illustrated in FIG. 34 represents the appointment details presented to the first user. The user's calendar provided with the user's calendar page 3500 illustrated in FIG. 35 also includes a confirmation indicator 3504 and a cancellation indicator 3506. The confirmation indicator 3504 allows the user to confirm or decline a pending appointment by the selection of the confirmation indicator 3504. The cancellation indicator 3506 allows the user to cancel a pending appointment, or even a confirmed appointment, by the selection of the cancellation indicator 3506. When the confirmation indicator 3504 has been selected by user, a confirmation screen having an appointment confirmation page 3700 is presented to the user. The appointment confirmation page 3700 provides information on the requested appointment and allows the requestee to confirm or decline the appointment as well as provide a message in response. If the user confirms the appointment, the appointment will be confirmed and the respective calendars of the first and second users will be appropriately updated. On the other hand, if the user declines the requested appointment, the calendars of the first and second users will also be appropriately updated. FIG. 38 is a user's calendar screen in which a user's calendar page 3800 is depicted. The user's calendar page 3800 represents an updated version of the user's calendar page 3500 illustrated in FIG. 35. Note that the appointment that was scheduled is now shown as being confirmed and the confirmation indicator 3504 is removed. Similarly, from the perspective of the first user, once the appointment has been confirmed, the user's calendar of the first user is also updated to indicate that the appointment is now confirmed. FIG. 39 is a user's calendar screen in which a user's calendar page 3900 is depicted. The user's calendar page 3900 represents the user's calendar (i.e., the first user's calendar) after the appointment has been confirmed by the second user. Note that in comparison with the user's calendar page 3300 illustrated in FIG. 33, the status of the appointment has been changed from "pending" to "confirmed".

The user could specify a period during the day in which they desire an appointment, and then the available days for those times would be displayed for user selection. In other words, although the on-line appointment system is largely described as displaying time slots available on a given day (e.g., FIG. 26), the system could equally display available days in which certain time slots are available for appointments. In other words, the invention can serve to identify available slots to the user desirous of requesting an appointment. These slots can, for example, represent available time periods or available days.

The invention can use a combination of hardware and software components. The software can be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

In one embodiment the appointment server is implemented on a computer operating Windows NT operating system and provides a web server. The web server stores Active Server Pages (ASP) that perform the interactions with the database (s) and generate the pages to be displayed to requestors.

The advantages of the invention are numerous. Different embodiments or implementations may have one or more of the following advantages. One advantage of the invention is that appointments can be efficiently established on-line at any time day or night. Appointments can also be established without the need to waiting for personal assistance to schedule an appointment with a service provider. Another advantage of the invention is that user can manage and schedule appointments using a website. Still another advantage of the invention is that customers can use a central website to make appointments with various service providers. Yet another advantage of the invention is that synchronization of calendars or appointments between those maintained by the central website and those on local computers.

The many features and advantages of the present invention are apparent from the written description, and thus, it is intended to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method implemented by a central appointments server comprising:
    receiving at least one request from a user system over a network to make an appointment during a time period;
    responsive to the request, enabling a selection of a service provider from a plurality of service providers accessible via the central appointments server;

determining at least one available appointment time within the time period for the selected service provider through use of the central appointments server, wherein the central appointments server is configured to store representations of respective calendars that indicate available appointment times for the plurality of service providers, wherein the representations of the calendars include a representation of a first calendar for the selected service provider;

transmitting the at least one available appointment time obtained from the first calendar to the user system;

receiving notification of a selection of an appointment time from the at least one available appointment time; and responsive to the notification, causing a second calendar maintained by the selected service provider separate from the central appointments server to be checked to determine whether the selected appointment time is available in the second calendar.

2. A method as recited in claim 1, wherein receiving at least one request from a user system includes receiving at least one request to make an appointment on-line during a specified day.

3. A method as recited in claim 1,
wherein receiving the request comprises receiving at least one request that specifies a time duration for the appointment, and
wherein determining at least one available appointment time comprises identifying at least one time during the time period that the service provider is available for at least the time duration.

4. A method as recited in claim 1, further comprising:
in response to determining that the selected appointment time for the selected service provider is unavailable in the second calendar, outputting to the user system an indication that the selected appointment is unavailable.

5. A method as recited in claim 1, wherein determining at least one available appointment time includes accessing an online calendar, and wherein causing a second calendar to be checked includes causing a calendar maintained locally by the selected service provider to be checked.

6. A method as recited in claim 1, wherein causing the second calendar maintained by the service provider to be checked comprises requesting a determination of whether the selected appointment time conflicts with an item on the second calendar.

7. A method as recited in claim 1, wherein causing the second calendar maintained by the service provider to be checked comprises requesting that the selected appointment time for the appointment be accepted or declined.

8. A method as recited in claim 7, wherein causing the second calendar maintained by the service provider to be checked comprises requesting that the selected appointment time for the appointment be automatically accepted or declined.

9. A method as recited in claim 1, further comprising setting an appointment between the user system and the selected service provider at the selected appointment time in response to an indication that the selected appointment time is available in the second calendar.

10. A method as recited in claim 9, wherein setting the appointment comprises:
transmitting verification information for the appointment to the user system,
receiving acknowledgement of the verification information for the appointment; and
subsequently setting the appointment between the user system and the service provider at the selected appointment time in response to receiving the acknowledgement.

11. A method as recited in claim 9,
wherein setting the appointment comprises setting a requested appointment online, and further comprising subsequently receiving a confirmation for the requested appointment.

12. A method as recited in claim 11, further comprising:
updating the requested appointment to a confirmed appointment after the confirmation has been received.

13. A method as recited in claim 11, wherein receiving at least one request from a user system includes receiving a request to schedule an appointment on a predetermined day, and includes receiving the request over the Internet.

14. A method as recited in claim 1, wherein enabling the selection comprises outputting a representation of a form configured to accept input of search terms to cause a search of a directory that lists the plurality of service providers.

15. A method as recited in claim 14, wherein enabling the selection further comprises:
receiving, from the user system, representations of at least one search term that is input to the form via the user system;
generating a list of service providers from the directory that match the input search terms; and
communicating the list of matching service providers to the user system.

16. A method as recited in claim 1, further comprising:
requesting a search of at least one database that lists the plurality of service providers based on search information obtained from the user system;
communicating a list of service providers from the database that match the search information to the user system; and
obtaining the selection of the service provider from the user system based on the list.

17. A method as recited in claim 1, wherein enabling the selection comprises exposing a directory of service providers that is searchable via a user system to facilitate the selection.

18. A method as recited in claim 17, wherein exposing a directory of service providers includes exposing a directory of service providers that includes a plurality of categories arranged in a hierarchy, wherein the directory associates the service providers with one or more of the plurality of categories that relate to services offered by the service providers.

19. A method as recited in claim 18, further comprising searching the directory based at least in part on search information describing one or more of the plurality of categories obtained from the user system.

20. One or more non-transitory computer-readable media comprising instructions, that in response to execution by a server device, cause the server device to implement an on-line scheduling application that is configured to:
responsive to a request to make an appointment on-line, output a user interface configured to accept input of search terms and cause a search of a directory of service providers based on the search terms to facilitate a selection of a service provider from the directory;
upon selection of the service provider from the directory, determine at least one available appointment slot for the service provider through use of a central appointments server having access to a central appointment database configured to store a first calendar for at least the service provider;

transmit a representation of the at least one available appointments slot obtained from the first calendar to a user system;

receive from the user system a representation of a selected appointment slot from the at least one available appointment slot; and cause a second calendar maintained by the service provider separately from the first calendar to be checked to verify that the selected appointment slot is available in the second calendar.

21. One or more computer-readable media of claim 20 further comprising instructions that, in response to execution by the server device, cause the server device to implement the on-line scheduling application that is configured to set an appointment between the user system and the service provider at the selected appointment slot in response to determining that the selected appointment slot is verified to be available in the second calendar.

22. One or more computer-readable media of claim 20 further comprising instructions that, in response to execution by the server device, cause the server device to implement the on-line scheduling application that is configured to output to the user system an indication that the selected appointment is unavailable in response to a determination that the selected appointment time for the selected service provider is unavailable in the second calendar.

23. An on-line appointment system, comprising:
at least one appointment database configured to store representations of respective calendars for one or more service providers on behalf of the on-line appointment system; and
at least one appointment server device configured to:
   furnish access to the calendars stored by the appointment database via a network to schedule appointments with the one or more service providers;
   expose a business directory of service providers that is searchable via a user system to facilitate selection of the one or more service providers to schedule the appointments;
   obtain at least one available appointment time for communication to the user system using the calendars stored by the appointment database for the one or more service providers that are selected using the directory;
   propose at least one appointment at least one selected appointment time between the user system and the one or more service providers based on a determination that the at least one selected appointment time is available in one or more local software calendars maintained by the one or more service providers, the one or more local software calendars being separate and distinct from the calendars stored by the appointment database; and
   request confirmation, by the one or more service providers, of the appointments that have been proposed with the one or more service providers.

24. An on-line appointment system as recited in claim 23, wherein said appointment server device is configured to send reminders for confirmed appointments.

25. An on-line appointment system as recited in claim 23, wherein the appointment server device is configured to include the business directory of service providers.

26. An on-line appointment system as recited in claim 23, wherein said appointment database is further configured to store information for at least one of said one or more service providers.

27. An on-line appointment system as recited in claim 23, wherein the appointment server device includes a synchronization application that is configured to synchronize automatically the calendars of the one or more service providers in the appointment database with the one or more local software calendars of the one or more service providers.

28. One or more non-transitory computer-readable media comprising instructions that, in response to execution by a server device, cause the server device to perform a method comprising:
   receiving at least one request from a user system to search a directory maintained by the server device, wherein the directory lists a plurality of service providers registered with an on-line appointment system;
   searching the directory based on at least one search term to identify one or more of the plurality of service providers that match the at least one search term;
   transmitting search results describing the matching service providers to the user system;
   receiving, from the user system, a selection of a service provider based on the search results;
   accessing a first calendar associated with the selected service provider to identify at least one available appointment slot for making appointments with the selected service provider;
   transmitting data representing the at least one available appointment slot for the selected service provider to the user system;
   receiving, from the user system, a selection of at least the available appointment slot; and
   requesting that the appointment be scheduled between the user system and the selected service provider at the selected appointment slot based upon a determination of whether the one or more selected appointment slot is available in a second calendar maintained by the service provider separately from the first calendar.

29. The computer-readable media of claim 28, wherein transmitting search results comprises transmitting data sufficient to enable the user system to render a user interface having the search results.

30. The computer-readable media of claim 28, further comprising configuring a mark-up language document to include the search results, wherein transmitting the search results comprises transmitting the mark-up language document for rendering by the user system.

31. The computer-readable media of claim 28, further comprising receiving a notification indicating that the selected appointment slot is available in the second calendar, and in response to the notification, setting the appointment at the selected appointment slot.

32. The computer-readable media of claim 28, further comprising receiving a notification indicating that the selected appointment slot is not available in the second calendar, and in response to the notification, outputting an indication that the selected appointment slot is unavailable for communication to the user system.

* * * * *